US010855461B2

(12) United States Patent
Chang et al.

(10) Patent No.: US 10,855,461 B2
(45) Date of Patent: Dec. 1, 2020

(54) SECURITY KEY CHANGE METHOD, BASE STATION, AND USER EQUIPMENT

(71) Applicant: Huawei Technologies Co., Ltd., Shenzhen (CN)

(72) Inventors: Junren Chang, Beijing (CN); Hao Bi, Rolling Meadows, IL (US); Yi Guo, Shanghai (CN); Dongmei Zhang, Shenzhen (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 471 days.

(21) Appl. No.: 15/221,442

(22) Filed: Jul. 27, 2016

(65) Prior Publication Data

US 2016/0337848 A1 Nov. 17, 2016

Related U.S. Application Data

(63) Continuation of application No. PCT/CN2014/071675, filed on Jan. 28, 2014.

(51) Int. Cl.
*H04L 9/08* (2006.01)
*H04L 29/06* (2006.01)
(Continued)

(52) U.S. Cl.
CPC .......... *H04L 9/0891* (2013.01); *H04L 63/062* (2013.01); *H04W 12/0401* (2019.01);
(Continued)

(58) Field of Classification Search
CPC ..... H04W 76/15; H04W 12/04; H04W 88/06; H04W 74/0833; H04W 12/0401;
(Continued)

(56) References Cited

U.S. PATENT DOCUMENTS 9,326,211 B2 * 4/2016 Kaur ..................... H04W 76/27
9,497,673 B2 * 11/2016 Blankenship ..... H04W 36/0077
(Continued)

FOREIGN PATENT DOCUMENTS

CN 1937837 A 3/2007
CN 101047978 A 10/2007
(Continued)

OTHER PUBLICATIONS

Samsung, "Discussion on Security Solution for 1A SCE UP Architecture", 3GPP TSG SA WG3 (Security) Meeting #74, Jan. 20-24, 2014, Taipei, Taiwan, S#-140125, 5 pages.
(Continued)

*Primary Examiner* — Tae K Kim
(74) *Attorney, Agent, or Firm* — Slater Matsil, LLP

(57) ABSTRACT

The present invention provides a security key change method and a user equipment (UE). The method performed by the UE includes: receiving a key change command message from a master eNodeB (MeNB), wherein the key change command message comprises an indication that a change of a security key between the UE and a secondary eNodeB (SeNB), and the UE is configured with a dual connectivity between the MeNB and the SeNB; updating a security key between the UE and the SeNB; performing random access to the SeNB; and sending a key change complete message to the MeNB.

9 Claims, 10 Drawing Sheets

(51) Int. Cl.

| | |
|---|---|
| *H04W 36/00* | (2009.01) |
| *H04W 12/04* | (2009.01) |
| *H04W 88/08* | (2009.01) |
| *H04W 36/06* | (2009.01) |

(52) U.S. Cl.
CPC .............. *H04W 12/04031* (2019.01); *H04W 12/04033* (2019.01); *H04W 36/0038* (2013.01); *H04L 2463/061* (2013.01); *H04W 36/0069* (2018.08); *H04W 36/06* (2013.01); *H04W 88/08* (2013.01)

(58) Field of Classification Search
CPC ..... H04W 12/04031; H04W 12/04033; H04W 12/04071; H04L 9/0891; H04L 9/0861; H04L 9/0822; H04L 9/14; H04L 9/083; H04L 63/06; H04L 63/065; H04L 63/062; H04L 63/068
See application file for complete search history.

(56) References Cited

U.S. PATENT DOCUMENTS

| | | | | |
|---|---|---|---|---|
| 9,526,002 | B2* | 12/2016 | Sharma | H04W 12/04033 |
| 10,321,308 | B2* | 6/2019 | Deng | H04W 12/0401 |
| 2009/0149189 | A1* | 6/2009 | Sammour | H04L 1/165 |
| | | | | 455/450 |
| 2009/0197589 | A1* | 8/2009 | Kitazoe | H04W 76/25 |
| | | | | 455/422.1 |
| 2009/0280774 | A1 | 11/2009 | Patel et al. | |
| 2010/0278037 | A1* | 11/2010 | Jen | H04W 76/19 |
| | | | | 370/216 |
| 2010/0304748 | A1* | 12/2010 | Henttonen | H04W 36/0077 |
| | | | | 455/436 |
| 2012/0033815 | A1* | 2/2012 | Kuo | H04W 12/06 |
| | | | | 380/272 |
| 2013/0215772 | A1* | 8/2013 | Kaur | H04W 76/15 |
| | | | | 370/252 |
| 2014/0181904 | A1* | 6/2014 | Craig | H04L 63/0892 |
| | | | | 726/3 |
| 2014/0286243 | A1* | 9/2014 | Yamada | H04W 12/08 |
| | | | | 370/329 |
| 2014/0286305 | A1* | 9/2014 | Yamada | H04W 36/165 |
| | | | | 370/331 |
| 2015/0029955 | A1* | 1/2015 | Heo | H04B 7/0695 |
| | | | | 370/329 |
| 2015/0092942 | A1* | 4/2015 | Wager | H04W 12/0401 |
| | | | | 380/270 |
| 2015/0126154 | A1* | 5/2015 | Yang | H04W 36/28 |
| | | | | 455/411 |
| 2015/0208235 | A1* | 7/2015 | Ingale | H04W 80/02 |
| | | | | 455/411 |
| 2015/0319801 | A1* | 11/2015 | Lee | H04W 74/0833 |
| | | | | 370/329 |
| 2015/0365822 | A1* | 12/2015 | Sharma | H04W 12/04031 |
| | | | | 455/410 |
| 2016/0014647 | A1* | 1/2016 | Yi | H04W 36/0072 |
| | | | | 370/331 |
| 2016/0021581 | A1* | 1/2016 | Deenoo | H04W 36/0055 |
| | | | | 370/331 |
| 2016/0065362 | A1* | 3/2016 | Choyi | H04W 12/04 |
| | | | | 380/279 |
| 2016/0135103 | A1* | 5/2016 | Lee | H04W 36/08 |
| | | | | 455/444 |
| 2016/0157095 | A1* | 6/2016 | Zhang | H04W 52/0209 |
| | | | | 380/273 |
| 2016/0191471 | A1* | 6/2016 | Ryoo | H04W 12/04031 |
| | | | | 455/411 |
| 2016/0234847 | A1* | 8/2016 | Zhang | H04W 36/0055 |
| 2016/0249210 | A1* | 8/2016 | Chang | H04W 12/04033 |
| 2016/0285716 | A1* | 9/2016 | Pelletier | H04L 43/0811 |
| 2016/0330617 | A1 | 11/2016 | Zhang et al. | |
| 2016/0337911 | A1* | 11/2016 | Engstrom | H04W 36/0061 |
| 2017/0150405 | A1* | 5/2017 | Chiba | H04W 36/0038 |
| 2017/0171748 | A1* | 6/2017 | Deng | H04W 76/30 |
| 2018/0160411 | A1 | 6/2018 | Zhang et al. | |

FOREIGN PATENT DOCUMENTS

| | | |
|---|---|---|
| CN | 101801096 A | 8/2010 |
| CN | 102440019 A | 5/2012 |
| CN | 102740289 A | 10/2012 |
| CN | 103139911 A | 6/2013 |
| EP | 2863668 A1 | 4/2015 |
| JP | 2017503413 A | 1/2017 |
| JP | 2017188907 A | 10/2017 |
| KR | 20090059074 A | 6/2009 |
| WO | 2013185579 A1 | 12/2013 |

OTHER PUBLICATIONS

3GPP TS 33.401 V10.5.0 (Jun. 2013), 3rd Generation Partnership Project; Technical Specification Group Services and System Aspects; 3GPP System Architecute Evolution (SAE); Security Architecture (Release 10), 116 pages.

3GPP TS 36.300 V10.11.0 (Sep. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); 195 pages.

3GPP TS 36.321 V10.9.0 (Jun. 2013); 3rd Generation Partnership Project; Technical Specification Group Radio Access Network; Evolved Universal Terrestrial Radio Access (E-UTRA); Medium Access Control (MAC) protocol specification (Release 10); 54 pages.

3GPP TS 36.331 V9.16.0 (Sep. 2013); 3rd Generation Partnership Project; Technical Specification Group Radio Access Network; Evolved Universal Terrestrial Radio Access (E-UTRA); Radio Resource Control (RRC); Protocol specification (Release 9); 262 pages.

3GPP TS 36.423 V11.7.0 (Dec. 2013); 3rd Generation Partnership Project; Technical Specification Group Radio Access Network; Evolved Universal Terrestrial Radio Access Network (E-UTRAN); X2 application protocol (X2AP) (Release 11); 144 pages.

Samsung, "Discussion on Security Aspects of SCE UP Architecture" 3GPP TSG RAN WG2 Meeting #84, San Francisco, USA, Nov. 11-15, 2013, R2-134278, 7.2.1, 4 pages.

Huawei et al., "Security for SCE arc. 1A", section 8.1.1.1, R2-134626 (TR36.842 v1.00), S3-140026 Security for SCE ARC. 1A, XP050745165, 3GPP TSG SA WG3 (Security) Meeting #74 20-24 Jan. 19, 2014; Taipei (Taiwan), 8 pages.

3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331, V11.0.0 (Jun. 2012), 302 pages.

* cited by examiner

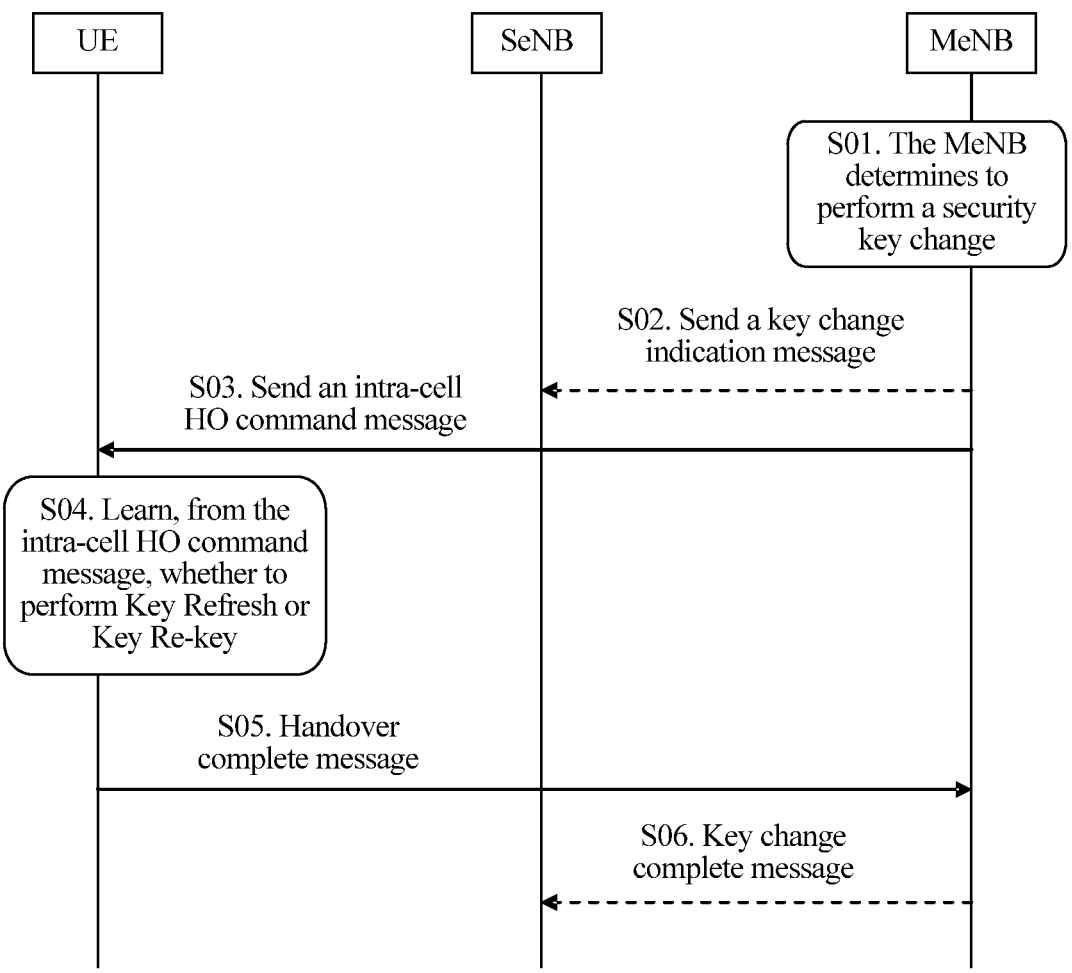
FIG. 3-a

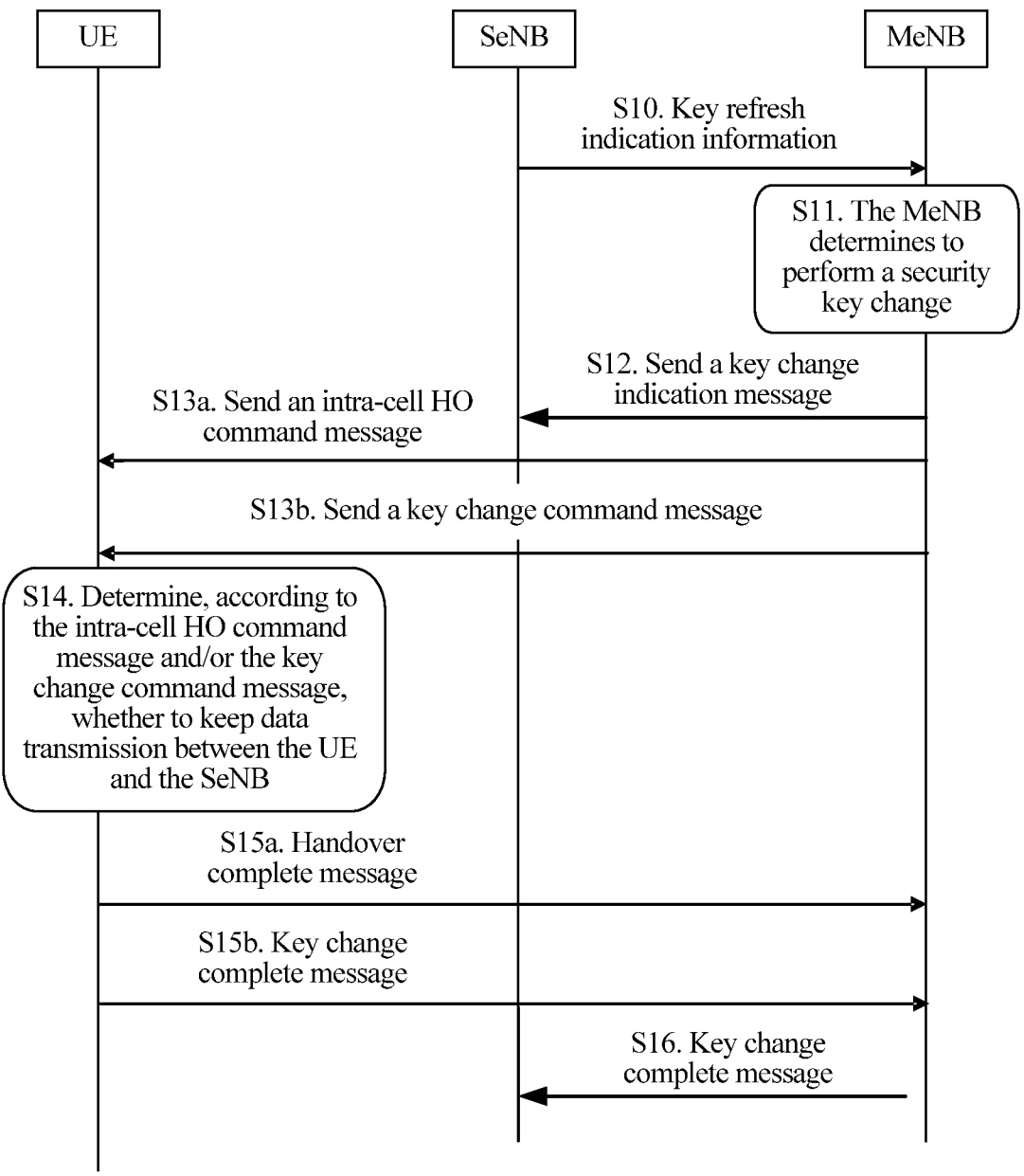
FIG. 3-b

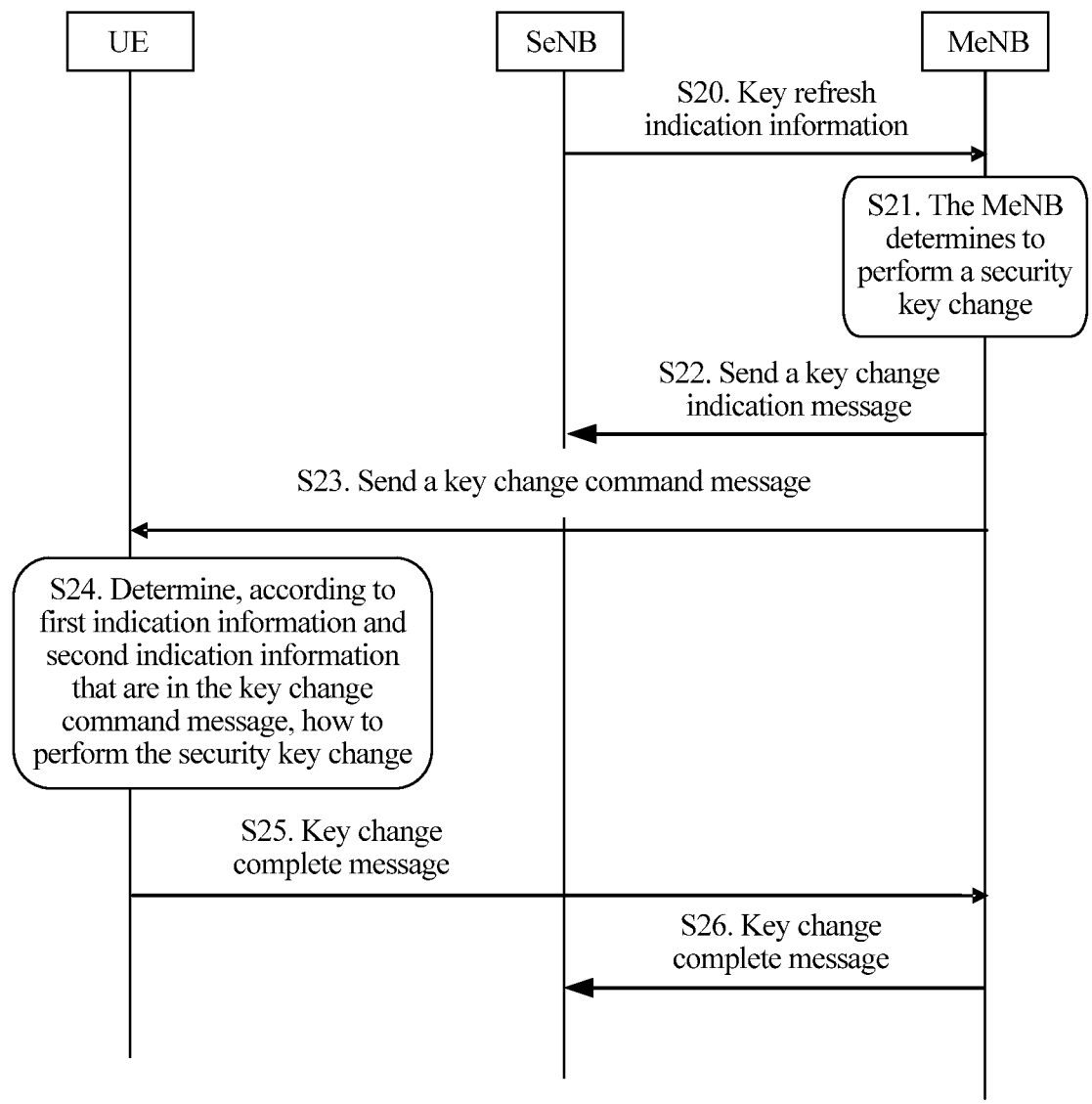
FIG. 3-c

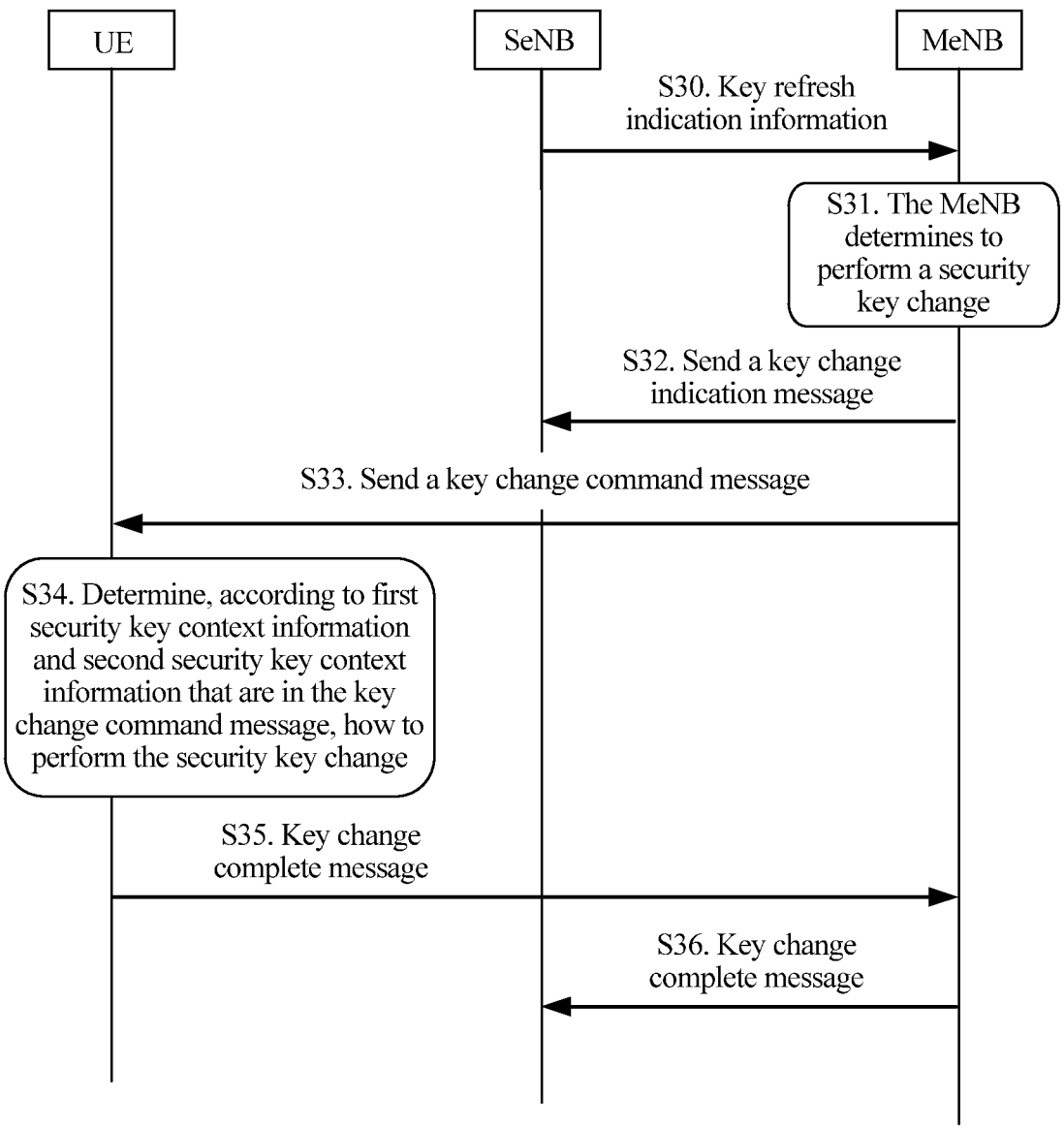
FIG. 3-d

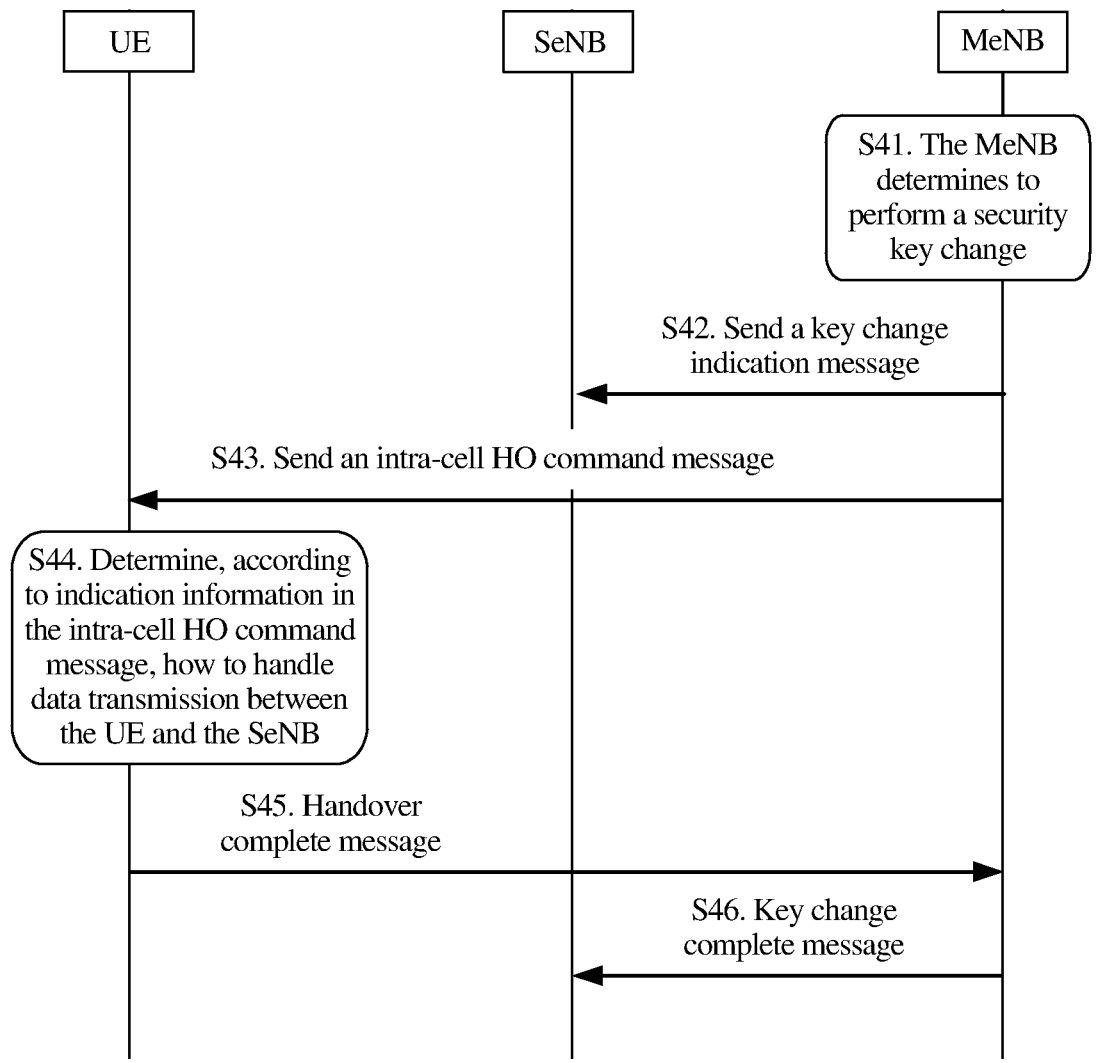
FIG. 3-e

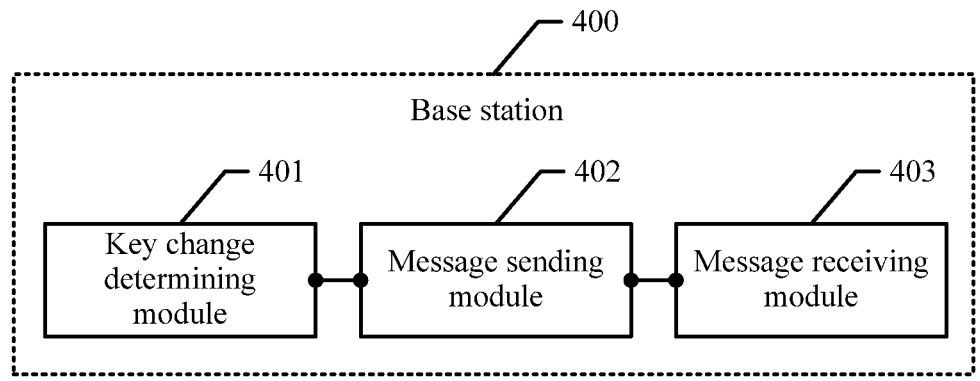
FIG. 4-a
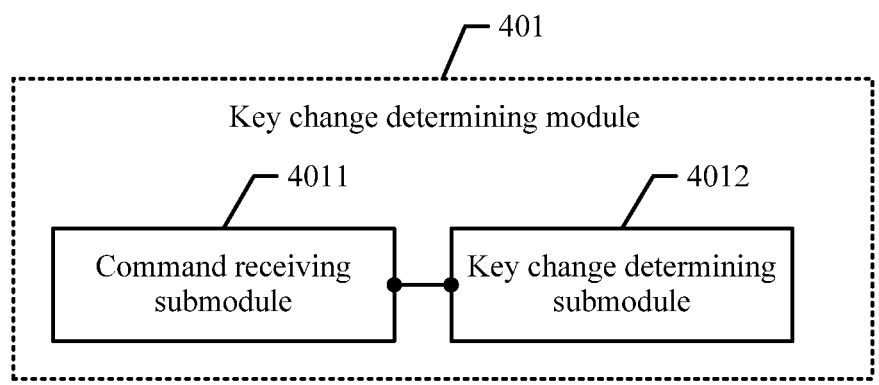
FIG. 4-b
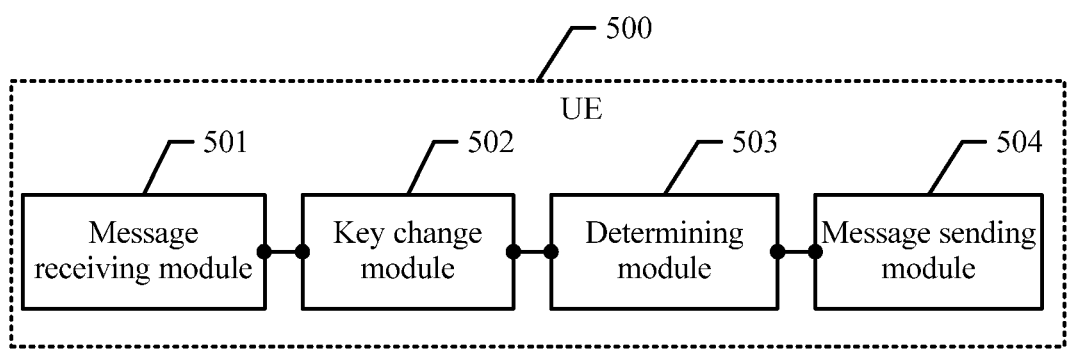
FIG. 5-a

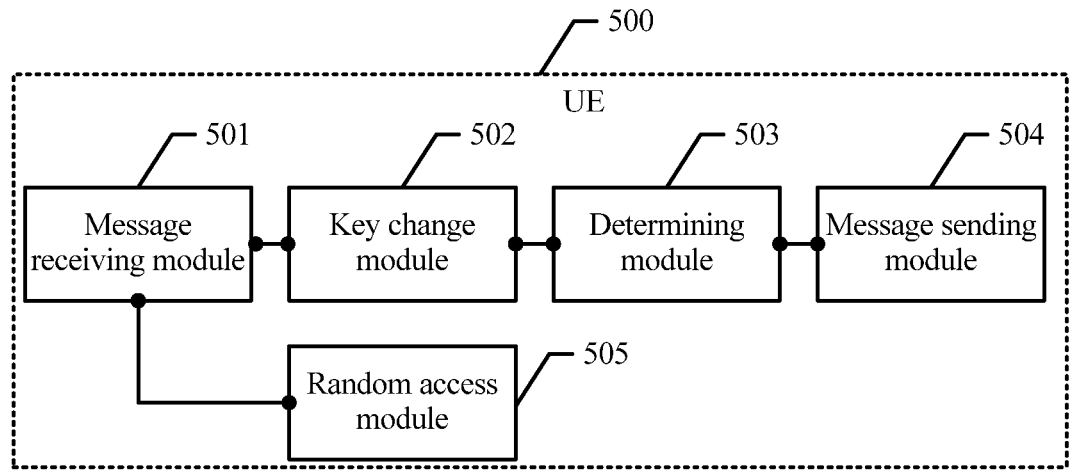
FIG. 5-b
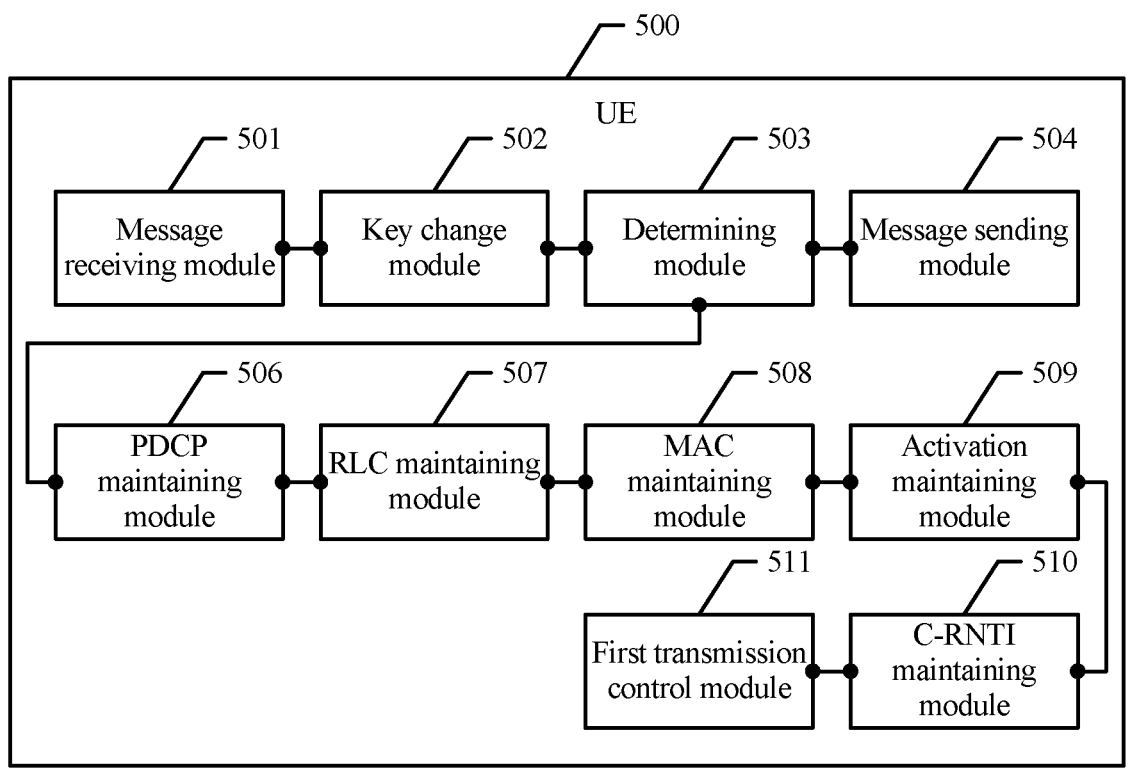
FIG. 5-c

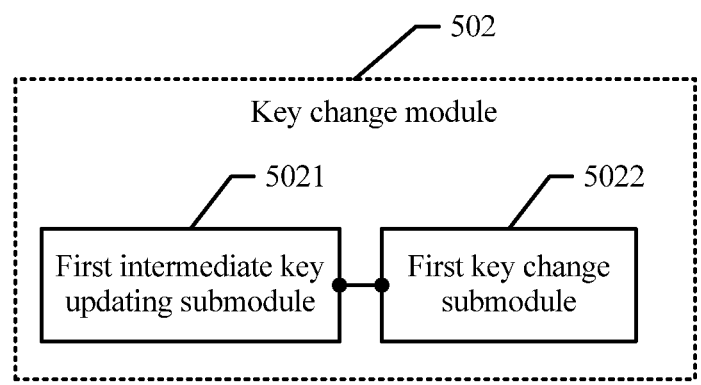
FIG. 5-d
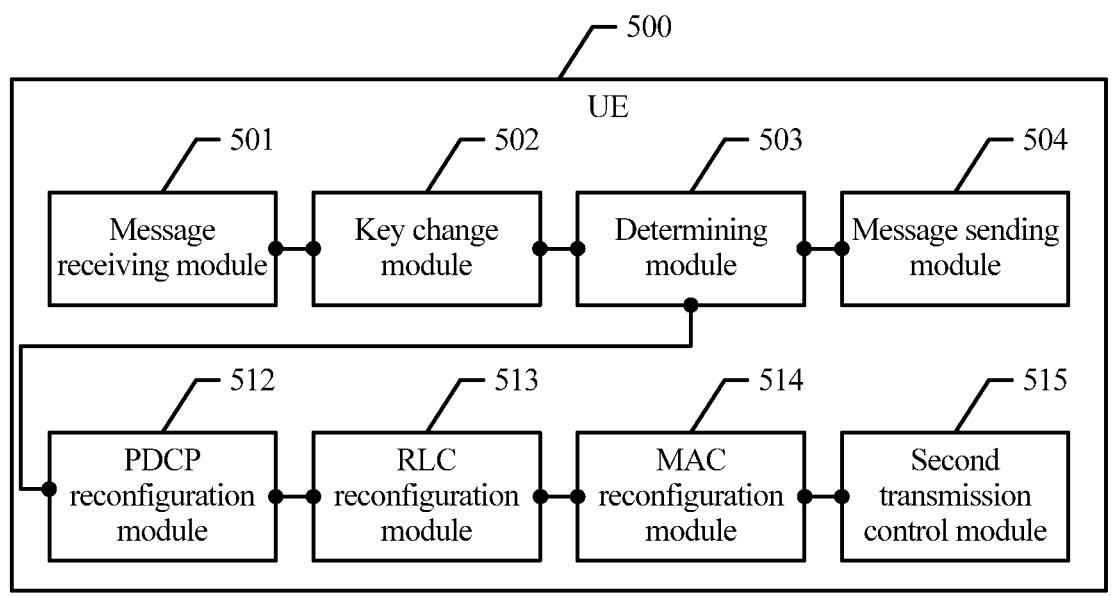
FIG. 5-e

SECURITY KEY CHANGE METHOD, BASE STATION, AND USER EQUIPMENT

CROSS-REFERENCE TO RELATED APPLICATIONS

This application is a continuation of International Application No. PCT/CN2014/071675, filed on Jan. 28, 2014, which is hereby incorporated by reference in its entirety.

TECHNICAL FIELD

Embodiments of the present invention relate to the communications field, and in particular, to a security key change method, a base station, and user equipment.

BACKGROUND

At present, to improve a transmission rate of a wireless network, the 3rd Generation Partnership Project (3GPP) organization is discussing establishment of a new research project on small cell enhancement.

During small cell deployment in the prior art, a low frequency band carrier and a high frequency band carrier are usually used. For example, as a low frequency band carrier, a frequency F1 features a large coverage area but relatively rare resources; as a high frequency band carrier, F2 features a small coverage area but relatively abundant resources. In an existing cellular network, a low frequency band carrier is generally used; for example, the F1 is used to provide a service for users. However, with popularization of smartphones, a user sets a stricter requirement on a wireless transmission rate. To meet the user requirement, the abundant high frequency band carrier resources need to be used step by step to provide a service for users. Because a high frequency band carrier features small coverage, a base station (evolved NodeB (eNB)) that uses a high frequency band carrier for small coverage is generally referred to as a micro base station, and a coverage area of the micro base station is generally referred to as a small cell. Generally, a macro base station is selected as a master eNodeB (MeNB), and a micro base station is selected as a secondary eNodeB (SeNB). There may be multiple cells for an MeNB. One cell is selected from the multiple cells as a primary cell (PCell) to provide a service for user equipment (UE), and another cell may be a secondary cell (SCell). In addition, a cell of a secondary eNodeB is generally selected as a secondary cell to provide a service for the UE. A manner in which the UE may perform communication by using radio resources provided by both the MeNB and the SeNB is defined as dual connectivity communication. The dual connectivity communication is increasingly used in data transmission between a base station and a UE due to high data transmission efficiency and a high throughput.

A security key is usually required during data transmission between a base station and a UE. However, in some cases, the security key needs to be changed. In a Long Term Evolution (LTE) system, a process of changing a security key may be completed in an intra-cell handover process, where the intra-cell handover process means that a source cell and a target cell are a same cell of a base station when the UE performs handover, that is, primary cells before and after the handover are a same cell, and do not change.

In a process of implementing the embodiments, the inventor finds that at least the following disadvantage exists in the prior art: an existing security key change method is applicable to a security key change when a UE performs data transmission with only one base station, but a related implementation solution for changing a security key is not provided for an application scenario in which the UE performs dual connectivity communication with an MeNB and an SeNB.

SUMMARY

Embodiments provide a security key change method, a base station, and user equipment to implement a security key change when the UE performs dual connectivity communication with both an MeNB and an SeNB.

According to a first aspect, an embodiment provides a security key change method, including determining, by a master eNodeB MeNB, that a security key change needs to be performed between a first base station and user equipment UE, where the first base station includes at least one of the master eNodeB and a secondary eNodeB. The method also includes sending, by the master eNodeB, a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB. Additionally, the method includes receiving, by the master eNodeB, a key change complete message sent by the UE, so that the first base station determines that the security key change between the UE and the first base station is completed.

With reference to the first aspect, in a first possible implementation manner of the first aspect, if the first base station determined by the master eNodeB includes the secondary eNodeB, after the receiving, by the master eNodeB, a key change complete message sent by the UE, the method further includes: forwarding, by the master eNodeB, the key change complete message to the secondary eNodeB, so that the secondary eNodeB determines that the security key change between the UE and the secondary eNodeB is completed.

With reference to the first aspect, in a second possible implementation manner of the first aspect, the key change command message carries indication information indicating whether the UE performs random access to the first base station.

With reference to the second possible implementation manner of the first aspect, in a third possible implementation manner of the first aspect, if the key change command message indicates that the UE performs random access to the first base station, the sending, by the master eNodeB, a key change command message to the UE includes: sending, by the master eNodeB, the UE a key change command message that includes information about a random access resource, so that the UE performs random access to the first base station according to the information about the random access resource.

With reference to the first aspect, in a fourth possible implementation manner of the first aspect, the determining, by a master eNodeB MeNB, that a security key change needs to be performed between a first base station and user equipment UE includes: receiving, by the master eNodeB, a key indication command sent by a mobility management entity MME, where the key indication command is used to instruct to perform key re-key Key Re-key between the master eNodeB and the UE and/or instruct to perform Key Re-key between the secondary eNodeB and the UE; and determining, by the master eNodeB according to the key indication command, that Key Re-key is to be performed between the first base station and the UE.

With reference to the fourth possible implementation manner of the first aspect, in a fifth possible implementation manner of the first aspect, if the master eNodeB determines that Key Re-key is to be performed between the first base station and the UE, the key change command message carries cell information, associated with the security key change, of the secondary eNodeB or base station information, associated with the security key change, of the secondary eNodeB.

With reference to the first aspect, in a sixth possible implementation manner of the first aspect, if the first base station determined by the master eNodeB includes the secondary eNodeB, after the determining, by a master eNodeB MeNB, that a security key change needs to be performed between a first base station and user equipment UE, the method further includes: sending, by the master eNodeB, a key change indication message to the secondary eNodeB, where the key change indication message is used to instruct the secondary eNodeB to perform the security key change, and the key change indication message includes a secondary-eNodeB-side intermediate key generated by the master eNodeB according to an updated master-eNodeB-side intermediate key and cell information, associated with the security key change, of the secondary eNodeB or base station information, associated with the security key change, of the secondary eNodeB, or the key change indication message includes a secondary-eNodeB-side intermediate key generated by the MME for the secondary eNodeB.

With reference to the first aspect, in a seventh possible implementation manner of the first aspect, the determining, by a master eNodeB MeNB, that a security key change needs to be performed between a first base station and user equipment UE includes: determining, by the master eNodeB, whether a current Packet Data Convergence Protocol count PDCP Count of the UE on a master eNodeB side wraps around within preset times, and if the current PDCP Count of the UE on the master eNodeB side wraps around within the preset times, determining, by the master eNodeB, that the security key change needs to be performed between the first base station and the UE, and determining that a key refresh Key Refresh manner is to be used, where the first base station is the master eNodeB; and/or when the master eNodeB receives indication information that is sent by the secondary eNodeB and that indicates that a PDCP Count on a secondary eNodeB side wraps around within preset times, or the master eNodeB receives indication information that is sent by the secondary eNodeB and that indicates that the secondary eNodeB needs to perform Key Refresh, or the master eNodeB receives indication information that is reported by the UE and that indicates that a current PDCP Count on a secondary eNodeB side wraps around within preset times, determining, by the master eNodeB, that the security key change needs to be performed between the first base station and the UE, and determining that a Key Refresh manner is to be used, where the first base station is the secondary eNodeB.

With reference to the first aspect, or the first, the second, the third, the fourth, the fifth, the sixth, or the seventh possible implementation manner of the first aspect, in an eighth possible implementation manner of the first aspect, the key change command message includes first indication information and second indication information, the first indication information is used to indicate that the security key change needs to be performed between the master eNodeB and the UE, and the second indication information is used to indicate that the security key change needs to be performed between the secondary eNodeB and the UE.

With reference to the eighth possible implementation manner of the first aspect, in a ninth possible implementation manner of the first aspect, the first indication information is further used to indicate that a manner for performing the security key change between the master eNodeB and the UE is Key Re-key or Key Refresh; and the second indication information is further used to indicate that a manner for performing the security key change between the secondary eNodeB and the UE is Key Re-key or Key Refresh.

With reference to the first aspect, or the first, the second, the third, the fourth, the fifth, the sixth, or the seventh possible implementation manner of the first aspect, in a tenth possible implementation manner of the first aspect, the key change command message includes first security key context information and second security key context information, where the first security key context information is used to indicate that the security key change needs to be performed between the master eNodeB and the UE, and the second security key context information is used to indicate that the security key change needs to be performed between the secondary eNodeB and the UE.

With reference to the tenth possible implementation manner of the first aspect, in an eleventh possible implementation manner of the first aspect, the first security key context information is further used to indicate that a manner for performing the security key change between the master eNodeB and the UE is Key Re-key or Key Refresh; and the second security key context information is further used to indicate that a manner for performing the security key change between the secondary eNodeB and the UE is Key Re-key or Key Refresh.

With reference to the first aspect, in a twelfth possible implementation manner of the first aspect, the key change command message indicates, by using a value of a key change indicator Key Change Indicator field, that a manner for performing the security key change between the first base station and the UE is Key Re-key or Key Refresh.

With reference to the first aspect, in a thirteenth possible implementation manner of the first aspect, the key change command message carries indication information indicating that the UE keeps data transmission between the UE and a second base station, or indicating that the UE suspends data transmission between the UE and the first base station, or indicating that the UE stops data transmission between the UE and the first base station, where when the second base station is the master eNodeB, the first base station is the secondary eNodeB, or when the second base station is the secondary eNodeB, the second base station is the master eNodeB.

With reference to the first aspect, or the first, the second, the third, the fourth, the fifth, the sixth, the seventh, the eighth, the ninth, the tenth, the eleventh, the twelfth, or the thirteenth possible implementation manner of the first aspect, in a fourteenth possible implementation manner of the first aspect, the key change command message is specifically an intra-cell handover HO command message.

According to a second aspect, an embodiment provides another security key change method, including receiving, by user equipment UE, a key change command message sent by a master eNodeB, where the key change command message includes indication information that the master eNodeB commands that a security key change be performed between the UE and a first base station, where the first base station includes at least one of the master eNodeB and a secondary eNodeB and performing, by the UE according to the key change command message, the security key change between the UE and the first base station. The method also includes determining, by the UE according to the key change command message, whether to keep access stratum configuration information between the UE and the master eNodeB or the secondary eNodeB and/or whether to keep data transmission between the UE and the master eNodeB or the secondary eNodeB; and sending, by the UE, a key change complete message to the master eNodeB, so that the first base station determines that the security key change between the UE and the first base station is completed.

With reference to the second aspect, in a first possible implementation manner of the second aspect, the key change command message carries indication information indicating whether the UE performs random access to the first base station, and after the receiving, by UE, a key change command message sent by a master eNodeB, the method further includes: determining, by the UE according to the indication information that is carried in the key change command message and that indicates whether the UE performs random access to the first base station, whether to perform random access to the first base station.

With reference to the second aspect or the first possible implementation manner of the second aspect, in a second possible implementation manner of the second aspect, if the key change command message indicates that the UE performs random access to the first base station, the receiving, by UE, a key change command message sent by a master eNodeB includes: receiving, by the UE, a key change command message that is sent by the master eNodeB and that includes information about a random access resource, and performing random access to the first base station according to the information about the random access resource.

With reference to the second aspect, in a third possible implementation manner of the second aspect, if the indication information included in the key change command message received by the UE includes first indication information and second indication information, where the first indication information is used to indicate that the security key change needs to be performed between the master eNodeB and the UE, and the second indication information is used to indicate that the security key change needs to be performed between the secondary eNodeB and the UE, the UE determines, according to the first indication information and/or the second indication information, that the first base station is in one of the following three conditions: the first base station is the master eNodeB, the first base station is the secondary eNodeB, and the first base station is the master eNodeB and the secondary eNodeB.

With reference to the third possible implementation manner of the second aspect, in a fourth possible implementation manner of the second aspect, the first indication information is further used to indicate that a manner for performing the security key change between the master eNodeB and the UE is Key Re-key or Key Refresh, and the performing, by the UE according to the key change command message, the security key change between the UE and the first base station is specifically: performing, by the UE according to the first indication information, the security key change between the UE and the master eNodeB in a Key Re-key or Key Refresh manner; and the second indication information is further used to indicate that a manner for performing the security key change between the secondary eNodeB and the UE is Key Re-key or Key Refresh, and the performing, by the UE according to the key change command message, the security key change between the UE and the first base station is specifically: performing, by the UE according to the second indication information, the security key change between the UE and the secondary eNodeB in the Key Re-key or Key Refresh manner.

With reference to the second aspect, in a fifth possible implementation manner of the second aspect, if the indication information included in the key change command message received by the UE includes first security key context information and second security key context information, where the first security key context information is used to indicate that the security key change needs to be performed between the master eNodeB and the UE, and the second security key context information is used to indicate that the security key change needs to be performed between the secondary eNodeB and the UE, the UE determines, according to the first security key context information and/or the second security key context information, that the first base station is in one of the following three conditions: the first base station is the master eNodeB, the first base station is the secondary eNodeB, and the first base station is the master eNodeB and the secondary eNodeB.

With reference to the fifth possible implementation manner of the second aspect, in a sixth possible implementation manner of the second aspect, the first security key context information is further used to indicate that a manner for performing the security key change between the master eNodeB and the UE is Key Re-key or Key Refresh, and the performing, by the UE according to the key change command message, the security key change between the UE and the first base station is specifically: performing, by the UE according to the first security key context information, the security key change between the UE and the master eNodeB in a Key Re-key or Key Refresh manner; and the second security key context information is further used to indicate that a manner for performing the security key change between the secondary eNodeB and the UE is Key Re-key or Key Refresh, and the performing, by the UE according to the key change command message, the security key change between the UE and the first base station is specifically: determining, by the UE according to the second security key context information, to perform the security key change between the UE and the secondary eNodeB in the Key Re-key or Key Refresh manner.

With reference to the second aspect, in a seventh possible implementation manner of the second aspect, if the indication information included in the key change command message is a key change indicator Key Change Indicator field, the performing, by the UE according to the key change command message, the security key change between the UE and the first base station is specifically: determining, by the UE by using a value of the Key Change Indicator field, to perform the security key change between the UE and the first base station in a Key Re-key or Key Refresh manner.

With reference to the second aspect, in an eighth possible implementation manner of the second aspect, the determining, by the UE according to the key change command information, whether to keep access stratum configuration information between the UE and the master eNodeB or the secondary eNodeB includes: determining, by the UE according to first indication information and second indication information that are included in the key change command message, whether to keep the access stratum configuration information between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determining, by the UE according to first security key context information and second security key context information that are included in the key change command message, whether to keep the access stratum configuration information between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determining, by the UE according to a key change indicator Key Change Indicator field included in the key change command message, whether to keep the access stratum configuration information between the UE and the master eNodeB or the secondary eNodeB; or determining, by the UE according to indication information that is included in the key change command message and that indicates that the UE keeps data transmission between the UE and the master eNodeB or the secondary eNodeB, whether to keep the access stratum configuration information between the UE and the master eNodeB or the secondary eNodeB.

With reference to the eighth possible implementation manner of the second aspect, in a ninth possible implementation manner of the second aspect, the determining, by the UE according to a Key Change Indicator field included in the key change command message, whether to keep the access stratum configuration information between the UE and the master eNodeB or the secondary eNodeB includes: when determining, according to the Key Change Indicator field, that Key Re-key needs to be performed, determining, by the UE, not to keep the access stratum configuration information between the UE and the master eNodeB or the secondary eNodeB; or when determining, according to the Key Change Indicator field, that Key Refresh needs to be performed based on a UE-side intermediate key corresponding to the master eNodeB, determining, by the UE, to keep the access stratum configuration information between the UE and the master eNodeB or the secondary eNodeB; or when determining, according to the Key Change Indicator field, that Key Refresh needs to be performed based on a next hop NH, determining, by the UE, to keep the access stratum configuration information between the UE and the master eNodeB or the secondary eNodeB.

With reference to the second aspect, in a tenth possible implementation manner of the second aspect, the determining, by the UE according to the key change command information, whether to keep data transmission between the UE and the master eNodeB or the secondary eNodeB includes: determining, by the UE according to first indication information and second indication information that are included in the key change command message, whether to keep data transmission between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determining, by the UE according to first security key context information and second security key context information that are included in the key change command message, whether to keep data transmission between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determining, by the UE according to a Key Change Indicator field included in the key change command message, whether to keep data transmission between the UE and the master eNodeB or the secondary eNodeB; or determining, by the UE according to indication information that is included in the key change command message and that indicates that the UE keeps data transmission between the UE and the master eNodeB or the secondary eNodeB, whether to keep data transmission between the UE and the master eNodeB or the secondary eNodeB.

With reference to the tenth possible implementation manner of the second aspect, in an eleventh possible implementation manner of the second aspect, the determining, by the UE according to a Key Change Indicator field included in the key change command message, whether to keep data transmission between the UE and the master eNodeB or the secondary eNodeB includes: when determining, according to the Key Change Indicator field, that Key Re-key needs to be performed, determining, by the UE, not to keep data transmission between the UE and the master eNodeB or between the UE and the secondary eNodeB; or when determining, according to the Key Change Indicator field, that Key Refresh needs to be performed based on a UE-side intermediate key corresponding to the master eNodeB, determining, by the UE, to keep data transmission between the UE and the secondary eNodeB; or when determining, according to the Key Change Indicator field, that Key Refresh needs to be performed based on an NH, determining, by the UE, to keep data transmission between the UE and the secondary eNodeB.

With reference to the second aspect, in a twelfth possible implementation manner of the second aspect, when the UE determines, according to the key change command information, that the access stratum configuration information between the UE and the master eNodeB needs to be kept, and/or that data transmission between the UE and the master eNodeB needs to be kept, keeping the access stratum configuration information between the UE and the master eNodeB and/or keeping data transmission between the UE and the master eNodeB includes at least one of the following steps: keeping, by the UE, Packet Data Convergence Protocol PDCP configurations of all radio bearers RBs established between the UE and the master eNodeB; keeping, by the UE, Radio Link Control RLC configurations of all RBs established between the UE and the master eNodeB; keeping, by the UE, Medium Access Control MAC configurations of all RBs established between the UE and the master eNodeB; keeping, by the UE, an active state of an activated secondary cell SCell between the UE and the master eNodeB; keeping, by the UE, a cell radio network temporary identifier C-RNTI used for communication between the UE and the master eNodeB; and keeping or suspending, by the UE, data transmission between the UE and the master eNodeB.

With reference to the second aspect, in a thirteenth possible implementation manner of the second aspect, when the UE determines, according to the key change command information, that the access stratum configuration information between the UE and the secondary eNodeB needs to be kept, and/or that data transmission between the UE and the secondary eNodeB needs to be kept, keeping the access stratum configuration information between the UE and the secondary eNodeB and/or keeping data transmission between the UE and the secondary eNodeB includes at least one of the following steps: keeping, by the UE, PDCP configurations of all RBs established between the UE and the secondary eNodeB; keeping, by the UE, RLC configurations of all RBs established between the UE and the secondary eNodeB; keeping, by the UE, MAC configurations of all RBs established between the UE and the secondary eNodeB; keeping, by the UE, an active state of an activated SCell between the UE and the secondary eNodeB; keeping, by the UE, a C-RNTI used for communication between the UE and the secondary eNodeB; and keeping or suspending, by the UE, data transmission between the UE and the secondary eNodeB.

With reference to the second aspect, or the first, the second, the third, the fourth, the fifth, the sixth, the seventh, the eighth, the ninth, the tenth, the eleventh, the twelfth, or the thirteenth possible implementation manner of the second aspect, in a fourteenth possible implementation manner of the second aspect, the performing, by the UE according to the key change command message, the security key change between the UE and the first base station includes: when the first base station is the master eNodeB, if the UE determines, according to the key change command message, that the manner for performing the security key change between the master eNodeB and the UE is Key Refresh, performing, by the UE, the security key change between the UE and the master eNodeB in the Key Refresh manner; and after the determining, by the UE according to the key change command message, whether to keep access stratum configuration information between the UE and the master eNodeB or the secondary eNodeB and/or whether to keep data transmission between the UE and the master eNodeB or the secondary eNodeB, the method further includes at least one of the following steps: keeping, by the UE, the Packet Data Convergence Protocol PDCP configurations of all the radio bearers RBs established between the UE and the secondary eNodeB; keeping, by the UE, the Radio Link Control RLC configurations of all the RBs established between the UE and the secondary eNodeB; keeping, by the UE, the Medium Access Control MAC configurations of all the RBs established between the UE and the secondary eNodeB; keeping, by the UE, the active state of the activated secondary cell SCell between the UE and the secondary eNodeB; keeping, by the UE, the cell radio network temporary identifier C-RNTI used for communication between the UE and the secondary eNodeB; and keeping or suspending, by the UE, data transmission between the UE and the secondary eNodeB.

With reference to the fourteenth possible implementation manner of the second aspect, in a fifteenth possible implementation manner of the second aspect, the performing, by the UE, the security key change between the UE and the master eNodeB in the Key Refresh manner includes: updating, by the UE, based on a next hop chaining count Next Hop Chaining Count value indicated by the key change command message and by using a current UE-side intermediate key corresponding to the master eNodeB or a next hop NH, the UE-side intermediate key corresponding to the master eNodeB; and generating, by the UE by using an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

With reference to the fifteenth possible implementation manner of the second aspect, in a sixteenth possible implementation manner of the second aspect, before the determining, by the UE according to the key change command message, whether to keep access stratum configuration information between the UE and the master eNodeB or the secondary eNodeB and/or whether to keep data transmission between the UE and the master eNodeB or the secondary eNodeB, the method further includes: determining, by the UE, that the performing the security key change between the UE and the master eNodeB in the Key Refresh manner is based on the current UE-side intermediate key corresponding to the master eNodeB.

With reference to the fourteenth possible implementation manner of the second aspect, in a seventeenth possible implementation manner of the second aspect, that the UE determines, according to the key change command message, that the manner for performing the security key change between the master eNodeB and the UE is Key Refresh is specifically: determining, by the UE according to the first indication information or the first security key context information or security context information that is carried in the key change command message, that the manner for performing the security key change between the master eNodeB and the UE is Key Refresh.

With reference to the second aspect, or the first, the second, the third, the fourth, the fifth, the sixth, the seventh, the eighth, the ninth, the tenth, the eleventh, the twelfth, or the thirteenth possible implementation manner of the second aspect, in an eighteenth possible implementation manner of the second aspect, the performing, by the UE according to the key change command message, the security key change between the UE and the first base station includes: when the first base station is the master eNodeB, if the UE determines, according to the key change command message, that the manner for performing the security key change between the master eNodeB and the UE is Key Re-key, performing, by the UE, the security key change between the UE and the master eNodeB in the Key Re-key manner; and after the determining, by the UE according to the key change command message, whether to keep access stratum configuration information between the UE and the master eNodeB or the secondary eNodeB and/or whether to keep data transmission between the UE and the master eNodeB or the secondary eNodeB, the method further includes at least one of the following steps: reconfiguring, by the UE, the PDCP configurations of all the RBs established between the UE and the master eNodeB; reconfiguring, by the UE, the PDCP configurations of all the RBs established between the UE and the secondary eNodeB; reconfiguring, by the UE, the RLC configurations of all the RBs established between the UE and the master eNodeB; reconfiguring, by the UE, the RLC configurations of all the RBs established between the UE and the secondary eNodeB; reconfiguring, by the UE, the MAC configurations of all the RBs established between the UE and the master eNodeB; reconfiguring, by the UE, the MAC configurations of all the RBs established between the UE and the secondary eNodeB; stopping, by the UE, data transmission between the UE and the master eNodeB; and stopping, by the UE, data transmission between the UE and the secondary eNodeB.

With reference to the eighteenth possible implementation manner of the second aspect, in a nineteenth possible implementation manner of the second aspect, the performing, by the UE, the security key change between the UE and the master eNodeB in the Key Re-key manner includes: updating, by the UE, a UE-side intermediate key between the UE and the master eNodeB based on an updated access security management entity ASME intermediate key; and generating, by the UE according to an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

With reference to the nineteenth possible implementation manner of the second aspect, in a twentieth possible implementation manner of the second aspect, after the updating, by the UE, a UE-side intermediate key between the UE and the master eNodeB based on an updated access security management entity ASME intermediate key, the method further includes: updating, by the UE according to the updated master-eNodeB-side intermediate key and cell information, associated with the security key change, of the secondary eNodeB or base station information, associated with the security key change, of the secondary eNodeB, a UE-side intermediate key corresponding to the secondary eNodeB; and generating, by the UE according to an updated UE-side intermediate key corresponding to the secondary eNodeB and a security algorithm of the secondary eNodeB, a new security key corresponding to the secondary eNodeB, where the new security key corresponding to the secondary eNodeB includes a cipher key used for communication between the UE and the secondary eNodeB.

With reference to the eighteenth possible implementation manner of the second aspect, in a twenty-first possible implementation manner of the second aspect, that the UE determines, according to the indication information included in the key change command message, that the manner for performing the security key change between the master eNodeB and the UE is Key Re-key is specifically: determining, by the UE according to the first indication information or the first security key context information or security context information that is carried in the key change command message, that the manner for performing the security key change between the master eNodeB and the UE is Key Re-key.

With reference to the second aspect, or the first, the second, the third, the fourth, the fifth, the sixth, the seventh, the eighth, the ninth, the tenth, the eleventh, the twelfth, or the thirteenth possible implementation manner of the second aspect, in a twenty-second possible implementation manner of the second aspect, if the indication information included in the key change command message indicates that the UE keeps data transmission between the UE and a second base station, after the determining, by the UE according to the key change command message, whether to keep access stratum configuration information between the UE and the master eNodeB or the secondary eNodeB and/or whether to keep data transmission between the UE and the master eNodeB or the secondary eNodeB, the method further includes at least one of the following steps: keeping, by the UE, PDCP configurations of all RBs established between the UE and the second base station, where when the second base station is the master eNodeB, the first base station is the secondary eNodeB, or when the second base station is the secondary eNodeB, the second base station is the master eNodeB; keeping, by the UE, RLC configurations of all RBs established between the UE and the second base station; keeping, by the UE, MAC configurations of all RBs established between the UE and the second base station; keeping, by the UE, an active state of an activated SCell between the UE and the second base station; keeping, by the UE, a C-RNTI used for communication between the UE and the second base station; and keeping, by the UE, data transmission between the UE and the second base station.

With reference to the second aspect, or the first, the second, the third, the fourth, the fifth, the sixth, the seventh, the eighth, the ninth, the tenth, the eleventh, the twelfth, or the thirteenth possible implementation manner of the second aspect, in a twenty-third possible implementation manner of the second aspect, if the key change command message carries indication information indicating that the UE suspends data transmission between the UE and the first base station, after the determining, by the UE according to the key change command message, whether to keep access stratum configuration information between the UE and the master eNodeB or the secondary eNodeB and/or whether to keep data transmission between the UE and the master eNodeB or the secondary eNodeB, the method further includes at least one of the following steps: keeping, by the UE, PDCP configurations of all RBs established between the UE and the first base station; keeping, by the UE, RLC configurations of all RBs established between the UE and the first base station; keeping, by the UE, MAC configurations of all RBs established between the UE and the first base station; keeping, by the UE, an active state of an activated SCell between the UE and the first base station; keeping, by the UE, a C-RNTI used for communication between the UE and the first base station; and suspending, by the UE, data transmission between the UE and the first base station.

With reference to the second aspect, or the first, the second, the third, the fourth, the fifth, the sixth, the seventh, the eighth, the ninth, the tenth, the eleventh, the twelfth, or the thirteenth possible implementation manner of the second aspect, in a twenty-fourth possible implementation manner of the second aspect, if the key change command message carries indication information indicating that the UE stops data transmission between the UE and the first base station, after the determining, by the UE according to the key change command message, whether to keep access stratum configuration information between the UE and the master eNodeB or the secondary eNodeB and/or whether to keep data transmission between the UE and the master eNodeB or the secondary eNodeB, the method further includes at least one of the following steps: reconfiguring, by the UE, PDCP configurations of all RBs established between the UE and the first base station; reconfiguring, by the UE, RLC configurations of all RBs established between the UE and the first base station; reconfiguring, by the UE, MAC configurations of all RBs established between the UE and the first base station; and stopping, by the UE, data transmission between the UE and the first base station.

According to a third aspect, an embodiment further provides a base station, where the base station is specifically a master eNodeB, and includes: a key change determining module, configured to determine that a security key change needs to be performed between a first base station and user equipment UE, where the first base station includes at least one of the master eNodeB and a secondary eNodeB; a message sending module, configured to send a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB; and a message receiving module, configured to receive a key change complete message sent by the UE, so that the first base station determines that the security key change between the UE and the first base station is completed.

With reference to the third aspect, in a first possible implementation manner of the third aspect, if the first base station determined by the master eNodeB includes the secondary eNodeB, the message sending module is further configured to: after the message receiving module receives the key change complete message sent by the UE, forward the key change complete message to the secondary eNodeB, so that the secondary eNodeB determines that the security key change between the UE and the secondary eNodeB is completed.

With reference to the third aspect, in a second possible implementation manner of the third aspect, the key change command message carries indication information indicating whether the UE performs random access to the first base station.

With reference to the second possible implementation manner of the third aspect, in a third possible implementation manner of the third aspect, if the key change command message indicates that the UE performs random access to the first base station, the message sending module is specifically configured to send the UE the key change command message that includes information about a random access resource, so that the UE performs random access to the first base station according to the information about the random access resource.

With reference to the third aspect, in a fourth possible implementation manner of the third aspect, the key change determining module includes: a command receiving submodule, configured to receive a key indication command sent by a mobility management entity MME, where the key indication command is used to instruct to perform Key Re-key between the master eNodeB and the UE and/or instruct to perform Key Re-key between the secondary eNodeB and the UE; and a key change determining submodule, configured to determine, according to the key indication command, that Key Re-key is to be performed between the first base station and the UE.

With reference to the fourth possible implementation manner of the third aspect, in a fifth possible implementation manner of the third aspect, if the master eNodeB determines that a manner for performing the security key change between the first base station and the UE is Key Re-key, the key change command message carries cell information, associated with the security key change, of the secondary eNodeB or base station information, associated with the security key change, of the secondary eNodeB.

With reference to the third aspect, in a sixth possible implementation manner of the third aspect, if the first base station determined by the master eNodeB includes the secondary eNodeB, the message sending module is further configured to: after the key change determining submodule determines, according to the key indication command, that the security key change needs to be performed between the first base station and the UE, send a key change indication message to the secondary eNodeB, where the key change indication message is used to instruct the secondary eNodeB to perform the security key change, and the key change indication message includes a secondary-eNodeB-side intermediate key generated by the master eNodeB according to an updated master-eNodeB-side intermediate key and cell information, associated with the security key change, of the secondary eNodeB or base station information, associated with the security key change, of the secondary eNodeB, or the key change indication message includes a secondary-eNodeB-side intermediate key generated by the MME for the secondary eNodeB.

With reference to the third aspect, in a seventh possible implementation manner of the third aspect, the key change determining module is specifically configured to: determine whether a current Packet Data Convergence Protocol count PDCP Count of the UE on a master eNodeB side wraps around within preset times, and if the current PDCP Count of the UE on the master eNodeB side wraps around within the preset times, determine that the security key change needs to be performed between the first base station and the UE, and determine that a key refresh Key Refresh manner is to be used, where the first base station is the master eNodeB; and/or when the master eNodeB receives indication information that is sent by the secondary eNodeB and that indicates that a PDCP Count on a secondary eNodeB side wraps around within preset times, or the master eNodeB receives indication information that is sent by the secondary eNodeB and that indicates that the secondary eNodeB needs to perform Key Refresh, or the master eNodeB receives indication information that is reported by the UE and that indicates that a current PDCP Count on a secondary eNodeB side wraps around within preset times, determine that the security key change needs to be performed between the first base station and the UE, and determine that a Key Refresh manner is to be used, where the first base station is the secondary eNodeB.

With reference to the third aspect, or the first, the second, the third, the fourth, the fifth, the sixth, or the seventh possible implementation manner of the third aspect, in an eighth possible implementation manner of the third aspect, the key change command message includes first indication information and second indication information, the first indication information is used to indicate that the security key change needs to be performed between the master eNodeB and the UE, and the second indication information is used to indicate that the security key change needs to be performed between the secondary eNodeB and the UE.

With reference to the eighth possible implementation manner of the third aspect, in a ninth possible implementation manner of the third aspect, the first indication information is further used to indicate that a manner for performing the security key change between the master eNodeB and the UE is Key Re-key or Key Refresh; and the second indication information is further used to indicate that a manner for performing the security key change between the secondary eNodeB and the UE is Key Re-key or Key Refresh.

With reference to the third aspect, or the first, the second, the third, the fourth, the fifth, the sixth, or the seventh possible implementation manner of the third aspect, in a tenth possible implementation manner of the third aspect, the key change command message includes first security key context information and second security key context information, where the first security key context information is used to indicate that the security key change needs to be performed between the master eNodeB and the UE, and the second security key context information is used to indicate that the security key change needs to be performed between the secondary eNodeB and the UE.

With reference to the tenth possible implementation manner of the third aspect, in an eleventh possible implementation manner of the third aspect, the first security key context information is further used to indicate that a manner for performing the security key change between the master eNodeB and the UE is Key Re-key or Key Refresh; and the second security key context information is further used to indicate that a manner for performing the security key change between the secondary eNodeB and the UE is Key Re-key or Key Refresh.

With reference to the third aspect, in a twelfth possible implementation manner of the third aspect, the key change command message indicates, by using a value of a key change indicator Key Change Indicator field, that a manner for performing the security key change between the first base station and the UE is Key Re-key or Key Refresh.

With reference to the third aspect, in a thirteenth possible implementation manner of the third aspect, the key change command message carries indication information indicating that the UE keeps data transmission between the UE and a second base station, or indicating that the UE suspends data transmission between the UE and the first base station, or indicating that the UE stops data transmission between the UE and the first base station, where when the second base station is the master eNodeB, the first base station is the secondary eNodeB, or when the second base station is the secondary eNodeB, the second base station is the master eNodeB.

With reference to the third aspect, or the first, the second, the third, the fourth, the fifth, the sixth, the seventh, the eighth, the ninth, the tenth, the eleventh, the twelfth, or the thirteenth possible implementation manner of the third aspect, in a fourteenth possible implementation manner of the third aspect, the key change command message is specifically an intra-cell handover HO command message.

According to a fourth aspect, an embodiment provides user equipment UE, including: a message receiving module, configured to receive a key change command message sent by a master eNodeB, where the key change command message includes indication information that the master eNodeB commands that a security key change be performed between the UE and a first base station, where the first base station includes at least one of the master eNodeB and a secondary eNodeB; a key change module, configured to perform, according to the key change command message, the security key change between the UE and the first base station; a determining module, configured to determine, according to the key change command message, whether to keep access stratum configuration information between the UE and the master eNodeB or the secondary eNodeB and/or whether to keep data transmission between the UE and the master eNodeB or the secondary eNodeB; and a message sending module, configured to send a key change complete message to the master eNodeB, so that the first base station determines that the security key change between the UE and the first base station is completed.

With reference to the fourth aspect, in a first possible implementation manner of the fourth aspect, the key change command message carries indication information indicating whether the UE performs random access to the first base station, and the determining module is further configured to: after the message receiving module receives the key change command message sent by the master eNodeB, determine, according to the indication information that is carried in the key change command message and that indicates whether the UE performs random access to the first base station, whether to perform random access to the first base station.

With reference to the fourth aspect or the first possible implementation manner of the fourth aspect, in a second possible implementation manner of the fourth aspect, if the key change command message indicates that the UE performs random access to the first base station, the UE further includes a random access module, where: the message receiving module is specifically configured to receive a key change command message that is sent by the master eNodeB and that includes information about a random access resource; and the random access module is configured to perform random access to the first base station according to the information about the random access resource.

With reference to the fourth aspect, in a third possible implementation manner of the fourth aspect, if the indication information included in the key change command message received by the UE includes first indication information and second indication information, where the first indication information is used to indicate that the security key change needs to be performed between the master eNodeB and the UE, and the second indication information is used to indicate that the security key change needs to be performed between the secondary eNodeB and the UE, the key change module is further configured to determine, according to the first indication information and/or the second indication information, that the first base station is in one of the following three conditions: the first base station is the master eNodeB, the first base station is the secondary eNodeB, and the first base station is the master eNodeB and the secondary eNodeB.

With reference to the third possible implementation manner of the fourth aspect, in a fourth possible implementation manner of the fourth aspect, the first indication information is further used to indicate that a manner for performing the security key change between the master eNodeB and the UE is Key Re-key or Key Refresh, and the key change module is specifically configured to perform, according to the first indication information, the security key change between the UE and the master eNodeB in a Key Re-key or Key Refresh manner; and the second indication information is further used to indicate that a manner for performing the security key change between the secondary eNodeB and the UE is Key Re-key or Key Refresh, and the key change module is specifically configured to perform, according to the second indication information, the security key change between the UE and the secondary eNodeB in the Key Re-key or Key Refresh manner.

With reference to the fourth aspect, in a fifth possible implementation manner of the fourth aspect, if the key change command message received by the UE includes first security key context information and second security key context information, where the first security key context information is used to indicate that the security key change needs to be performed between the master eNodeB and the UE, and the second security key context information is used to indicate that the security key change needs to be performed between the secondary eNodeB and the UE, the key change module is further configured to determine, according to the first security key context information and/or the second security key context information, that the first base station is in one of the following three conditions: the first base station is the master eNodeB, the first base station is the secondary eNodeB, and the first base station is the master eNodeB and the secondary eNodeB.

With reference to the fifth possible implementation manner of the fourth aspect, in a sixth possible implementation manner of the fourth aspect, the first security key context information is further used to indicate that a manner for performing the security key change between the master eNodeB and the UE is Key Re-key or Key Refresh, and the key change module is specifically configured to perform, according to the first security key context information, the security key change between the UE and the master eNodeB in a Key Re-key or Key Refresh manner; and the second security key context information is further used to indicate that a manner for performing the security key change between the secondary eNodeB and the UE is Key Re-key or Key Refresh, and the key change module is specifically configured to perform, according to the second security key context information, the security key change between the UE and the secondary eNodeB in the Key Re-key or Key Refresh manner.

With reference to the fourth aspect, in a seventh possible implementation manner of the fourth aspect, if the indication information included in the key change command message is a key change indicator Key Change Indicator field, the key change module is specifically configured to determine, by using a value of the Key Change Indicator field, to perform the security key change between the UE and the first base station in a Key Re-key or Key Refresh manner.

With reference to the fourth aspect, in an eighth possible implementation manner of the fourth aspect, the acquiring module is specifically configured to: determine, according to first indication information and second indication information that are included in the key change command message, whether to keep the access stratum configuration information between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determine, according to first security key context information and second security key context information that are included in the key change command message, whether to keep the access stratum configuration information between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determine, according to a key change indicator Key Change Indicator field included in the key change command message, whether to keep the access stratum configuration information between the UE and the master eNodeB or the secondary eNodeB; or determine, according to indication information that is included in the key change command message and that indicates that the UE keeps data transmission between the UE and the master eNodeB or the secondary eNodeB, whether to keep the access stratum configuration information between the UE and the master eNodeB or the secondary eNodeB.

With reference to the eighth possible implementation manner of the fourth aspect, in a ninth possible implementation manner of the fourth aspect, the determining module is specifically configured to: when determining, according to the Key Change Indicator field, that Key Re-key needs to be performed, determine not to keep the access stratum configuration information between the UE and the master eNodeB or the secondary eNodeB; or when determining, according to the Key Change Indicator field, that Key Refresh needs to be performed based on a UE-side intermediate key corresponding to the master eNodeB, determine to keep the access stratum configuration information between the UE and the master eNodeB or the secondary eNodeB; or when determining, according to the Key Change Indicator field, that Key Refresh needs to be performed based on a next hop (NH), determine to keep the access stratum configuration information between the UE and the master eNodeB or the secondary eNodeB.

With reference to the fourth aspect, in a tenth possible implementation manner of the fourth aspect, the determining module is specifically configured to: determine, according to first indication information and second indication information that are included in the key change command message, whether to keep data transmission between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determine, according to first security key context information and second security key context information that are included in the key change command message, whether to keep data transmission between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determine, according to a Key Change Indicator field included in the key change command message, whether to keep data transmission between the UE and the master eNodeB or the secondary eNodeB; or determine, according to indication information that is included in the key change command message and that indicates that the UE keeps data transmission between the UE and the master eNodeB or the secondary eNodeB, whether to keep data transmission between the UE and the master eNodeB or the secondary eNodeB.

With reference to the tenth possible implementation manner of the fourth aspect, in an eleventh possible implementation manner of the fourth aspect, the determining module is specifically configured to: when determining, according to the Key Change Indicator field, that Key Re-key needs to be performed, determine not to keep data transmission between the UE and the master eNodeB or between the UE and the secondary eNodeB; or when determining, according to the Key Change Indicator field, that Key Refresh needs to be performed based on a UE-side intermediate key corresponding to the master eNodeB, determine to keep data transmission between the UE and the secondary eNodeB; or when determining, according to the Key Change Indicator field, that Key Refresh needs to be performed based on an NH, determine to keep data transmission between the UE and the secondary eNodeB.

With reference to the fourth aspect, in a twelfth possible implementation manner of the fourth aspect, when the UE determines, according to the key change command information, that the access stratum configuration information between the UE and the master eNodeB needs to be kept, and/or that data transmission between the UE and the master eNodeB needs to be kept, the determining module is specifically configured to determine at least one of the following: keeping, by the UE, Packet Data Convergence Protocol PDCP configurations of all radio bearers RBs established between the UE and the master eNodeB; keeping, by the UE, Radio Link Control RLC configurations of all RBs established between the UE and the master eNodeB; keeping, by the UE, Medium Access Control MAC configurations of all RBs established between the UE and the master eNodeB; keeping, by the UE, an active state of an activated secondary cell SCell between the UE and the master eNodeB; keeping, by the UE, a cell radio network temporary identifier C-RNTI used for communication between the UE and the master eNodeB; and keeping or suspending, by the UE, data transmission between the UE and the master eNodeB.

With reference to the fourth aspect, in a thirteenth possible implementation manner of the fourth aspect, when the UE determines, according to the key change command information, that the access stratum configuration information between the UE and the secondary eNodeB needs to be kept, and/or that data transmission between the UE and the secondary eNodeB needs to be kept, keeping the access stratum configuration information between the UE and the secondary eNodeB and/or keeping data transmission between the UE and the secondary eNodeB, the determining module is specifically configured to determine at least one of the following: keeping, by the UE, PDCP configurations of all RBs established between the UE and the secondary eNodeB; keeping, by the UE, RLC configurations of all RBs established between the UE and the secondary eNodeB; keeping, by the UE, MAC configurations of all RBs established between the UE and the secondary eNodeB; keeping, by the UE, an active state of an activated SCell between the UE and the secondary eNodeB; keeping, by the UE, a C-RNTI used for communication between the UE and the secondary eNodeB; and keeping or suspending, by the UE, data transmission between the UE and the secondary eNodeB.

With reference to the fourth aspect, or the first, the second, the third, the fourth, the fifth, the sixth, the seventh, the eighth, the ninth, the tenth, the eleventh, the twelfth, or the thirteenth possible implementation manner of the fourth aspect, in a fourteenth possible implementation manner of the fourth aspect, the key change module is specifically configured to: when the first base station is the master eNodeB, if the UE determines, according to the key change command message, that the manner for performing the security key change between the master eNodeB and the UE is Key Refresh, perform the security key change between the UE and the master eNodeB in the Key Refresh manner; and after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP keeping module, configured to keep the Packet Data Convergence Protocol PDCP configurations of all the radio bearers RBs established between the UE and the secondary eNodeB; an RLC keeping module, configured to keep the Radio Link Control RLC configurations of all the RBs established between the UE and the secondary eNodeB; a MAC keeping module, configured to keep the Medium Access Control MAC configurations of all the RBs established between the UE and the secondary eNodeB; an activation keeping module, configured to keep the active state of the activated secondary cell SCell between the UE and the secondary eNodeB; a C-RNTI keeping module, configured to keep the cell radio network temporary identifier C-RNTI used for communication between the UE and the secondary eNodeB; and a first transmission control module, configured to keep or suspend data transmission between the UE and the secondary eNodeB.

With reference to the fourteenth possible implementation manner of the fourth aspect, in a fifth possible implementation manner of the fourth aspect, the key change module includes: a first intermediate key updating submodule, configured to update, based on a next hop chaining count Next Hop Chaining Count value indicated by the key change command message and by using a current UE-side intermediate key corresponding to the master eNodeB or a next hop NH, the UE-side intermediate key corresponding to the master eNodeB; and a first key change submodule, configured to generate, by using an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

With reference to the fifteenth possible implementation manner of the fourth aspect, in a sixteenth possible implementation manner of the fourth aspect, the determining module is further configured to: before determining, according to the key change command message, whether to keep the access stratum configuration information between the UE and the master eNodeB or the secondary eNodeB and/or whether to keep data transmission between the UE and the master eNodeB or the secondary eNodeB, determine that the performing the security key change between the UE and the master eNodeB in the Key Refresh manner is based on the current UE-side intermediate key corresponding to the master eNodeB.

With reference to the fourteenth possible implementation manner of the fourth aspect, in a seventeenth possible implementation manner of the fourth aspect, the key change module is specifically configured to determine, according to the first indication information or the first security key context information or security context information that is carried in the key change command message, that the manner for performing the security key change between the master eNodeB and the UE is Key Refresh.

With reference to the fourth aspect, or the first, the second, the third, the fourth, the fifth, the sixth, the seventh, the eighth, the ninth, the tenth, the eleventh, the twelfth, or the thirteenth possible implementation manner of the fourth aspect, in an eighteenth possible implementation manner of the fourth aspect, the key change module is specifically configured to: when the first base station is the master eNodeB, if the UE determines, according to the key change command message, that the manner for performing the security key change between the master eNodeB and the UE is Key Re-key, perform the security key change between the UE and the master eNodeB in the Key Re-key manner; and after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP reconfiguration module, configured to: reconfigure the PDCP configurations of all the RBs established between the UE and the master eNodeB, and reconfigure the PDCP configurations of all the RBs established between the UE and the secondary eNodeB; an RLC reconfiguration module, configured to: reconfigure the RLC configurations of all the RBs established between the UE and the master eNodeB, and reconfigure the RLC configurations of all the RBs established between the UE and the secondary eNodeB; a MAC reconfiguration module, configured to: reconfigure the MAC configurations of all the RBs established between the UE and the master eNodeB, and reconfigure the MAC configurations of all the RBs established between the UE and the secondary eNodeB; and a second transmission control module, configured to: stop data transmission between the UE and the master eNodeB, and stop data transmission between the UE and the secondary eNodeB.

With reference to the eighteenth possible implementation manner of the fourth aspect, in a nineteenth possible implementation manner of the fourth aspect, the key change module includes: a second intermediate key updating submodule, configured to update a UE-side intermediate key between the UE and the master eNodeB based on an updated access security management entity ASME intermediate key; and a first key change submodule, configured to generate, according to an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

With reference to the nineteenth possible implementation manner of the fourth aspect, in a twentieth possible implementation manner of the fourth aspect, the key change module further includes: a third intermediate key updating submodule, configured to: after the second intermediate key updating submodule updates the UE-side intermediate key corresponding to the master eNodeB based on the access security management entity ASME intermediate key, update, according to the updated master-eNodeB-side intermediate key and cell information, associated with the security key change, of the secondary eNodeB or base station information, associated with the security key change, of the secondary eNodeB, a UE-side intermediate key corresponding to the secondary eNodeB; and a second key change submodule, configured to generate, according to an updated UE-side intermediate key corresponding to the secondary eNodeB and a security algorithm of the secondary eNodeB, a new security key corresponding to the secondary eNodeB, where the new security key corresponding to the secondary eNodeB includes a cipher key used for communication between the UE and the secondary eNodeB.

With reference to the eighteenth possible implementation manner of the fourth aspect, in a twenty-first possible implementation manner of the fourth aspect, the key change module is specifically configured to determine, according to the first indication information or the first security key context information or security context information that is carried in the key change command message, that the manner for performing the security key change between the master eNodeB and the UE is Key Re-key.

With reference to the fourth aspect, or the first, the second, the third, the fourth, the fifth, the sixth, the seventh, the eighth, the ninth, the tenth, the eleventh, the twelfth, or the thirteenth possible implementation manner of the fourth aspect, in a twenty-second possible implementation manner of the fourth aspect, if the key change command message carries indication information indicating that the UE keeps data transmission between the UE and a second base station, after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP keeping module, configured to keep PDCP configurations of all RBs established between the UE and the second base station, where when the second base station is the master eNodeB, the first base station is the secondary eNodeB, or when the second base station is the secondary eNodeB, the second base station is the master eNodeB; an RLC keeping module, configured to keep RLC configurations of all RBs established between the UE and the second base station; a MAC keeping module, configured to keep MAC configurations of all RBs established between the UE and the second base station; an activation keeping module, configured to keep an active state of an activated SCell between the UE and the second base station; a C-RNTI keeping module, configured to keep a C-RNTI used for communication between the UE and the second base station; and a transmission keeping module, configured to keep data transmission between the UE and the second base station.

With reference to the fourth aspect, or the first, the second, the third, the fourth, the fifth, the sixth, the seventh, the eighth, the ninth, the tenth, the eleventh, the twelfth, or the thirteenth possible implementation manner of the fourth aspect, in a twenty-third possible implementation manner of the fourth aspect, if the key change command message carries indication information indicating that the UE suspends data transmission between the UE and the first base station, after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP keeping module, configured to keep PDCP configurations of all RBs established between the UE and the first base station; an RLC keeping module, configured to keep RLC configurations of all RBs established between the UE and the first base station; a MAC keeping module, configured to keep MAC configurations of all RBs established between the UE and the first base station; an activation keeping module, configured to keep an active state of an activated SCell between the UE and the first base station; a C-RNTI keeping module, configured to keep a C-RNTI used for communication between the UE and the first base station; and a transmission suspension module, configured to suspend data transmission between the UE and the first base station.

With reference to the fourth aspect, or the first, the second, the third, the fourth, the fifth, the sixth, the seventh, the eighth, the ninth, the tenth, the eleventh, the twelfth, or the thirteenth possible implementation manner of the fourth aspect, in a twenty-fourth possible implementation manner of the fourth aspect, if the key change command message carries indication information indicating that the UE stops data transmission between the UE and the first base station, after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP reconfiguration module, configured to reconfigure PDCP configurations of all RBs established between the UE and the first base station; an RLC reconfiguration module, configured to reconfigure RLC configurations of all RBs established between the UE and the first base station; a MAC reconfiguration module, configured to reconfigure MAC configurations of all RBs established between the UE and the first base station; and a transmission stopping module, configured to stop data transmission between the UE and the first base station.

It can be seen from the foregoing technical solutions that, the embodiments have the following advantages.

In the embodiments, a master eNodeB first determines that a security key change needs to be performed between a first base station and a UE, where the first base station includes at least one of the master eNodeB and a secondary eNodeB; after the master eNodeB determines that the security key change needs to be performed between the first base station and the UE, the master eNodeB sends a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB; and after the UE completes the security key change, the UE sends a key change complete message to the master eNodeB, the master eNodeB may receive the key change complete message sent by the UE, so that the first base station can determine, by using the master eNodeB, that the security key change between the UE and the first base station is completed, and further, the first base station and the UE can use a new security key to perform data transmission. Therefore, according to the embodiments, a security key change can be implemented when a UE performs dual connectivity communication with both an MeNB and an SeNB.

BRIEF DESCRIPTION OF THE DRAWINGS

FIG. 3-*a* is a schematic flowchart of an interaction among a master eNodeB, a secondary eNodeB, and a UE according to an embodiment;

FIG. 3-*b* is a schematic flowchart of another interaction among a master eNodeB, a secondary eNodeB, and a UE according to an embodiment;

FIG. 3-*c* is a schematic flowchart of another interaction among a master eNodeB, a secondary eNodeB, and a UE according to an embodiment;

FIG. 3-*d* is a schematic flowchart of another interaction among a master eNodeB, a secondary eNodeB, and a UE according to an embodiment;

FIG. 3-*e* is a schematic flowchart of another interaction among a master eNodeB, a secondary eNodeB, and a UE according to an embodiment;

FIG. 4-*a* is a schematic structural diagram of a base station according to an embodiment;

FIG. 4-*b* is a schematic structural diagram of a key change determining module according to an embodiment;

FIG. 5-*a* is a schematic structural diagram of a UE according to an embodiment;

FIG. 5-*b* is a schematic structural diagram of another UE according to an embodiment;

FIG. 5-*c* is a schematic structural diagram of another UE according to an embodiment;

FIG. 5-*d* is a schematic structural diagram of a key change module according to an embodiment;

FIG. 5-*e* is a schematic structural diagram of another UE according to an embodiment;

DETAILED DESCRIPTION OF ILLUSTRATIVE EMBODIMENTS

Embodiments provide a security key change method, a base station, and user equipment to implement a security key change when the UE performs dual connectivity communication with both an MeNB and an SeNB.

To make the objectives, features, and advantages of embodiments clearer and more comprehensible, the following clearly describes the technical solutions in the embodiments with reference to the accompanying drawings in the embodiments. Apparently, the embodiments described in the following are merely a part rather than all of the embodiments. All other embodiments obtained by persons skilled in the art based on the embodiments shall fall within the protection scope.

In the specification, claims, and accompanying drawings \, the terms "first", "second", and so on are intended to distinguish between similar objects but do not necessarily indicate a specific order or sequence. It should be understood that the terms used in this way are interchangeable in proper circumstances, and are merely distinguishing manners that are used when objects of a same attribute are described in the embodiments that describe embodiments. Moreover, the terms "include", "contain" and any other variants mean to cover the non-exclusive inclusion, so that a process, method, system, product, or device that includes a list of units is not necessarily limited to those units, but may include other units not expressly listed or inherent to such a process, method, system, product, or device.

Details are separately illustrated in the following.

An embodiment of a security key change method may be applied to a base station, and particularly applicable to a master eNodeB of at least two base stations with which a UE performs dual connectivity communication at the same time. The method may include the following steps: determining, by the master eNodeB, that a security key change needs to be performed between a first base station and the user equipment UE, where the first base station includes at least one of the master eNodeB and a secondary eNodeB; sending, by the master eNodeB, a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB; and receiving, by the master eNodeB, a key change complete message sent by the UE, so that the first base station determines that the security key change between the UE and the first base station is completed.

Figure 1:
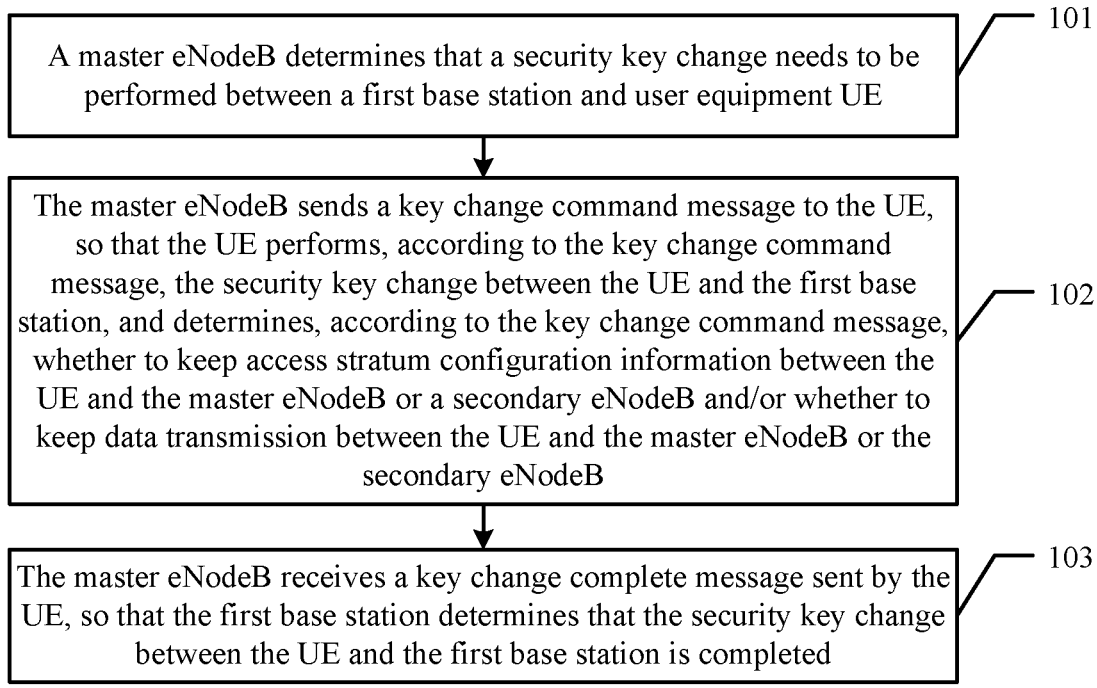
FIG. 1 is a schematic block diagram of a process of a security key change method according to an embodiment.

Referring to FIG. 1, a security key change method according to an embodiment may include the following steps.

101. A master eNodeB determines that a security key change needs to be performed between a first base station and user equipment UE.

The first base station includes at least one of the master eNodeB and a secondary eNodeB.

In this embodiment, a security key is usually required during data transmission between a base station and a UE, and in some cases, the security key needs to be changed. Likewise, when a UE performs communication by using at least two network nodes, there is usually an application requirement of changing a security key used by the UE performing dual connectivity communication. For example, a security key needs to be changed when a UE performs communication by using radio resources provided by both an MeNB and an SeNB. However, when the UE performs dual connectivity communication, the two network nodes are connected by using a non-ideal (that is, a delay exists) transmission network. In an application scenario of data transmission between the UE and the base station, when the foregoing UE performs dual connectivity communication with the MeNB and the SeNB, if a special characteristic of dual connectivity communication is not considered, at least the following problems exist: For example, a PDCP layer and an RLC layer of an RB established on an SeNB side need to be re-established, and MAC needs to be reconfigured; as a result, data transmission between the UE and the SeNB needs to be interrupted. Additionally, a status of an SCell on the SeNB side is changed into a deactivated state, and after a security key change is completed, the SCell on the SeNB side needs to be activated again, which causes an unnecessary data transmission delay. In addition, there is a big different between a primary cell and a secondary cell. For example, a main difference lies in that the primary cell is a cell with which a UE establishes a radio resource control (RRC) connection during initial connection or handover, and the primary cell provides parameters related to security and mobility management for the UE, and is also used to transmit user-plane data of the UE; the secondary cell is mainly responsible for transmitting user-plane data for the UE. Because of these characteristics of dual connectivity communication, a person skilled in the art needs to conduct deeper research on how to change a security key when a UE performs dual connectivity communication.

In this embodiment, to resolve a problem of changing the security key when the UE performs dual connectivity communication, the master eNodeB may first determine whether the security key change needs to be performed between the master eNodeB and the UE and whether the security key change needs to be performed between the SeNB and the UE. That is, the master eNodeB detects a data transmission process between the master eNodeB and the UE and a data transmission process between the secondary eNodeB and the UE when the UE uses radio resources provided by both the master eNodeB and the secondary eNodeB to perform dual connectivity communication, and then the master eNodeB determines whether the security key change needs to be performed between the master eNodeB and the UE and whether the security key change needs to be performed between the secondary eNodeB and the UE. In addition, the master eNodeB may determine a manner for performing the security key change between the master eNodeB and the UE, and the master eNodeB may further determine a manner for performing the security key change between the secondary eNodeB and the UE.

It should be noted that in this embodiment, a security key change manner includes key re-key and key re-fresh. Both Key Re-key and Key Refresh are essentially used for performing the security key change. A difference lies in that an implementation process of Key Re-key is initiated by a mobility management entity (MME), and the MME provides a new intermediate key (which may be represented by a symbol $K_{eNB}$) to perform a security key change process. Key Refresh is generally initiated by an eNB. Key Refresh is generally triggered by wrapping around of a Packet Data Convergence Protocol (PDCP) count, and then a security key change process is performed. Details are described in the following:

In some embodiments, step 101 of the determining, by a master eNodeB, that a security key change needs to be performed between a first base station and a UE may include the following steps.

A1. The master eNodeB receives a key indication command sent by the MME, where the key indication command is used to instruct to perform Key Re-key between the master eNodeB and the UE and/or instruct to perform Key Re-key between the secondary eNodeB and the UE.

A2. The master eNodeB determines, according to the key indication command, that Key Re-key is to be performed between the first base station and the UE.

That is, the MME may determine which of the master eNodeB and the secondary eNodeB performs the security key change with the UE, and the MME may further determine that the security key change is specifically performed between the UE and the first base station in a Key Re-key manner. After the MME determines the base station that performs the security key change with the UE and determines the manner to be used, the MME sends the key indication command to the master eNodeB, and the master eNodeB may acquire, by parsing the key indication command, a specific indication for performing the security key change from the MME. In this embodiment, a result determined by the master eNodeB is described in performing the security key change between the first base station and the UE, that is, performing step A2 of the determining, by the master eNodeB, that the security key change is to be performed between the first base station and the UE and determining that a Key Re-key manner is to be used. The first base station represents a base station that is determined by the master eNodeB and that needs to perform the security key change with the UE. In this embodiment, the first base station is specifically determined in three manners: 1. The first base station is the master eNodeB; 2. The first base station is the secondary eNodeB; and 3. The first base station is the master eNodeB and the secondary eNodeB. That is, the master eNodeB may select, by using the key indication command, one of the three implementation manners of the first base station. For example, if the MME indicates, by using the key indication command, that the security key change needs to be performed only between the master eNodeB and the UE and a Key Re-key manner is to be used, the master eNodeB may determine that the first base station specifically refers to the master eNodeB.

In other embodiments, if the first base station determined by the master eNodeB includes the secondary eNodeB, after step 101 of the determining, by a master eNodeB, that a security key change needs to be performed between a first base station and a UE, this embodiment may further include the following step: sending, by the master eNodeB, a key change indication message to the secondary eNodeB, where the key change indication message is used to instruct the secondary eNodeB to perform the security key change, and the key change indication message includes a secondary-eNodeB-side intermediate key generated by the master eNodeB according to an updated master-eNodeB-side intermediate key and cell information, associated with the security key change, of the secondary eNodeB or base station information, associated with the security key change, of the secondary eNodeB, or the key change indication message includes a secondary-eNodeB-side intermediate key generated by the MME for the secondary eNodeB.

That the master eNodeB determines that the first base station includes the secondary eNodeB specifically means that the first base station is the secondary eNodeB, or means that the first base station is the master eNodeB and the secondary eNodeB. That is, when the master eNodeB determines that a base station that needs to perform the security key change with the UE includes the secondary eNodeB, the master eNodeB needs to send the key change indication message to the secondary eNodeB to instruct the secondary eNodeB to perform the security key change, and the master eNodeB adds the following information to the key change indication message: the secondary-eNodeB-side intermediate key generated by the master eNodeB according to the updated master-eNodeB-side intermediate key and the cell information, associated with the security key change, of the secondary eNodeB or the base station information, associated with the security key change, of the secondary eNodeB. Alternatively, the key change indication message carries the following information: the secondary-eNodeB-side intermediate key generated by the MME for the secondary eNodeB. That is, when the security key change needs to be performed between the secondary eNodeB and the UE, the secondary eNodeB needs to use the secondary-eNodeB-side intermediate key, where the secondary-eNodeB-side intermediate key may be determined by the master eNodeB, or may be determined by the MME. When the secondary-eNodeB-side intermediate key is determined by the master eNodeB, the master eNodeB may generate the secondary-eNodeB-side intermediate key according to the updated master-eNodeB-side intermediate key and the cell information, associated with the security key change, of the secondary eNodeB or the base station information, associated with the security key change, of the secondary eNodeB. When the secondary-eNodeB-side intermediate key is determined by the MME, the key indication command sent by the MME to the master eNodeB may carry the secondary-eNodeB-side intermediate key, and the master eNodeB adds the secondary-eNodeB-side intermediate key to the key change indication message and sends the key change indication message to the secondary eNodeB.

Specifically, in other embodiments, if the master eNodeB determines that a manner for performing the security key change between the first base station and the UE is Key Re-key, a key change command message carries cell information, associated with the security key change, of the secondary eNodeB or base station information, associated with the security key change, of the secondary eNodeB. That is, if a secondary-eNodeB-side intermediate key is to be generated on a master eNodeB side, the key change command message sent by the master eNodeB to the UE needs to further carry the cell information, associated with the security key change, of the secondary eNodeB or the base station information, associated with the security key change, of the secondary eNodeB, the UE may acquire, by using the key change command message sent by the master eNodeB, the cell information, associated with the security key change, of the secondary eNodeB or the base station information, associated with the security key change, of the secondary eNodeB, and the UE may generate the secondary-eNodeB-side intermediate key by using the cell information and an updated master-eNodeB-side intermediate key.

The foregoing content describes that the manner for performing the security key change is Key Re-key, and the following describes that the manner for performing the security key change is Key Refresh. Referring to the following description, in some embodiments, step 101 of the determining, by a master eNodeB, that a security key change needs to be performed between a first base station and a UE may include the following steps.

B1. The master eNodeB determines whether a current PDCP Count of the UE on a master eNodeB side wraps around within preset times, and if the current PDCP Count of the UE on the master eNodeB side wraps around within the preset times, the master eNodeB determines that the security key change needs to be performed between the first base station and the UE, and determines that a Key Refresh manner is to be used, where the first base station is the master eNodeB; and/or B2. When the master eNodeB receives indication information that is sent by the secondary eNodeB and that indicates that a PDCP Count on a secondary eNodeB side wraps around within preset times, or the master eNodeB receives indication information that is sent by the secondary eNodeB and that indicates that the secondary eNodeB needs to perform Key Refresh, or the master eNodeB receives indication information that is reported by the UE and that indicates that a current PDCP Count on a secondary eNodeB side wraps around within preset times, the master eNodeB determines that the security key change needs to be performed between the first base station and the UE, and determines that a Key Refresh manner is to be used, where the first base station is the secondary eNodeB.

That is, for whether the current PDCP Count of the UE on the master eNodeB side wraps around within the preset times, the preset times may be determined by the master eNodeB, and a value of the times may be set by the master eNodeB according to a specific application scenario, which is not limited herein. In addition, that the current PDCP Count of the UE on the master eNodeB side wraps around within the preset times may be simply described as follows: the current PDCP Count of the UE on the master eNodeB side is about to wrap around; that the current PDCP Count of the UE on the master eNodeB side does not wrap around within the preset times may be simply described as follows: the current PDCP Count of the UE on the master eNodeB side is not about to wrap around. In step B1, the master eNodeB determines, after determining that the PDCP Count is about to wrap around, that the security key change needs to be performed between the master eNodeB and the UE and that the Key Refresh manner is to be used; in this case, the first base station may refer to the master eNodeB.

For step B2, if any one of the following three conditions occurs, the master eNodeB may determine that the security key change needs to be performed between the secondary eNodeB and the UE and that the change is to be performed in the Key Refresh manner. The three conditions are respectively as follows: 1. The PDCP Count on the secondary eNodeB side wraps around within the preset times, and the secondary eNodeB sends the master eNodeB the indication information that the PDCP Count on the secondary eNodeB side wraps around within the preset times; 2. The secondary eNodeB needs to perform Key Refresh, and the secondary eNodeB sends the master eNodeB the indication information that the secondary eNodeB needs to perform Key Refresh; and 3. The UE learns that the current PDCP Count on the secondary eNodeB side wraps around within the preset times, and the UE reports, to the master eNodeB, that the current PDCP Count on the secondary eNodeB side wraps around within the preset times. The preset times may be determined by the secondary eNodeB, and a value of the period may be set by the secondary eNodeB according to a specific application scenario, which is not limited herein. In addition, that the PDCP Count on the secondary eNodeB side wraps around within the preset times may be simply described as follows: the PDCP Count on the secondary eNodeB side is about to wrap around. In step B2, the master eNodeB determines, after determining that the PDCP Count is about to wrap around, that the security key change needs to be performed between the secondary eNodeB and the UE and that the Key Refresh manner is to be used; in this case, the first base station may refer to the secondary eNodeB. In addition, at least one of step B1 and step B2 is to be performed. When both step B1 and step B2 are implemented, the master eNodeB may determine that the security key change needs to be performed between the master eNodeB and the UE, the master eNodeB may further determine the security key change needs to be performed between the secondary eNodeB and the UE, and the master eNodeB determines that the security key changes are performed in the Key Refresh manner.

102. The master eNodeB sends a key change command message to the UE, so that the UE performs, according to the key change command message, the security key change between the UE and the first base station, and determines, according to the key change command message, whether to keep access stratum configuration information between the UE and the master eNodeB or a secondary eNodeB and/or whether to keep data transmission between the UE and the master eNodeB or the secondary eNodeB.

In this embodiment, in step 101, the master eNodeB may determine which of the master eNodeB and the secondary eNodeB needs to perform the security key change with the UE, the master eNodeB determines that the security key change needs to be performed between the first base station and the UE, and then the master eNodeB sends the key change command message to the UE to trigger the UE to perform the security key change, where the key change command message carries identification information of the base station, between the master eNodeB and the secondary eNodeB, with which the UE needs to perform the security key change, and the key change command message may further carry indication information indicating a manner in which the UE performs the security key change.

In some embodiments, the key change command message sent by the master eNodeB to the UE includes first indication information and second indication information, where: the first indication information is used to indicate that the security key change needs to be performed between the master eNodeB and the UE; and the second indication information is used to indicate that the security key change needs to be performed between the secondary eNodeB and the UE.

That is, the key change command message generated by the master eNodeB carries the first indication information and the second indication information, and the two pieces of indication information are separately used to indicate, to the UE, whether to perform the security key change. The first indication information indicates the master eNodeB, and the second indication information indicates the secondary eNodeB. The master eNodeB may specifically set two fields in the key change command message to respectively represent values of the first indication information and the second indication information. For example, when the first indication information indicates that the security key change needs to be performed between the master eNodeB and the UE and the second indication information indicates that the security key change needs to be performed between the secondary eNodeB and the UE, the master eNodeB may determine that the first base station refers to the master eNodeB and the secondary eNodeB; therefore, the UE may learn, from the first indication information and the second indication information, that the security key change needs to be separately performed between the UE and the master eNodeB and between the UE and the secondary eNodeB.

Further, in other embodiments, the first indication information is further used to indicate that a manner for performing the security key change between the master eNodeB and the UE is Key Re-key or Key Refresh; the second indication information is further used to indicate that a manner for performing the security key change between the secondary eNodeB and the UE is Key Re-key or Key Refresh. That is, after adding the first indication information and the second indication information to the generated key change command message, the master eNodeB may further use the first indication information and the second indication information to indicate a manner for performing the security key change. The first indication information indicates the master eNodeB, and the second indication information indicates the secondary eNodeB. The master eNodeB may specifically set two fields in the key change command message to respectively represent values of the first indication information and the second indication information. Therefore, when the first indication information indicates that a manner for performing the security key change between the master eNodeB and the UE is Key Re-key, and the second indication information indicates that a manner for performing the security key change between the secondary eNodeB and the UE is Key Refresh, the UE may learn, from the first indication information, that the manner for performing the security key change between the UE and the master eNodeB is Key Re-key, and the UE may learn, from the second indication information, that the manner for performing the security key change between the UE and the secondary eNodeB is Key Refresh.

In other embodiments, the key change command message sent by the master eNodeB to the UE includes first security key context information and second security key context information, where: the first security key context information is used to indicate that the security key change needs to be performed between the master eNodeB and the UE; and the second security key context information is used to indicate that the security key change needs to be performed between the secondary eNodeB and the UE.

That is, the key change command message generated by the master eNodeB carries the first security key context information and the second security key context information, and the two pieces of security key context information are separately used to indicate, to the UE, whether to perform the security key change. The first security key context information indicates the master eNodeB, and the second security key context information indicates the secondary eNodeB. The master eNodeB may specifically set two fields in the key change command message to respectively represent values of the first security key context information and the second security key context information. Therefore, when the first security key context information indicates that the security key change needs to be performed between the master eNodeB and the UE and the second security key context information indicates that the security key change needs to be performed between the secondary eNodeB and the UE, the master eNodeB may determine that the first base station refers to the master eNodeB and the secondary eNodeB; therefore, the UE may learn, from the first security key context information and the second security key context information, that the security key change needs to be separately performed between the UE and the master eNodeB and between the UE and the secondary eNodeB.

Further, in other embodiments, the first security key context information is further used to indicate that a manner for performing the security key change between the master eNodeB and the UE is Key Re-key or Key Refresh; the second security key context information is further used to indicate that a manner for performing the security key change between the secondary eNodeB and the UE is Key Re-key or Key Refresh. That is, after adding the first security key context information and the second security key context information to the generated key change command message, the master eNodeB may further use the first security key context information and the second security key context information to indicate a manner for performing the security key change. The first security key context information indicates the master eNodeB, and the second security key context information indicates the secondary eNodeB. The master eNodeB may specifically set two fields in the key change command message to respectively represent values of the first security key context information and the second security key context information. Therefore, when the first security key context information indicates that a manner for performing the security key change between the master eNodeB and the UE is Key Re-key, and the second security key context information indicates that a manner for performing the security key change between the secondary eNodeB and the UE is Key Refresh, the UE may learn, from the first security key context information, that the manner for performing the security key change between the UE and the master eNodeB is Key Re-key, and the UE may learn, from the second security key context information, that the manner for performing the security key change between the UE and the secondary eNodeB is Key Refresh.

In other embodiments, the key change command message sent by the master eNodeB to the UE further includes a key change indicator (Key Change Indicator). The master eNodeB may indicate, by using a value of a Key Change Indicator field, that a manner for performing the security key change between the first base station and the UE is Key Re-key or Key Refresh. For example, the master eNodeB may set the value of the Key Change Indicator field to true (True) to represent that Key Re-key needs to be performed between the first base station and the UE; the master eNodeB may set the value of the Key Change Indicator field to false (False) to represent that Key Refresh needs to be performed between the first base station and the UE.

In other embodiments, the key change command message sent by the master eNodeB to the UE further includes: indication information indicating data transmission between the UE and the first base station or a second base station. Content of the indication information may be in any one of the following three conditions: 1. indicating that the UE keeps data transmission between the UE and the second base station; 2. indicating that the UE suspends data transmission between the UE and the first base station; and 3. indicating that the UE stops data transmission between the UE and the first base station. When the second base station is the master eNodeB, the first base station is the secondary eNodeB; or when the second base station is the secondary eNodeB, the second base station is the master eNodeB. Specifically, when the content of the foregoing indication information is in condition 1 or 2, the UE performs, according to the foregoing indication information, the security key change in a Key Refresh manner; when the content of the foregoing indication information is in condition 3, the UE performs, according to the foregoing indication information, the security key change in a Key Re-key manner.

It should be noted that in some embodiments, the key change command message sent by the master eNodeB to the UE is specifically an intra-cell handover (Handover, HO) command message. That is, in this embodiment, a process of changing a security key when the UE performs dual connectivity communication may be completed in an intra-cell handover process, where the intra-cell handover process means that a source cell and a target cell are a same cell of a base station when the UE performs handover, that is, primary cells before and after handover are a same cell, and do not change.

103. The master eNodeB receives a key change complete message sent by the UE, so that the first base station determines that the security key change between the UE and the first base station is completed.

In this embodiment, after the UE receives the key change command message sent by the master eNodeB, the UE may perform the security key change between the UE and the first base station according to the key change command message. After the UE completes the security key change between the UE and the first base station, the UE sends the key change complete message to the master eNodeB, and the master eNodeB may receive the key change complete message sent by the UE. After the master eNodeB receives the key change complete message sent by the UE, the first base station may determine, by using the key change complete message received by the master eNodeB, that the security key change between the UE and the first base station is completed. The first base station may use a new security key to continue performing data transmission with the UE. It should be noted that, it can be learned from the foregoing descriptions that the first base station may refer to the master eNodeB, or may refer to the secondary eNodeB, or may refer to the master eNodeB and the secondary eNodeB; therefore, after obtaining a feedback from the UE that the security key change is completed, the base station that needs to perform the security key change with the UE needs to be instructed to continue performing data transmission with the UE. Therefore, the security key change between the master eNodeB and the UE does not affect data transmission between the secondary eNodeB and the UE; likewise, the security key change between the secondary eNodeB and the UE does not affect data transmission between the master eNodeB and the UE.

It should be noted that in some embodiments, if the first base station determined by the master eNodeB includes the secondary eNodeB, after step 103 of the receiving, by the master eNodeB, a key change complete message sent by the UE, this embodiment may further include the following step: forwarding, by the master eNodeB, the key change complete message to the secondary eNodeB, so that the secondary eNodeB determines that the security key change between the UE and the secondary eNodeB is completed.

That is, if the UE performs the security key change between the UE and the secondary eNodeB, when the master eNodeB receives a feedback from the UE that the security key change between the UE and the secondary eNodeB is completed, the master eNodeB may forward the key change complete message to the secondary eNodeB. The secondary eNodeB determines, by using the key change complete message, that the security key change between the UE and the secondary eNodeB is completed, and then the secondary eNodeB can restore data transmission between the UE and the secondary eNodeB according to the key change complete message.

In some embodiments, the key change command message sent by the master eNodeB to the UE may further carry indication information indicating whether the UE performs random access to the first base station. That is, the master eNodeB may specifically notify the UE of a base station to which random access is to be performed, and the UE may initiate random access according to the indication of the master eNodeB. Further, if the key change command message indicates that the UE performs random access to the first base station, and the first base station includes the master eNodeB, step 102 of the sending, by the master eNodeB, a key change command message to the UE specifically includes: sending, by the master eNodeB, the UE a key change command message that includes information about a random access resource, so that the UE performs random access to the first base station according to the information about the random access resource.

That is, if the master eNodeB instructs the UE to perform random access to the master eNodeB, the master eNodeB may allocate a random access resource to the UE, and add information about the random access resource to the key change command message. When the UE sends a random access request to the master eNodeB, the master eNodeB sends a random access response to the UE to instruct the UE to perform random access to the master eNodeB, so as to complete an entire random access process. It should be noted that if the master eNodeB instructs the UE to perform random access to the secondary eNodeB, the UE and the secondary eNodeB may complete an entire random access process according to the foregoing method. Certainly, the master eNodeB may also instruct the UE to perform random access to the master eNodeB and the secondary eNodeB. When the UE performs random access to the master eNodeB and the secondary eNodeB, the two random access processes may be performed concurrently. In addition, when the UE performs random access to the secondary eNodeB, the secondary eNodeB may determine, after determining that the UE successfully performs a random access process, that the security key change is completed. Therefore, in this case, the master eNodeB may not send the key change complete message to the secondary eNodeB.

It can be learned from the foregoing descriptions in this embodiment that: a master eNodeB determines that a security key change needs to be performed between a first base station and a UE, where the first base station includes at least one of the master eNodeB and a secondary eNodeB; after the master eNodeB determines that the security key change needs to be performed between the first base station and the UE, the master eNodeB sends a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB; and after the UE completes the security key change, the UE sends a key change complete message to the master eNodeB, the master eNodeB may receive the key change complete message sent by the UE, so that the first base station can determine, by using the master eNodeB, that the security key change between the UE and the first base station is completed, and the first base station and the UE can use a new security key to perform data transmission. Therefore, according to this embodiment, a security key change can be implemented when a UE performs dual connectivity communication with both an MeNB and an SeNB.

The foregoing embodiment describes the security key change method provided in the embodiments from the perspective of a master eNodeB, and the following describes the security key change method provided in the embodiments in detail from the perspective of user equipment.

Another embodiment of the security key change method may be applied to user equipment, and particularly applicable to a UE that performs dual connectivity communication with at least two base stations. The method may include the following steps: receiving, by the UE, a key change command message sent by a master eNodeB, where the key change command message includes indication information that the master eNodeB commands that a security key change be performed between the UE and a first base station, where the first base station includes at least one of the master eNodeB and a secondary eNodeB; performing, by the UE according to the key change command message, the security key change between the UE and the first base station; determining, by the UE according to the key change command message, whether to keep access stratum configuration information between the UE and the master eNodeB or the secondary eNodeB and/or whether to keep data transmission between the UE and the master eNodeB or the secondary eNodeB; and sending, by the UE, a key change complete message to the master eNodeB, so that the first base station determines that the security key change between the UE and the first base station is completed.

Figure 2:
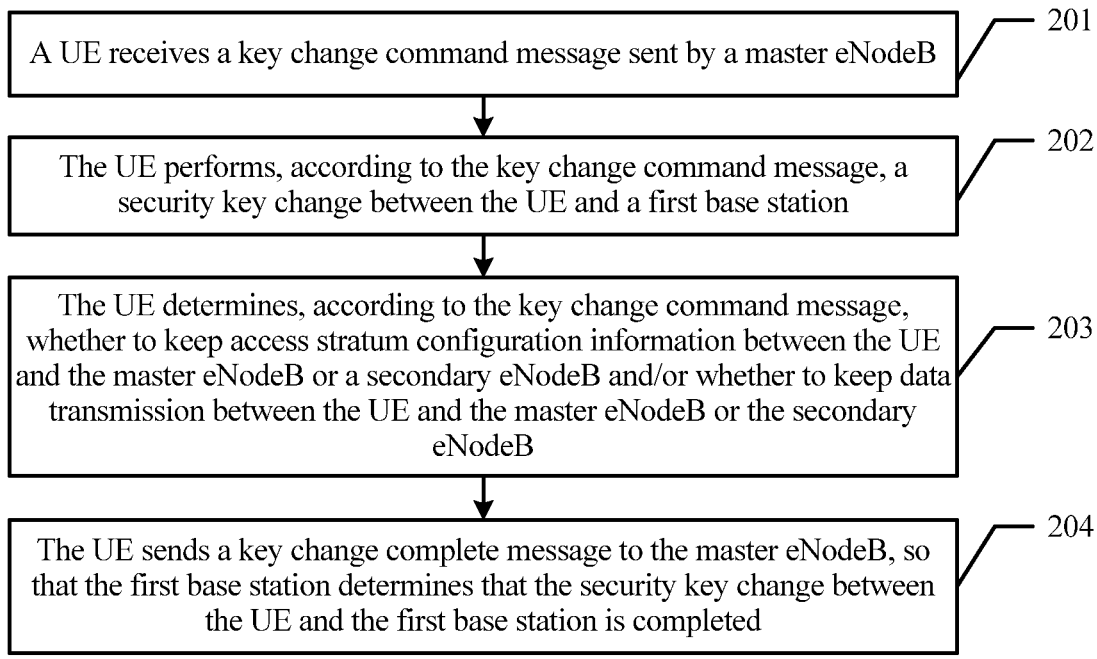
FIG. 2 is a schematic flowchart of another security key change method according to an embodiment.

Referring to FIG. 2, a security key change method according to another embodiment may include the following steps.

201. A UE receives a key change command message sent by a master eNodeB.

The key change command message includes indication information that the master eNodeB commands that a security key change be performed between the UE and a first base station, where the first base station includes at least one of the master eNodeB and a secondary eNodeB.

In this embodiment, a security key is usually required during data transmission between a base station and the UE. In some cases, the security key needs to be changed. Likewise, when a UE performs communication by using at least two network nodes, there is usually an application requirement of changing a security key used by the UE performing dual connectivity communication. In this embodiment, to resolve a problem of changing the security key when the UE performs dual connectivity communication, the master eNodeB may first determine whether the security key change needs to be performed between the master eNodeB and the UE and whether the security key change needs to be performed between the secondary eNodeB and the UE. That is, the master eNodeB detects a data transmission process between the master eNodeB and the UE and a data transmission process between the secondary eNodeB and the UE when the UE uses radio resources provided by both the master eNodeB and the secondary eNodeB to perform dual connectivity communication, and then the master eNodeB determines whether the security key change needs to be performed between the master eNodeB and the UE and whether the security key change needs to be performed between the secondary eNodeB and the UE. In addition, the master eNodeB may determine a manner for performing the security key change between the master eNodeB and the UE, and the master eNodeB may further determine a manner for performing the security key change between the secondary eNodeB and the UE.

After the master eNodeB determines that the security key change needs to be performed between the master eNodeB and the UE and/or the security key change needs to be performed between the secondary eNodeB and the UE, the master eNodeB may send the key change command message to the UE to indicate that the security key change needs to be performed between the UE and the first base station, where the first base station represents a base station that is determined by the master eNodeB and that needs to perform the security key change with the UE. In this embodiment, the first base station is specifically determined in three manners: 1. The first base station is the master eNodeB; 2. The first base station is the secondary eNodeB; and 3. The first base station is the master eNodeB and the secondary eNodeB. That is, the master eNodeB may select one from the three implementation manners of the first base station by using a key indication command. For example, if an MME indicates, by using the key indication command, that only the security key change between the master eNodeB and the UE needs to be performed and a Key Re-key manner is to be used, the master eNodeB may determine that the first base station specifically refers to the master eNodeB. The master eNodeB adds an identifier of the master eNodeB to the key change command message sent to the UE, and the UE may learn, from the key change command message, that the security key change needs to be performed between the UE and the master eNodeB.

It should be noted that the master eNodeB may further add, to the key change command message, indication information indicating a manner in which the UE performs the security key change. Specifically, the manner that is indicated by the master eNodeB and in which the UE performs the security key change includes Key Re-key and Key Refresh. Both Key Re-key and Key Refresh are essentially used for performing the security key change. The UE may learn, from the key change command message sent by the master eNodeB, the manner for performing the security key change. Details are described in the following.

In some embodiments, if the indication information included in the key change command message received by the UE includes first indication information and second indication information, where the first indication information is used to indicate that the security key change needs to be performed between the master eNodeB and the UE, and the second indication information is used to indicate that the security key change needs to be performed between the secondary eNodeB and the UE, the UE determines, according to the first indication information and/or the second indication information, that the first base station is in one of the following three conditions: the first base station is the master eNodeB, the first base station is the secondary eNodeB, and the first base station is the master eNodeB and the secondary eNodeB.

That is, the key change command message generated by the master eNodeB carries the first indication information and the second indication information, and the two pieces of indication information are separately used to indicate, to the UE, whether to perform the security key change. The first indication information indicates the master eNodeB, and the second indication information indicates the secondary eNodeB. For example, when the first indication information indicates that the security key change needs to be performed between the master eNodeB and the UE and the second indication information indicates that the security key change needs to be performed between the secondary eNodeB and the UE, the UE may determine that the first base station refers to the master eNodeB and the secondary eNodeB; therefore, the UE may learn, from the first indication information and the second indication information, that the security key change needs to be separately performed between the UE and the master eNodeB and between the UE and the secondary eNodeB.

Further, in other embodiments, the first indication information is further used to indicate that a manner for performing the security key change between the master eNodeB and the UE is Key Re-key or Key Refresh; the second indication information is further used to indicate that a manner for performing the security key change between the secondary eNodeB and the UE is Key Re-key or Key Refresh. That is, after adding the first indication information and the second indication information to the generated key change command message, the master eNodeB may further use the first indication information and the second indication information to indicate a manner for performing the security key change. The first indication information indicates the master eNodeB, and the second indication information indicates the secondary eNodeB. The master eNodeB may specifically set two fields in the key change command message to respectively represent values of the first indication information and the second indication information. Therefore, when the first indication information indicates that a manner for performing the security key change between the master eNodeB and the UE is Key Re-key, and the second indication information indicates that a manner for performing the security key change between the secondary eNodeB and the UE is Key Refresh, the UE may learn, from the first indication information, that the manner for performing the security key change between the UE and the master eNodeB is Key Re-key, and the UE may learn, from the second indication information, that the manner for performing the security key change between the UE and the secondary eNodeB is Key Refresh.

In other embodiments, if the indication information included in the key change command message received by the UE includes first security key context information and second security key context information, where the first security key context information is used to indicate that the security key change needs to be performed between the master eNodeB and the UE, and the second security key context information is used to indicate that the security key change needs to be performed between the secondary eNodeB and the UE, the UE determines, according to the first security key context information and/or the second security key context information, that the first base station is in one of the following three conditions: the first base station is the master eNodeB, the first base station is the secondary eNodeB, and the first base station is the master eNodeB and the secondary eNodeB.

That is, the key change command message generated by the master eNodeB carries the first security key context information and the second security key context information, and the two pieces of security key context information are separately used to indicate, to the UE, whether to perform the security key change. The first security key context information indicates the master eNodeB, and the second security key context information indicates the secondary eNodeB. For example, when the first security key context information indicates that the security key change needs to be performed between the master eNodeB and the UE and the second security key context information indicates that the security key change needs to be performed between the secondary eNodeB and the UE, the UE may determine that the first base station refers to the master eNodeB and the secondary eNodeB; therefore, the UE may learn, from the first security key context information and the second security key context information, that the security key change needs to be separately performed between the UE and the master eNodeB and between the UE and the secondary eNodeB.

Further, in other embodiments, the first security key context information is further used to indicate that a manner for performing the security key change between the master eNodeB and the UE is Key Re-key or Key Refresh; the second security key context information is further used to indicate that a manner for performing the security key change between the secondary eNodeB and the UE is Key Re-key or Key Refresh. That is, after adding the first security key context information and the second security key context information to the generated key change command message, the master eNodeB may further use the first security key context information and the second security key context information to indicate a manner for performing the security key change. The first security key context information indicates the master eNodeB, and the second security key context information indicates the secondary eNodeB. The master eNodeB may specifically set two fields in the key change command message to respectively represent values of the first security key context information and the second security key context information. Therefore, when the first security key context information indicates that a manner for performing the security key change between the master eNodeB and the UE is Key Re-key, and the second security key context information indicates that a manner for performing the security key change between the secondary eNodeB and the UE is Key Refresh, the UE may learn, from the first security key context information, that the manner for performing the security key change between the UE and the master eNodeB is Key Re-key, and the UE may learn, from the second security key context information, that the manner for performing the security key change between the UE and the secondary eNodeB is Key Refresh.

In other embodiments, if the indication information included in the key change command message is a key change indicator Key Change Indicator field, the UE learn, from a value of the Key Change Indicator field that is the indication information included in the key change command message, a manner for performing the security key change between the UE and the first base station. For example, the master eNodeB may set the value of the Key Change Indicator field to True to represent that Key Re-key needs to be performed between the first base station and the UE, and the UE learns, from the set value True of the Key Change Indicator, that Key Re-key is to be performed. The master eNodeB may set the value of the Key Change Indicator field to False to represent that Key Refresh needs to be performed between the first base station and the UE, and the UE learns, from the set value False of the Key Change Indicator, that Key Refresh is to be performed.

In some embodiments, the key change command message sent by the master eNodeB to the UE may further carry indication information indicating whether the UE performs random access to the first base station. After step 201 of the receiving, by a UE, a key change command message sent by a master eNodeB, this embodiment may further include the following step: determining, by the UE according to the indication information that is carried in the key change command message and that indicates whether the UE performs random access to the first base station, whether to perform random access to the first base station.

That is, the master eNodeB may specifically notify the UE of a base station to which random access is to be performed, and the UE may determine, according to the indication of the master eNodeB, whether to initiate random access and the base station to which random access is to be performed. If the key change command message indicates that the UE performs random access to the first base station, step 201 of the receiving, by a UE, a key change command message sent by a master eNodeB includes: receiving, by the UE, a key change command message that is sent by the master eNodeB and that includes information about a random access resource, and performing random access to the first base station according to the information about the random access resource.

That is, if the master eNodeB instructs the UE to perform random access to the master eNodeB, the master eNodeB may allocate a random access resource to the UE, and add information about the random access resource to the key change command message. When the UE sends a random access request to the master eNodeB, the master eNodeB sends a random access response to the UE to instruct the UE to perform random access to the master eNodeB, so as to complete an entire random access process. It should be noted that if the master eNodeB instructs the UE to perform random access to the secondary eNodeB, the UE and the secondary eNodeB may complete an entire random access process according to the foregoing method. Certainly, the master eNodeB may also instruct the UE to perform random access to the master eNodeB and the secondary eNodeB. When the UE performs random access to the master eNodeB and the secondary eNodeB, the two random access processes may be performed concurrently.

202. The UE performs, according to the key change command message, a security key change between the UE and a first base station.

In this embodiment, after the UE receives the key change command message sent by the master eNodeB, the UE performs the security key change between the UE and the first base station according to the indication of the master eNodeB. Specifically, if the first base station is the master eNodeB, the UE needs to perform a security key change between the UE and the master eNodeB; if the first base station is the secondary eNodeB, the UE needs to perform a security key change between the UE and the secondary eNodeB; if the first base station is the master eNodeB and the secondary eNodeB, the UE needs to perform a security key change between the UE and the master eNodeB, and a security key change between the UE and the secondary eNodeB.

In some embodiments, if the key change command message received by the UE includes the first indication information and the second indication information, and the master eNodeB indicates, to the UE by using the first indication information, that the security key change needs to be performed between the master eNodeB and the UE, and if the first indication information from the master eNodeB further indicates that a manner for performing the security key change between the master eNodeB and the UE is Key Re-key or Key Refresh, step 202 of the performing, by the UE according to the key change command message, a security key change between the UE and the first base station is specifically: performing, by the UE according to the first indication information, the security key change between the UE and the master eNodeB in the Key Re-key or Key Refresh manner. That is, if the master eNodeB indicates, to the UE in the first indication information, that Key Re-key is to be used, the UE needs to perform, according to the first indication information, the security key change between the UE and the master eNodeB in the Key Re-key manner; if the master eNodeB indicates, to the UE in the first indication information, that Key Refresh is to be used, the UE needs to perform, according to the first indication information, the security key change between the UE and the master eNodeB in the Key Refresh manner.

In addition, in some embodiments, if the key change command message received by the UE includes the first indication information and the second indication information, and the master eNodeB indicates, to the UE by using the second indication information, that the security key change needs to be performed between the secondary eNodeB and the UE, and if the second indication information from the master eNodeB further indicates that a manner for performing the security key change between the secondary eNodeB and the UE is Key Re-key or Key Refresh, step 202 of the performing, by the UE according to the key change command message, a security key change between the UE and the first base station is specifically: performing, by the UE according to the second indication information, the security key change between the UE and the secondary eNodeB in the Key Re-key or Key Refresh manner. That is, if the master eNodeB indicates, to the UE in the second indication information, that Key Re-key is to be used, the UE needs to perform, according to the second indication information, the security key change between the UE and the secondary eNodeB in the Key Re-key manner; if the master eNodeB indicates, to the UE in the second indication information, that Key Refresh is to be used, the UE needs to perform, according to the second indication information, the security key change between the UE and the secondary eNodeB in the Key Refresh manner.

In some embodiments, if the key change command message received by the UE includes the first security key context information and the second security key context information, and the master eNodeB indicates, to the UE by using the first security key context information, that the security key change needs to be performed between the master eNodeB and the UE, and if the first security key context information from the master eNodeB further indicates that a manner for performing the security key change between the master eNodeB and the UE is Key Re-key or Key Refresh, step 202 of the performing, by the UE according to the key change command message, a security key change between the UE and the first base station is specifically: performing, by the UE according to the first security key context information, the security key change between the UE and the master eNodeB in the Key Re-key or Key Refresh manner. That is, if the master eNodeB indicates, to the UE in the first security key context information, that Key Re-key is to be used, the UE needs to perform, according to the first security key context information, the security key change between the UE and the master eNodeB in the Key Re-key manner; if the master eNodeB indicates, to the UE in the first security key context information, that Key Refresh is to be used, the UE needs to perform, according to the first security key context information, the security key change between the UE and the master eNodeB in the Key Refresh manner.

In addition, in some embodiments, if the key change command message received by the UE includes the first security key context information and the second security key context information, and the master eNodeB indicates, to the UE by using the second security key context information, that the security key change needs to be performed between the secondary eNodeB and the UE, and if the second security key context information from the master eNodeB further indicates that a manner for performing the security key change between the secondary eNodeB and the UE is Key Re-key or Key Refresh, step 202 of the performing, by the UE according to the key change command message, a security key change between the UE and the first base station is specifically: performing, by the UE according to the second security key context information, the security key change between the UE and the secondary eNodeB in the Key Re-key or Key Refresh manner. That is, if the master eNodeB indicates, to the UE in the second security key context information, that Key Re-key is to be used, the UE needs to perform the security key change between the UE and the secondary eNodeB in the Key Re-key manner according to the second security key context information; if the master eNodeB indicates, to the UE in the second security key context information, that Key Refresh is to be used, the UE needs to perform the security key change between the UE and the secondary eNodeB in the Key Refresh manner according to the second security key context information.

In some embodiments, if the indication information included in the key change command message received by the UE is the key change indicator Key Change Indicator field, step 202 of the performing, by the UE according to the key change command message, a security key change between the UE and the first base station is specifically: determining, by the UE by using the value of the Key Change Indicator field, to perform the security key change between the UE and the first base station in a Key Re-key or Key Refresh manner. For example, if the value of the Key Change Indicator field in the key change command message from the master eNodeB is True, the UE performs the security key change between the UE and the first base station in a Key Re-key manner; if the value of the Key Change Indicator field in the key change command message from the master eNodeB is False, the UE performs the security key change between the UE and the first base station in a Key Refresh manner.

203. The UE determines, according to the key change command message, whether to keep access stratum configuration information between the UE and the master eNodeB or a secondary eNodeB and/or whether to keep data transmission between the UE and the master eNodeB or the secondary eNodeB.

In this embodiment, the UE may learn, from the key change command message, a base station that needs to perform the security key change with the UE, and may further learn that a manner for performing security key change is Key Re-key or Key Refresh. Therefore, the UE may determine whether to keep the access stratum configuration information between the UE and the master eNodeB or the secondary eNodeB and/or whether to keep data transmission between the UE and the master eNodeB or the secondary eNodeB. Specifically, step 203 may be implemented in the following three manners: 1. The UE determines whether to keep the access stratum configuration information between the UE and the master eNodeB or the secondary eNodeB; 2. The UE determines whether to keep data transmission between the UE and the master eNodeB or the secondary eNodeB; and 3. The UE determines whether to keep the access stratum configuration information between the UE and the master eNodeB or the secondary eNodeB and whether to keep data transmission between the UE and the master eNodeB or the secondary eNodeB. Condition 1 described above includes two implementation manners: In a first manner, the UE determines to keep the access stratum configuration information between the UE and the master eNodeB or the secondary eNodeB; in a second manner, the UE determines to reconfigure the access stratum configuration information between the UE and the master eNodeB or the secondary eNodeB. That the UE keeps the access stratum configuration information between the UE and the master eNodeB or the secondary eNodeB may be specifically implemented in two manners: In a first manner, the UE keeps the access stratum configuration information between the UE and the master eNodeB; in a second manner, the UE keeps the access stratum configuration information between the UE and the secondary eNodeB. Condition 2 described above includes two implementation manners: In a first manner, the UE determines to keep data transmission between the UE and the master eNodeB or the secondary eNodeB; in a second manner, the UE determines to suspend or stop data transmission between the UE and the master eNodeB or the secondary eNodeB. That the UE keeps data transmission between the UE and the master eNodeB or the secondary eNodeB may be specifically implemented in two manners: In a first manner, the UE keeps data transmission between the UE and the master eNodeB; in a second manner, the UE keeps data transmission between the UE and the secondary eNodeB. That the UE suspends or stops data transmission between the UE and the master eNodeB or the secondary eNodeB may be implemented in four manners: In a first manner, the UE suspends data transmission between the UE and the master eNodeB; in a second manner, the UE suspends data transmission between the UE and the secondary eNodeB; in a third manner, the UE stops data transmission between the UE and the master eNodeB; in a fourth manner, the UE stops data transmission between the UE and the secondary eNodeB.

It should be noted that in some embodiments, the implementation manner 1 of step 203 in which the UE determines, according to the key change command information, whether to keep the access stratum configuration information between the UE and the master eNodeB or the secondary eNodeB includes the following step: determining, by the UE according to the first indication information and the second indication information that are included in the key change command message, whether to keep the access stratum configuration information between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determining, by the UE according to the first security key context information and the second security key context information that are included in the key change command message, whether to keep the access stratum configuration information between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determining, by the UE according to the key change indicator Key Change Indicator field included in the key change command message, whether to keep the access stratum configuration information between the UE and the master eNodeB or the secondary eNodeB; or determining, by the UE according to indication information that is included in the key change command message and that indicates that the UE keeps data transmission between the UE and the master eNodeB or the secondary eNodeB, whether to keep the access stratum configuration information between the UE and the master eNodeB or the secondary eNodeB.

Implementation manners in which the UE determines whether to keep the access stratum configuration information between the UE and the master eNodeB or the secondary eNodeB is described above in this embodiment. Based on inspiration of the implementation manners provided in this embodiment, there may be another implementation manner. Only exemplary description is given herein.

Specifically, the determining, by the UE according to the Key Change Indicator field included in the key change command message, whether to keep the access stratum configuration information between the UE and the master eNodeB or the secondary eNodeB includes: when determining, according to the Key Change Indicator field, that Key Re-key needs to be performed, determining not to keep the access stratum configuration information between the UE and the master eNodeB or the secondary eNodeB; or when determining, according to the Key Change Indicator field, that Key Refresh needs to be performed based on a UE-side intermediate key corresponding to the master eNodeB, determining to keep the access stratum configuration information between the UE and the master eNodeB or the secondary eNodeB; or when determining, according to the Key Change Indicator field, that Key Refresh needs to be performed based on a next hop NH, determining to keep the access stratum configuration information between the UE and the master eNodeB or the secondary eNodeB.

It should be noted that in some embodiments, the implementation manner 2 of step 203 in which the UE determines, according to the key change command message, whether to keep data transmission between the UE and the master eNodeB or the secondary eNodeB, includes the following step: determining, by the UE according to the first indication information and the second indication information that are included in the key change command message, whether to keep data transmission between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determining, by the UE according to the first security key context information and the second security key context information that are included in the key change command message, whether to keep data transmission between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determining, by the UE according to the Key Change Indicator field included in the key change command message, whether to keep data transmission between the UE and the master eNodeB or the secondary eNodeB; or the UE determines, according to indication information that is included in the key change command message and that indicates that the UE keeps data transmission between the UE and the master eNodeB or the secondary eNodeB, whether to keep data transmission between the UE and the master eNodeB or the secondary eNodeB.

Implementation manners in which the UE determines whether to keep data transmission between the UE and the master eNodeB or the secondary eNodeB are described above in this embodiment. Based on inspiration of the implementation manners provided in this embodiment, there may be another implementation manner. Only exemplary description is given herein.

Specifically, the determining, by the UE according to the Key Change Indicator field included in the key change command message, whether to keep data transmission between the UE and the master eNodeB or the secondary eNodeB includes: when determining, according to the Key Change Indicator field, that Key Re-key needs to be performed, determining not to keep data transmission between the UE and the master eNodeB or between the UE and the secondary eNodeB; or when determining, according to the Key Change Indicator field, that Key Refresh needs to be performed based on a UE-side intermediate key corresponding to the master eNodeB, determining to keep data transmission between the UE and the secondary eNodeB; or when determining, according to the Key Change Indicator field, that Key Refresh needs to be performed based on an NH, determining to keep data transmission between the UE and the secondary eNodeB.

In some embodiments, when the UE determines, according to the key change command information, that the access stratum configuration information between the UE and the master eNodeB needs to be kept, and/or that data transmission between the UE and the master eNodeB needs to be kept, keeping the access stratum configuration information between the UE and the master eNodeB and/or keeping data transmission between the UE and the master eNodeB may specifically include at least one of the following steps: keeping, by the UE, Packet Data Convergence Protocol PDCP configurations of all radio bearers RBs established between the UE and the master eNodeB; keeping, by the UE, Radio Link Control RLC configurations of all RBs established between the UE and the master eNodeB; keeping, by the UE, Medium Access Control MAC configurations of all RBs established between the UE and the master eNodeB; keeping, by the UE, an active state of an activated secondary cell SCell between the UE and the master eNodeB; keeping, by the UE, a cell radio network temporary identifier C-RNTI used for communication between the UE and the master eNodeB; and keeping or suspending, by the UE, data transmission between the UE and the master eNodeB.

In some embodiments, when the UE determines, according to the key change command information, that the access stratum configuration information between the UE and the secondary eNodeB needs to be kept, and/or that data transmission between the UE and the secondary eNodeB needs to be kept, keeping the access stratum configuration information between the UE and the secondary eNodeB and/or keeping data transmission between the UE and the secondary eNodeB may specifically include at least one of the following steps: keeping, by the UE, PDCP configurations of all RBs established between the UE and the secondary eNodeB; keeping, by the UE, RLC configurations of all RBs established between the UE and the secondary eNodeB; keeping, by the UE, MAC configurations of all RBs established between the UE and the secondary eNodeB; keeping, by the UE, an active state of an activated SCell between the UE and the secondary eNodeB; keeping, by the UE, a C-RNTI used for communication between the UE and the secondary eNodeB; and keeping or suspending, by the UE, data transmission between the UE and the secondary eNodeB.

In some embodiments, if the key change command message indicates that the security key change needs to be performed between the master eNodeB and the UE, the UE may determine to reconfigure the access stratum configuration information between the master eNodeB and the UE, and the UE may determine to suspend or stop data transmission between the master eNodeB and the UE; if the key change command message indicates that the security key change needs to be performed between the secondary eNodeB and the UE, the UE may determine to reconfigure the access stratum configuration information between the secondary eNodeB and the UE, and the UE may determine to suspend or stop data transmission between the secondary eNodeB and the UE. It should be noted that in this embodiment, after the UE determines whether to keep the access stratum configuration information between the UE and the master eNodeB or the secondary eNodeB and/or whether to keep data transmission between the UE and the master eNodeB or the secondary eNodeB, the UE may process the access stratum configuration information between the UE and the master eNodeB or the secondary eNodeB according to a result of the determining, and may control data transmission between the UE and the master eNodeB or the secondary eNodeB according to the result of the determining. Descriptions are separately given in the following with examples.

In some embodiments, step 202 of the performing, by the UE according to the key change command message, a security key change between the UE and the first base station includes the following step.

C1. When the first base station is the master eNodeB, if the UE determines, according to the key change command message, that a manner for performing the security key change between the master eNodeB and the UE is Key Refresh, the UE performs the security key change between the UE and the master eNodeB in a Key Refresh manner.

That is, if the UE determines, according to the key change command message, that the master eNodeB indicates that the security key change needs to be performed between the UE and the master eNodeB, and a manner for performing the security key change is Key Refresh, the UE may perform the security key change between the UE and the master eNodeB in the Key Refresh manner.

Specifically, step C1 of the determining, by the UE according to the key change command message, that a manner for performing the security key change between the master eNodeB and the UE is Key Refresh is specifically: determining, by the UE according to the first indication information or the first security key context information or security context information that is carried in the key change command message, that the manner for performing the security key change between the master eNodeB and the UE is Key Refresh.

That is, the master eNodeB may use the first indication information or the first security key context information that is carried in the key change command message to indicate that a manner for performing the security key change between the master eNodeB and the UE is Key Refresh, and after receiving the key change command message, the UE may learn, from the first indication information or the first security key context information, that the manner for performing the security key change between the master eNodeB and the UE is Key Refresh. In addition, in some embodiments, the key change command message may be specifically an intra-cell handover command message, and in this case, a security context carried in the intra-cell handover command message is used to indicate that a manner for performing the security key change between the master eNodeB and the UE is Key Refresh.

It should be noted that, in other embodiments, after step 203 of the determining, by the UE according to the key change command message, whether to keep access stratum configuration information between the UE and the master eNodeB or a secondary eNodeB and/or whether to keep data transmission between the UE and the master eNodeB or the secondary eNodeB, the security key change method provided in this embodiment further includes at least one of the following steps.

C2. The UE keeps the PDCP configurations of all the radio bearers (Radio Bearer, RB) established between the UE and the secondary eNodeB.

C3. The UE keeps the Radio Link Control (RLC) configurations of all the RBs established between the UE and the secondary eNodeB.

C4. The UE keeps the Medium Access Control (MAC) configurations of all the RBs established between the UE and the secondary eNodeB.

C5. The UE keeps the active state of the activated SCell between the UE and the secondary eNodeB.

C6. The UE keeps the cell radio network temporary identifier (C-RNTI) used for communication between the UE and the secondary eNodeB.

C7. The UE keeps or suspends data transmission between the UE and the secondary eNodeB.

In step C1, the UE performs the security key change between the UE and the master eNodeB in a Key Refresh manner, which indicates that the security key change needs to be performed between the UE and the master eNodeB. In this case, during execution of at least one of step C2 to step C7, one or more of step C2 to step C7 may be executed according to a specific requirement. The access stratum configuration information between the UE and the secondary eNodeB is kept, and the UE keeps data transmission between the UE and the secondary eNodeB. Therefore, it can be avoided that the security key change between the UE and the master eNodeB causes reconfiguration of access stratum configuration information of all the RBs, and normal data transmission on the RBs between the UE and the secondary eNodeB can be ensured, which avoids unnecessary data transmission interruption between the UE and the secondary eNodeB caused by the security key change between the UE and the master eNodeB, and reduces an unnecessary data transmission delay. It should be noted that, that the UE keeps the PDCP configurations of all the RBs established between the UE and the secondary eNodeB described in the foregoing step means that the UE keeps current configurations for configuration information of the PDCP configurations. Additionally, keeping the RLC configurations and the MAC configurations has a similar meaning. Keeping the active state of the activated SCell between the UE and the secondary eNodeB means that the active state of the activated SCell remains the active state. Keeping the C-RNTI used for communication between the UE and the secondary eNodeB means that the UE still uses the current C-RNTI value.

Further, step C1 of the performing, by the UE, the security key change between the UE and the master eNodeB in the Key Refresh manner may specifically include the following steps.

C11. The UE updates, based on a next hop chaining count value indicated by the key change command message and by using a current UE-side intermediate key corresponding to the master eNodeB or a next hop (NH), the UE-side intermediate key corresponding to the master eNodeB.

C12. The UE generates, by using an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

When generating the security key corresponding to the master eNodeB, the UE first updates the UE-side intermediate key corresponding to the master eNodeB, and then uses the updated UE-side intermediate key corresponding to the master eNodeB and the security algorithm of the master eNodeB to generate the new security key corresponding to the master eNodeB.

Specifically, after step 203 of the determining, by the UE according to the key change command message, whether to keep access stratum configuration information between the UE and the master eNodeB or the secondary eNodeB and/or whether to keep data transmission between the UE and the master eNodeB or the secondary eNodeB, this embodiment may further include the following step: determining, by the UE, that the performing the security key change between the UE and the master eNodeB in the Key Refresh manner is based on the current UE-side intermediate key corresponding to the master eNodeB.

That is, if it is determined that the UE performs the security key change between the UE and the master eNodeB based on the current UE-side intermediate key corresponding to the master eNodeB, in step C11, the current UE-side intermediate key corresponding to the master eNodeB may be used to update the UE-side intermediate key corresponding to the master eNodeB, so as to obtain the updated UE-side intermediate key corresponding to the master eNodeB.

In some embodiments, step 202 of the performing, by the UE according to the key change command message, a security key change between the UE and the first base station includes the following step.

D1. When the first base station is the master eNodeB, if the UE determines, according to the key change command message, that a manner for performing the security key change between the master eNodeB and the UE is Key Re-key, the UE performs the security key change between the UE and the master eNodeB in the Key Re-key manner.

That is, if the UE determines, according to the key change command message, that the master eNodeB indicates that the security key change needs to be performed between the UE and the master eNodeB, and the manner for performing the security key change is Key Re-key, the UE may perform the security key change between the UE and the master eNodeB in the Key Re-key manner.

It should be noted that, in other embodiments, after step 203 of the determining, by the UE according to the key change command message, whether to keep access stratum configuration information between the UE and the master eNodeB or a secondary eNodeB and/or whether to keep data transmission between the UE and the master eNodeB or the secondary eNodeB, the security key change method provided in this embodiment further includes at least one of the following steps.

D2. The UE reconfigures the PDCP configurations of all the RBs established between the UE and the master eNodeB.

D3. The UE reconfigures the PDCP configurations of all the RBs established between the UE and the secondary eNodeB.

D4. The UE reconfigures the RLC configurations of all the RBs established between the UE and the master eNodeB.

D5. The UE reconfigures the RLC configurations of all the RBs established between the UE and the secondary eNodeB.

D6. The UE reconfigures the MAC configurations of all the RBs established between the UE and the master eNodeB.

D7. The UE reconfigures the MAC configurations of all the RBs established between the UE and the secondary eNodeB.

D8. The UE stops data transmission between the UE and the master eNodeB.

D9. The UE stops data transmission between the UE and the secondary eNodeB.

In step D1, the UE performs the security key change between the UE and the master eNodeB in the Key Re-key manner, which indicates that the security key change needs to be performed between the UE and the master eNodeB. In this case, during execution of at least one of step D2 to step D9, one or more of step D2 to step D9 may be executed according to a specific requirement. The access stratum configuration information between the UE and the master eNodeB or the secondary eNodeB is reconfigured, and the UE stops data transmission between the UE and the master eNodeB or the secondary eNodeB; therefore, a failure of data transmission between the UE and the master eNodeB or the secondary eNodeB can be avoided. It should be noted that, that the UE reconfigures the PDCP configurations described in the foregoing step means that the UE reconfigures configuration information of the PDCP configurations. Additionally, reconfiguring the RLC configurations and the MAC configurations has a similar meaning.

Further, step D1 of the performing, by the UE, the security key change between the UE and the master eNodeB in the Key Re-key manner may specifically include the following steps.

D11. The UE updates a UE-side intermediate key between the UE and the master eNodeB based on an updated access security management entity (ASME) intermediate key.

D12. The UE generates, according to an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

When generating the security key corresponding to the master eNodeB, the UE first updates the UE-side intermediate key corresponding to the master eNodeB, and then uses the updated UE-side intermediate key corresponding to the master eNodeB and the security algorithm of the master eNodeB to generate the new security key corresponding to the master eNodeB.

Further, in some embodiments, after step D11 of the updating a UE-side intermediate key between the UE and the master eNodeB based on an updated access security management entity ASME intermediate key, the security key change method provided in this embodiment may further include the following steps.

E1. The UE updates, according to the updated master-eNodeB-side intermediate key and cell information, associated with the security key change, of the secondary eNodeB or base station information, associated with the security key change, of the secondary eNodeB, a UE-side intermediate key corresponding to the secondary eNodeB.

E2. The UE generates, according to an updated UE-side intermediate key corresponding to the secondary eNodeB and a security algorithm of the secondary eNodeB, a new security key corresponding to the secondary eNodeB, where the new security key corresponding to the secondary eNodeB includes a cipher key used for communication between the UE and the secondary eNodeB.

When the UE generates the security key corresponding to the secondary eNodeB, the UE needs to use the updated master-eNodeB-side intermediate key, which can be acquired in step D11, to update the UE-side intermediate key corresponding to the secondary eNodeB, and then use the updated UE-side intermediate key corresponding to the secondary eNodeB and the security algorithm of the secondary eNodeB to generate the new security key corresponding to the secondary eNodeB. It should be noted that the security algorithm of the secondary eNodeB used by the UE in step E2 may be the same as the security algorithm of the master eNodeB used by the UE in step D11; certainly, the security algorithm of the secondary eNodeB used by the UE in step E2 may be different from the security algorithm of the master eNodeB used by the UE in step D11, which may be specifically determined according to an application scenario, and which is merely for description and is not intended for limitation.

Specifically, step D1 of the determining, by the UE according to the key change command message, that a manner for performing the security key change between the master eNodeB and the UE is Key Re-key is specifically: determining, by the UE according to the first indication information or the first security key context information or security context information that is carried in the key change command message, that the manner for performing the security key change between the master eNodeB and the UE is Key Refresh.

That is, the master eNodeB may use the first indication information or the first security key context information that is carried in the key change command message to indicate that a manner for performing the security key change between the master eNodeB and the UE is Key Re-key, and after receiving the key change command message, the UE may learn, from the first indication information or the first security key context information, that the manner for performing the security key change between the master eNodeB and the UE is Key Re-key. In addition, in some embodiments, the key change command message may be specifically an intra-cell handover command message, and in this case, a security context carried in the intra-cell handover command message is used to indicate that a manner for performing the security key change between the master eNodeB and the UE is Key Re-key.

In some embodiments, if the indication information included in the key change command message indicates that the UE keeps data transmission between the UE and a second base station, after step 203 of the determining, by the UE according to the key change command message, whether to keep access stratum configuration information between the UE and the master eNodeB or a secondary eNodeB and/or whether to keep data transmission between the UE and the master eNodeB or the secondary eNodeB, the security key change method provided in this embodiment further includes at least one of the following steps.

F1. The UE keeps PDCP configurations of all RBs established between the UE and the second base station.

F2. The UE keeps RLC configurations of all RBs established between the UE and the second base station.

F3. The UE keeps MAC configurations of all RBs established between the UE and the second base station.

F4. The UE keeps an active state of an activated SCell between the UE and the second base station.

F5. The UE keeps a C-RNTI used for communication between the UE and the second base station.

F6. The UE keeps data transmission between the UE and the second base station.

The indication information included in the key change command message indicates that the UE keeps data transmission between the UE and the second base station. When the second base station is the master eNodeB, the first base station is the secondary eNodeB; or when the second base station is the secondary eNodeB, the second base station is the master eNodeB. When the indication information included in the key change command message indicates that the UE keeps data transmission between the UE and the second base station, it indicates that the security key change needs to be performed between the UE and the first base station. In this case, during execution of at least one of step F1 to step F6, one or more of step F1 to step F6 may be executed according to a specific requirement. Access stratum configuration information between the UE and the second base station is kept, and the UE keeps data transmission between the UE and the second base station. Therefore, it can be avoided that the security key change between the UE and the first base station causes reconfiguration of access stratum configuration information of all the RBs, and normal data transmission on the RBs between the UE and the second base station can be ensured, which avoids unnecessary data transmission interruption between the UE and the second base station caused by the security key change between the UE and the first base station, and reduces an unnecessary data transmission delay.

In some embodiments, if the key change command message carries indication information indicating that the UE suspends data transmission between the UE and the first base station, after step 203 of the determining, by the UE according to the key change command message, whether to keep access stratum configuration information between the UE and the master eNodeB or a secondary eNodeB and/or whether to keep data transmission between the UE and the master eNodeB or the secondary eNodeB, the security key change method provided in this embodiment further includes at least one of the following steps.

G1. The UE keeps PDCP configurations of all RBs established between the UE and the first base station.

G2. The UE keeps RLC configurations of all RBs established between the UE and the first base station.

G3. The UE keeps MAC configurations of all RBs established between the UE and the first base station.

G4. The UE keeps an active state of an activated SCell between the UE and the first base station;

G5. The UE keeps a C-RNTI used for communication between the UE and the first base station.

G6. The UE suspends data transmission between the UE and the first base station.

The indication information included in the key change command message indicates that the UE suspends data transmission between the UE and the first base station. In this case, during execution of at least one of step G1 to step G6, one or more of step G1 to step G6 may be executed according to a specific requirement. Access stratum configuration information between the UE and the first base station is kept, and the UE suspends data transmission between the UE and the first base station; therefore, reconfiguration of the access stratum configuration information between the UE and the first base station can be avoided.

In some embodiments, if the key change command message carries indication information indicating that the UE stops data transmission between the UE and the first base station, after step 203 of the determining, by the UE according to the key change command message, whether to keep access stratum configuration information between the UE and the master eNodeB or a secondary eNodeB and/or whether to keep data transmission between the UE and the master eNodeB or the secondary eNodeB, the security key change method provided in this embodiment further includes at least one of the following steps.

H1. The UE reconfigures PDCP configurations of all RBs established between the UE and the first base station.

H2. The UE reconfigures RLC configurations of all RBs established between the UE and the first base station.

H3. The UE reconfigures MAC configurations of all RBs established between the UE and the first base station.

H4. The UE stops data transmission between the UE and the first base station.

The indication information included in the key change command message indicates that the UE stops data transmission between the UE and the first base station. In this case, it indicates that the security key change needs to be performed between the UE and the first base station. In this case, during execution of at least one of step H1 to step H4, one or more of step H1 to step H4 may be executed according to a specific requirement. The access stratum configuration information between the UE and the first base station is reconfigured, and the UE stops data transmission between the UE and the first base station; therefore, a failure of data transmission between the UE and the first base station can be avoided.

204. The UE sends a key change complete message to the master eNodeB, so that the first base station determines that the security key change between the UE and the first base station is completed.

In this embodiment, after the UE completes the security key change between the UE and the first base station, the UE sends the key change complete message to the master eNodeB, and the master eNodeB may receive the key change complete message sent by the UE. After the master eNodeB receives the key change complete message sent by the UE, the first base station may determine, by using the key change complete message received by the master eNodeB, that the security key change between the UE and the first base station is completed. The first base station may use a new security key to continue performing data transmission with the UE. It should be noted that, it can be learned from the foregoing descriptions that the first base station may refer to the master eNodeB, or may refer to the secondary eNodeB, or may refer to the master eNodeB and the secondary eNodeB; therefore, after obtaining a feedback from the UE that the security key change is completed, a base station that needs to perform the security key change with the UE needs to be instructed to continue performing data transmission with the UE. The security key change between the master eNodeB and the UE does not affect data transmission between the secondary eNodeB and the UE; likewise, the security key change between the secondary eNodeB and the UE does not affect data transmission between the master eNodeB and the UE.

It can be learned from the foregoing descriptions in this embodiment that: a master eNodeB sends a key change command message to a UE, and the UE performs, according to the key change command message, a security key change between the UE and a first base station, and determines, according to the key change command message, whether to keep access stratum configuration information between the UE and the master eNodeB or a secondary eNodeB and/or whether to keep data transmission between the UE and the master eNodeB or the secondary eNodeB; after the UE completes the security key change, the UE sends a key change complete message to the master eNodeB, the master eNodeB may receive the key change complete message sent by the UE, the first base station may determine, by using the master eNodeB, that the security key change between the UE and the first base station is completed, and the first base station and the UE can use a new security key to perform data transmission. Therefore, according to this embodiment, a security key change can be implemented when a UE performs dual connectivity communication with both an MeNB and an SeNB.

For a better understanding and implementation of the foregoing solutions in the embodiments, specific descriptions are provided below by using corresponding application scenarios as examples.

In an application scenario, referring to FIG. 3-*a*, FIG. 3-*a* is a schematic flowchart of an interaction among a master eNodeB, a secondary eNodeB, and a UE according to an embodiment, which may specifically include the following steps.

S01. The MeNB determines that a security key change needs to be performed, and either Key Refresh or Key Re-key may be performed.

Specifically, when the MeNB receives a key indication command, from an MME, that requires performing Key Re-key, the MeNB determines that Key Re-key needs to be performed. When the MeNB determines that Key Refresh needs to be performed, for example, when determining that a current PDCP Count value of the UE is about to wrap around, the MeNB determines that Key Refresh needs to be performed.

S02. When the MeNB determines that Key Re-key needs to be performed, the MeNB may send a key change indication message to the SeNB to instruct the SeNB to perform the security key change.

Specifically, the MeNB may add, to the key change indication message, one or more secondary-eNodeB-side intermediate keys generated based on a new master-eNodeB-side intermediate key of the MeNB, and a frequency/frequencies and PCI information of one or more cells of the SeNB, or a specific security parameter of the SeNB, for example, a PDCP COUNT value. The one or more cells of the SeNB are a cell/cells associated with generation of a security key of the SeNB, and the one or more secondary-eNodeB-side intermediate keys are used to generate a user-plane cipher key on an SeNB side.

S03. The MeNB sends an intra-cell HO command message to the UE, so that the UE performs a security key change process according to the intra-cell HO command message.

Specifically, when Key Re-key needs to be performed, a Key Change Indicator in the intra-cell HO command message is set to True; otherwise, when Key Refresh needs to be performed, the Key Change Indicator in the intra-cell HO command message is set to False. If Key Re-key needs to be performed, the intra-cell HO command message may further include updated cell information, associated with a security key, on the SeNB side or an updated security parameter of the base station, associated with a security key, on the SeNB side.

S04. After the UE receives the intra-cell handover command message sent by the MeNB, the UE performs the security key change, and determines, according to a Key Change Indicator in the intra-cell HO command message, whether to keep access stratum configuration information between the UE and the SeNB and/or whether to keep data transmission between the UE and the SeNB.

Specifically, when it is determined, according to the indicator in the intra-cell HO command message, that Key Refresh needs to be performed or the Key Change Indicator is False, the UE should perform one or more of the following operations.

(1) Keep PDCP configurations of all RBs established between the UE and the SeNB.

(2) Keep RLC configurations of all RBs established between the UE and the SeNB.

(3) Keep MAC configurations of all RBs established between the UE and the SeNB.

(4) Keep an active state of an activated SCell between the UE and the SeNB.

(5) Keep a C-RNTI used for communication between the UE and the SeNB.

(6) Keep/suspend data transmission between the UE and the SeNB.

(7) Perform a Key Refresh process between the UE and the MeNB.

Specifically, performing Key Refresh between the UE and the MeNB is updating a UE-side intermediate key corresponding to the MeNB by using a Next Hop Chaining Count value indicated in the intra-cell HO command message and based on a current UE-side intermediate key corresponding to the MeNB or an NH, and further generating, by using an updated UE-side intermediate key corresponding to the MeNB and a security algorithm of the MeNB, a new cipher key and a new integrity protection key that are used for communication with the MeNB.

If it is determined, according to the intra-cell HO command message, that Key Re-key needs to be performed, the UE should perform one or more of the following operations (1) Reconfigure MAC on an MeNB side.

(2) Reconfigure MAC on the SeNB side.

(3) For all RBs established on an MeNB side and the SeNB side, re-establish PDCP of these RBs.

(4) For all RBs established on an MeNB side and the SeNB side, re-establish RLC of these RBs.

(5) Stop data transmission between the UE and the MeNB and between the UE and the SeNB.

(6) Update security keys for the MeNB and the SeNB according to security context information in the intra-cell HO command message.

Specifically, for the MeNB, the UE generates the new UE-side intermediate key between the UE and the MeNB based on the updated ASME intermediate key, and generates, according to the newly generated UE-side intermediate key between the UE and the MeNB and the security algorithm of the MeNB, the new cipher key and the new integrity protection key that are used for communication with the MeNB. Further, the UE generates a UE-side intermediate key between the UE and the SeNB side according to the new UE-side intermediate key between the UE and the MeNB and the cell information, associated with the security key change, on the SeNB side or the specific parameter of the base station, associated with security, on the SeNB side, for example, the PDCP COUNT, and then the UE generates, based on the new UE-side intermediate key between the UE and the SeNB and a security algorithm of the SeNB or the security algorithm of the MeNB, a new cipher key used for communication with the SeNB. The cell information, associated with security, of the SeNB is cell information, associated with security, between the UE and the SeNB before the security key change or updated cell information, associated with security and obtained from the intra-cell HO command message, of the SeNB. Specifically, the cell information includes a physical cell identifier (PCI) and a frequency.

S05. The UE sends a handover complete message to the MeNB. Specifically, after successfully performing random access to the MeNB, the UE may send the handover complete message to the MeNB; or after successfully performing random access to both the MeNB and the SeNB, the UE may send the handover complete message to the MeNB.

Specifically, when the UE determines to perform Key Refresh, the UE does not need to perform random access to the SeNB. When the UE determines to perform Key Re-key, the UE may perform random access to both the MeNB and the SeNB, where random access to the MeNB and the SeNB may be performed concurrently.

S06. The MeNB sends a key change complete message to the SeNB.

Specifically, if Key Re-key needs to be performed, when the UE does not perform random access to the SeNB, the MeNB needs to send the key change complete message to the SeNB to notify the SeNB that the security key change process of the UE is successfully completed, and data transmission between the UE and the SeNB may be performed by using a new security key. In the case of Key Refresh, if the UE suspends data transmission with the SeNB, the key change complete message sent by the MeNB to the SeNB is used to indicate that suspended data transmission between the UE and the SeNB may be recovered.

It should be noted that in the application scenario described in FIG. 3-a, generation of the SeNB-side intermediate key by the SeNB depends on the MeNB. In this case, when the MeNB performs Key Re-key, the SeNB also needs to perform a security key change. In another application scenario, referring to FIG. 3-b, FIG. 3-b is a schematic flowchart of another interaction among a master eNodeB, a secondary eNodeB, and a UE according to an embodiment, which may specifically include the following steps.

Step S11: The MeNB determines that a security key change needs to be performed, and either Key-Refresh or Key Re-key is to be performed.

Specifically, when the MeNB receives a key indication command, from an MME, that requires performing Key Re-key on an MeNB side and/or an SeNB side, the MeNB determines that Key Re-key needs to be performed. When the MeNB determines that a current PDCP Count value of the UE on the MeNB side is about to wrap around, the MeNB may determine that the UE needs to perform key Refresh for the MeNB. It should be noted that before step S11, this embodiment may further include step S10: The SeNB sends key refresh indication information to the MeNB. After the MeNB receives indication information that is sent by the SeNB and that indicates that a PDCP Count value on the SeNB side is about to wrap around or indication information that is sent by the SeNB and that indicates that the SeNB needs to perform Key Refresh, or when the MeNB receives indication information that is reported by the SeNB or the UE and that indicates that a current PDCP Count value on the SeNB side is about to wrap around, the MeNB may determine that the UE needs to perform key Refresh on security keys for the MeNB and/or the SeNB.

Step S12: When the MeNB receives an indication that is sent by an MME and that requires performing Key Re-key of a security key on an SeNB side, the MeNB needs to send a key change indication message to the SeNB to instruct the SeNB to perform a Key Re-key process.

Step S13a: When determining that a security key change needs to be performed between the UE and the MeNB, the MeNB sends an intra-cell HO command message to the UE, where the intra-cell HO command message includes indication information indicating whether the UE performs Key Re-key or Key Refresh on a security key for the MeNB, for example, by using a Key Change Indicator in the intra-cell HO command message.

Step S13b: When determining that the security key between the UE and the SeNB needs to be changed, the MeNB sends a key change command message to the UE, where the key change command message includes indication information indicating whether the UE performs Key Re-key or Key Refresh on the security key on the SeNB side.

Step S14. After the UE receives the intra-cell HO command message sent by the MeNB, if it is determined, according to the indicator of the intra-cell HO command message, that the security key change on an MeNB side needs to be performed, the UE should perform one of more of the following operations.

(1) Perform only a security key change process between the UE and the MeNB.

(2) Keep PDCP configurations of all RBs established between the UE and the SeNB.

(3) Keep RLC configurations of all RBs established between the UE and the SeNB.

(4) Keep MAC configurations of all RBs established between the UE and the SeNB.

(5) Keep an active state of an activated SCell between the UE and the SeNB.

(6) Keep a C-RNTI used for communication between the UE and the SeNB.

(7) Keep/suspend data transmission between the UE and the SeNB.

If the UE receives the key change command message in addition to the intra-cell HO command message, the UE should perform one or more of the following operations.

(1) Reconfigure MAC on the SeNB side.
(2) Re-establish PDCP for RBs established on the SeNB.
(3) Re-establish RLC for RBs established on the SeNB.
(4) Stop data transmission between the UE and the SeNB.
(5) Change, according to security context information carried in the key change command message and key change indication information, the security key used for communication with the SeNB.

Specifically, when determining, according to the key change indication information that Key Re-key needs to be performed, the UE updates a UE-side intermediate key between the UE and the SeNB based on an updated ASME intermediate key between the UE and the SeNB, and generates, based on an updated UE-side intermediate key between the UE and the SeNB and a security algorithm of the SeNB, a new cipher key used for communication with the SeNB; when determining, according to the key change indication information, that key Refresh needs to be performed, the UE updates, based a current UE-side intermediate key corresponding to the SeNB or an NH value, a UE-side intermediate key corresponding to the SeNB, and then generates a new cipher key based on an updated UE-side intermediate key corresponding to the SeNB and a security algorithm of the SeNB.

S15a. The UE sends a handover complete message to the MeNB. This step is a response to step S13a. Specifically, the UE may send the handover complete message to the MeNB after successfully performing random access to the MeNB; or the UE may send the handover complete message to the MeNB after successfully performing random access to both the MeNB and the SeNB.

Specifically, when the UE determines to perform Key Refresh, the UE does not need to perform random access to the SeNB. When the UE determines to perform Key Re-key, the UE may perform random access to both the MeNB and the SeNB, where random access to the MeNB and the SeNB may be performed concurrently.

S15b. The UE sends a key change complete message to the MeNB; this step is a response to step S13b.

S16. The MeNB sends the key change complete message to the SeNB. Specifically, if Key Re-key needs to be performed, when the UE does not perform random access to the SeNB, the MeNB needs to send the key change complete message to the SeNB to notify the SeNB that the security key change process of the UE is successfully completed, and data transmission between the UE and the SeNB may be performed by using a new security key. In the case of Key Refresh, if the UE suspends data transmission with the SeNB, the key change complete message sent by the MeNB to the SeNB is used to indicate that suspended data transmission between the UE and the SeNB may be recovered.

In another application scenario, referring to FIG. 3-c, FIG. 3-c is a schematic flowchart of another interaction among a master eNodeB, a secondary eNodeB, and a UE according to an embodiment, which may specifically include the following steps.

Step S21. The MeNB determines that a security key change needs to be performed, and either Key-fresh or Key Re-key is to be performed.

Specifically, when the MeNB receives a key indication command, from an MME, that requires performing Key Re-key on an MeNB side or an SeNB side, the MeNB determines that Key Re-key needs to be performed. When the MeNB determines that a current PDCP Count value of the UE on the MeNB side is about to wrap around, the MeNB may determine that the UE needs to perform key Refresh for the MeNB. It should be noted that before step S21, this embodiment may further include step S20: The SeNB sends key refresh indication information to the MeNB. After the MeNB receives indication information that is sent by the SeNB and that indicates that a PDCP Count value on the SeNB side is about to wrap around or indication information that is sent by the SeNB and that indicates that the SeNB needs to perform Key Refresh, or when the MeNB receives indication information that is reported by the SeNB or the UE and that indicates that a current PDCP Count value on the SeNB side is about to wrap around, the MeNB may determine that the UE needs to perform key Refresh on a security key for the SeNB.

S22. When the MeNB determines that Key Re-key needs to be performed, the MeNB may send a key change indication message to the SeNB to indicate that the SeNB needs to perform the security key change.

Specifically, if an intermediate key corresponding to the SeNB is generated based on an intermediate key of the MeNB, one or more intermediate keys corresponding to the SeNB that are generated based on a new intermediate key of the MeNB, and a frequency/frequencies and PCI information of one or more cells of the SeNB, or a specific security parameter of the SeNB, for example, a PDCP COUNT value, may be carried in the key change indication information. The one or more cells of the SeNB are a cell/cells associated with generation of a security key of the SeNB, and the one or more intermediate keys corresponding to the SeNB are used for generating a user-plane cipher key on the SeNB side.

If the intermediate key corresponding to the SeNB is generated from an ASME intermediate key, the key change indication information carries a new intermediate key corresponding to the SeNB that is generated by the MME for the SeNB.

S23. The MeNB sends a key change command message to the UE, so that the UE performs a security key change process according to the key change command message.

Specifically, the key change command message includes first indication information and second indication information. The first indication information is used to instruct the UE to change a security key between the UE and the MeNB, and the second indication information is used to instruct the UE to change a security key between the UE and the SeNB.

Further, the first indication information may further include indication information indicating whether Key Re-key or key Refresh is to be performed, and the second indication information may further include indication information indicating whether Key Re-key or Key Refresh is to be performed.

Specially, the foregoing key change command message may be an intra-cell HO command message.

S24. After receiving the key change command message sent by the MeNB, the UE determines, according to first indication information and second indication information in the key change command message, how to perform the security key change process.

Specifically, when determining, according to the indication of the key change command message, that only a security key change between the UE and the MeNB needs to be performed, for example, when the first indication information is True and the second indication information is False, the UE should perform one or more of the following operations.

(1) Keep PDCP configurations of all RBs established between the UE and the SeNB.

(2) Keep RLC configurations of all RBs established between the UE and the SeNB.

(3) Keep MAC configurations of all RBs established between the UE and the SeNB.

(4) Keep an active state of an activated SCell between the UE and the SeNB.

(5) Keep a C-RNTI used for communication between the UE and the SeNB.

(6) Keep/suspend data transmission between the UE and the SeNB.

(7) Perform a security key change process between the UE and the MeNB.

Specifically, when determining, according to the first indication information (for example, the first indication information includes indication of performing key Refresh) or security context information carried in the key change command message (for example, the key change command message includes a Next Hop Chaining Count value), that key Refresh between the UE and the MeNB needs to be performed, the UE generates a new MeNB-side intermediate key based on a current MeNB-side intermediate key or an NH, and further uses an updated MeNB-side intermediate key and a security algorithm of the MeNB to generate a new cipher key and a new integrity protection key that are used for communication with the MeNB. When determining, according to the first indication information (for example, the first indication information includes indication of performing key Re-rekey) or security context information carried in the key change command message (for example, the key change command message does not include a Next Hop Chaining Count value, or the value is empty), that a Key Re-key process between the UE and the MeNB needs to be performed, the UE generates a new MeNB-side intermediate key based on a new ASME intermediate key between the UE and the MeNB, and then uses an updated MeNB-side intermediate key and a security algorithm of the MeNB to generate a new cipher key and a new integrity protection key that are used for communication with the MeNB.

When determining, according to the indication of the key change command message, that only a security key change between the UE and the SeNB needs to be performed, for example, when the first indication information is False and the second indication information is True, the UE should perform one or more of the following operations.

(1) Keep PDCP, RLC, and MAC configurations of all RBs established between the UE and the MeNB.

(2) Keep an active state of an activated SCell between the UE and the MeNB.

(3) Keep communication between the UE and the MeNB.

(4) Reconfigure MAC on the SeNB side.

(5) For all RBs established on the SeNB side, re-establish PDCP of these RBs.

(6) For all RBs established on the SeNB side, re-establish RLC of these RBs.

(7) Stop data transmission between the UE and the SeNB.

(8) Perform a security key change process between the UE and the SeNB.

Specifically, when determining, according to the second indication information (for example, the second indication information includes indication of performing key Refresh) or security context information carried in the key change command message (for example, the key change command message includes a Next Hop Chaining Count value), that key Refresh between the UE and the SeNB needs to be performed, the UE generates a new SeNB-side intermediate key based on a current SeNB-side intermediate key or an NH, and further uses an updated SeNB-side intermediate key and a security algorithm of the SeNB to generate a new cipher key used for communication with the SeNB. When determining, according to the second indication information (for example, the second indication information includes indication of performing key Re-rekey) or security context information carried in the key change command message (for example, the key change command message does not include a Next Hop Chaining Count value, or the value is empty), that a Key Re-key process between the UE and the SeNB needs to be performed, the UE generates a new SeNB-side intermediate key based on a new ASME intermediate key between the UE and the SeNB, and then uses an updated SeNB-side intermediate key and a security algorithm of the SeNB to generate a new cipher key used for communication with the SeNB.

When determining, according to the indication of the key change command message, that security key change processes between the UE and the MeNB and between the UE and the SeNB need to be performed, for example, when both the first indication information and the second indication information are True, the UE should perform one or more of the following operations.

(1) Reconfigure MAC on the MeNB side.

(2) Reconfigure MAC on the SeNB side.

(3) For all RBs established on the MeNB side and the SeNB side, re-establish PDCP of these RBs.

(4) For all RBs established on the MeNB side and the SeNB side, re-establish RLC of these RBs.

(5) Stop data transmission between the UE and the MeNB and between the UE and the SeNB.

(6) Perform the security key change processes between the UE and the MeNB and between the UE and the SeNB, which is specifically as follows.

When determining, according to the first indication information (for example, the first indication information includes indication of performing key Refresh) or security context information carried in the key change command message (for example, the key change command message includes a Next Hop Chaining Count value), that key Refresh between the UE and the MeNB needs to be performed, the UE generates a new MeNB-side intermediate key based on a current MeNB-side intermediate key or an NH, and further uses an updated MeNB-side intermediate key and a security algorithm of the MeNB to generate a new cipher key and a new integrity protection key that are used for communication with the MeNB. When determining, according to the first indication information (for example, the first indication information includes indication of performing key Re-rekey) or security context information carried in the key change command message (for example, the key change command message does not include a Next Hop Chaining Count value, or the value is empty), that a Key Re-key process between the UE and the MeNB needs to be performed, the UE generates a new MeNB-side intermediate key based on a new ASME intermediate key between the UE and the MeNB, and then uses an updated MeNB-side intermediate key and a security algorithm of the MeNB to generate a new cipher key and a new integrity protection key that are used for communication with the MeNB.

Specifically, when determining, according to the second indication information (for example, the second indication information includes indication of performing key Refresh) or security context information carried in the key change command message (for example, the key change command message includes a Next Hop Chaining Count value), that key Refresh between the UE and the SeNB needs to be performed, the UE generates a new SeNB-side intermediate key based on a current SeNB-side intermediate key or an NH, and further uses an updated SeNB-side intermediate key and a security algorithm of the SeNB to generate a new cipher key used for communication with the SeNB. When determining, according to the second indication information (for example, the second indication information includes indication of performing key Re-rekey) or security context information carried in the key change command message (for example, the key change command message does not include a Next Hop Chaining Count value, or the value is empty), that a Key Re-key process between the UE and the SeNB needs to be performed, the UE generates a new SeNB-side intermediate key based on a new ASME intermediate key between the UE and the SeNB, and then uses an updated SeNB-side intermediate key and a security algorithm of the SeNB to generate a new cipher key used for communication with the SeNB.

S25. The UE sends a key change complete message to the MeNB.

Specifically, according to whether both the MeNB and the SeNB perform the security key change, the UE may send the key change complete message to the MeNB after successfully performing random access to the MeNB or the SeNB (if only a key of the MeNB or the SeNB is changed); or the UE may send the key change complete message to the MeNB after successfully performing random access to both the MeNB and the SeNB (keys of both the MeNB and the SeNB are changed). When the UE performs random access to both the MeNB and the SeNB, the two random access processes may be performed concurrently.

Specifically, the UE may be specifically notified, in the foregoing key change command message, of whether the UE performs random access to the MeNB and/or the SeNB. That is, the foregoing key change command message includes indication information indicating whether to perform random access to the MeNB and/or the SeNB.

S26. The MeNB sends the key change complete message to the SeNB. Exceptionally, when the UE performs random access to the SeNB, the SeNB may determine, after determining that the UE successfully performs a random access process, that the security key change is completed. Therefore, in this case, the MeNB may not send the key change complete message to the SeNB.

In another application scenario, referring to FIG. 3-*d*, FIG. 3-*d* is a schematic flowchart of another interaction among a master eNodeB, a secondary eNodeB, and a UE according to an embodiment, which may specifically include the following steps.

S31. The MeNB determines that a security key change needs to be performed, and either Key-fresh or Key Re-key is to be performed.

Specifically, when the MeNB receives a key indication command, from an MME, that requires performing Key Re-key on an MeNB side or an SeNB side, the MeNB determines that Key Re-key needs to be performed. When the MeNB determines that a current PDCP Count value of the UE on the MeNB side is about to wrap around, the MeNB may determine that the UE needs to perform key Refresh for the MeNB. It should be noted that before step S31, this embodiment may further include step S30: The SeNB sends key refresh indication information to the MeNB. After the MeNB receives indication information that is sent by the SeNB and that indicates that a PDCP Count value on the SeNB side is about to wrap around or indication information that is sent by the SeNB and that indicates that the SeNB needs to perform Key Refresh, or when the MeNB receives indication information that is reported by the SeNB or the UE and that indicates that a current PDCP Count value on the SeNB side is about to wrap around, the MeNB may determine that the UE needs to perform key Refresh on a security key for the SeNB.

S32. When the MeNB determines that Key Re-key needs to be performed, the MeNB may send a key change indication message to the SeNB to indicate that the SeNB needs to perform the security key change.

Specifically, if an intermediate key corresponding to the SeNB is generated based on an intermediate key of the MeNB, one or more intermediate keys corresponding to the SeNB that are generated based on a new intermediate key of the MeNB, and a frequency/frequencies and PCI information of one or more cells of the SeNB, or a specific security parameter of the SeNB, for example, a PDCP COUNT value, may be carried in the key change indication information. The one or more cells of the SeNB are a cell/cells associated with generation of a security key of the SeNB, and the one or more intermediate keys corresponding to the SeNB are used for generating a user-plane cipher key on the SeNB side.

If the intermediate key corresponding to the SeNB is generated from an ASME intermediate key, the key change indication information carries a new intermediate key corresponding to the SeNB that is generated by the MME for the SeNB.

S33. The MeNB sends a key change command message to the UE, so that the UE performs a security key change process according to the key change command message.

Specifically, the key change command message includes first security key context information and second security key context information. The first security key context information is used to instruct the UE to change a security key between the UE and the MeNB, and the second security key context information is used to instruct the UE to change a security key between the UE and the SeNB.

Specially, the foregoing key change command message may be an intra-cell HO command message.

S34. After receiving the key change command message sent by the MeNB, the UE determines, according to first security key context information and second security key context information in the key change command message, how to perform the security key change process.

Specifically, if the key change command message includes only the first security key context information, the UE determines, according to the key change command message, that only a security key change between the UE and the MeNB needs to be performed, and the UE should perform one or more of the following operations.

(1) Keep PDCP configurations of all RBs established between the UE and the SeNB.

(2) Keep RLC configurations of all RBs established between the UE and the SeNB.

(3) Keep MAC configurations of all RBs established between the UE and the SeNB.

(4) Keep an active state of an activated SCell between the UE and the SeNB.

(5) Keep a C-RNTI used for communication between the UE and the SeNB.

(6) Keep/suspend data transmission between the UE and the SeNB.

(7) Perform a security key change process between the UE and the MeNB.

Specifically, when determining, according to the first security key context information (for example, the first security key context information includes a Next Hop Chaining Count value), that key Refresh between the UE and the MeNB needs to be performed, the UE generates a new MeNB-side intermediate key based on a current MeNB-side intermediate key or an NH, and further uses an updated MeNB-side intermediate key and a security algorithm of the MeNB to generate a new cipher key and a new integrity protection key that are used for communication with the MeNB. When determining, according to the first security key context information (for example, the first security key context information includes a Key Re-key indication), that Key Re-key between the UE and the MeNB needs to be performed, the UE generates a new MeNB-side intermediate key based on a new ASME intermediate key between the UE and the MeNB, and then uses an updated MeNB-side intermediate key and a security algorithm of the MeNB to generate a new cipher key and a new integrity protection key that are used for communication with the MeNB.

If the key change command message includes only the second security key context information, the UE determines, according to the key change command message, that only a security key change between the UE and the SeNB needs to be performed, and the UE should perform one or more of the following operation.

(1) Keep PDCP, RLC, and MAC configurations of all RBs established between the UE and the MeNB.

(2) Keep an active state of an activated SCell between the UE and the MeNB.

(3) Keep data transmission between the UE and the MeNB.

(4) Reconfigure MAC on the SeNB side.

(5) For all RBs established on the SeNB side, re-establish PDCP of these RBs.

(6) For all RBs established on the SeNB side, re-establish RLC of these RBs.

(7) Stop data transmission between the UE and the SeNB.

(8) Perform a key change process between the UE and the SeNB.

Specifically, when determining, according to the second security key context information (for example, the second security key context information includes a Next Hop Chaining Count value), that key Refresh between the UE and the SeNB needs to be performed, the UE generates a new SeNB-side intermediate key based on a current SeNB-side intermediate key or an NH, and further uses an updated SeNB-side intermediate key and a security algorithm of the SeNB to generate a new cipher key used for communication with the SeNB. When determining, according to the second security key context information (for example, the second security key context information includes an indication of performing key Re-rekey), that a Key Re-key process between the UE and the MeNB needs to be performed, the UE generates a new SeNB-side intermediate key based on a new ASME intermediate key between the UE and the SeNB, and then uses an updated SeNB-side intermediate key and a security algorithm of the SeNB to generate a new cipher key used for communication with the SeNB.

If determining, according to the first security key context information and the second security key context information, that key changes between the UE and the MeNB and between the UE and the SeNB need to be performed, for example, when the key change command message includes the first security key context information and the second security key context information, the UE should perform one or more of the following steps.

(1) Reconfigure MAC on the MeNB side.
(2) Reconfigure MAC on the SeNB side.
(3) For all RBs established on the MeNB side and the SeNB side, re-establish PDCP of these RBs.
(4) For all RBs established on the MeNB side and the SeNB side, re-establish RLC of these RBs.
(5) Stop data transmission between the UE and the MeNB and between the UE and the SeNB.
(6) Perform the security key change processes between the UE and the MeNB and between the UE and the SeNB, which is specifically as follows.

When determining, according to the first security key context information (for example, the first security key context information includes a Next Hop Chaining Count value), that key Refresh between the UE and the MeNB needs to be performed, the UE generates a new MeNB-side intermediate key based on a current MeNB-side intermediate key or an NH, and further uses an updated MeNB-side intermediate key and a security algorithm of the MeNB to generate a new cipher key and a new integrity protection key that are used for communication with the MeNB. When determining, according to the first security key context information (for example, the first security key context information includes a Key Re-key indication), that Key Re-key between the UE and the MeNB needs to be performed, the UE generates a new MeNB-side intermediate key based on a new ASME intermediate key between the UE and the MeNB, and then uses an updated MeNB-side intermediate key and a security algorithm of the MeNB to generate a new cipher key and a new integrity protection key that are used for communication with the MeNB.

When determining, according to the second security key context information (for example, the second security key context information includes a Next Hop Chaining Count value), that key Refresh between the UE and the SeNB needs to be performed, the UE generates a new SeNB-side intermediate key based on a current SeNB-side intermediate key or an NH, and further uses an updated SeNB-side intermediate key and a security algorithm of the SeNB to generate a new cipher key used for communication with the SeNB. When determining, according to the second security key context information (for example, the second security key context information includes an indication of performing key Re-rekey), that a Key Re-key process between the UE and the MeNB needs to be performed, the UE generates a new SeNB-side intermediate key based on a new ASME intermediate key between the UE and the SeNB, and then uses an updated SeNB-side intermediate key and a security algorithm of the SeNB to generate a new cipher key used for communication with the SeNB.

S35. The UE sends a key change complete message to the MeNB.

Specifically, according to whether both the MeNB and the SeNB perform the security key change, the UE may send the key change complete message to the MeNB after successfully performing random access to the MeNB or the SeNB (if only a key of the MeNB or the SeNB is changed); or the UE may send the key change complete message to the MeNB after successfully performing random access to both the MeNB and the SeNB (keys of both the MeNB and the SeNB are changed). When the UE performs random access to both the MeNB and the SeNB, the two random access processes may be performed concurrently.

Specifically, the UE may be specifically notified, in the foregoing key change command message, of whether the UE performs random access to the MeNB and/or the SeNB. That is, the foregoing key change command message includes indication information indicating whether to perform random access to the MeNB and/or the SeNB.

S36. The MeNB sends the key change complete message to the SeNB. Exceptionally, when the UE performs random access to the SeNB, the SeNB may determine, after determining that the UE successfully performs a random access process, that the security key change is completed. Therefore, in this case, the MeNB may not send the key change complete message to the SeNB.

In another application scenario, referring to FIG. 3-e, FIG. 3-e is a schematic flowchart of another interaction among a master eNodeB, a secondary eNodeB, and a UE according to an embodiment, which may specifically include the following steps.

S41. The MeNB determines that a security key change needs to be performed, and either Key Refresh or Key Re-key may be performed.

Specifically, when the MeNB receives a key indication command, from an MME, that requires performing Key Re-key, the MeNB determines that Key Re-key needs to be performed. When the MeNB determines that Key Refresh needs to be performed, for example, when determining that a current PDCP Count value of the UE is about to wrap around, the MeNB determines that Key Refresh needs to be performed.

S42. When the MeNB determines that Key Re-key needs to be performed, the MeNB may send a key change indication message to the SeNB to instruct the SeNB to perform the security key change. Specifically, the MeNB may add, to the key change indication message, one or more secondary-eNodeB-side intermediate keys generated based on a new master-eNodeB-side intermediate key of the MeNB, and a frequency/frequencies and PCI information of one or more cells of the SeNB, or a specific security parameter of the SeNB, for example, a PDCP COUNT value. The one or more cells of the SeNB are a cell/cells associated with generation of a security key of the SeNB, and the one or more secondary-eNodeB-side intermediate keys are used to generate a user-plane cipher key on an SeNB side.

S43. The MeNB sends an intra-cell HO command message to the UE, so that the UE performs a security key change process according to the intra-cell HO command message. The intra-cell HO command message includes indication information indicating data transmission on the SeNB side, where the indication information may include indication information indicating keeping transmission between the UE and the SeNB, or indication information indicating stopping data transmission between the UE and the SeNB, or indication information indicating suspending data transmission between the UE and the SeNB, so that the UE determines, according to the indication information, how to perform data transmission on the SeNB side.

S44. After receiving the intra-cell HO handover command message sent by the MeNB, the UE determines, according to indication information in the intra-cell HO command, how to handle data transmission between the UE and the SeNB.

If the MeNB indicates that the UE keeps data transmission between the UE and the SeNB, the UE should perform one or more of the following operations.

(1) Keep PDCP configurations of all RBs established between the UE and the SeNB.

(2) Keep RLC configurations of all RBs established between the UE and the SeNB.

(3) Keep MAC configurations of all RBs established between the UE and the SeNB.

(4) Keep an active state of an activated SCell between the UE and the SeNB.

(5) Keep a C-RNTI used for communication between the UE and the SeNB.

(6) Keep data transmission between the UE and the SeNB.

(7) Perform a Key Refresh process between the UE and the MeNB. Specifically, performing key Refresh between the UE and the MeNB is updating a UE-side intermediate key corresponding to the MeNB by using a Next Hop Chaining Count value indicated in the intra-cell HO command message and based on a current UE-side intermediate key corresponding to the MeNB or an NH, and further generating, by using an updated UE-side intermediate key corresponding to the MeNB and a security algorithm of the MeNB, a new cipher key and a new integrity protection key that are used for communication with the MeNB.

If the MeNB indicates suspending data transmission between the UE and the SeNB, the UE should perform one or more of the following operations.

(1) Keep PDCP configurations of all RBs established between the UE and the SeNB.

(2) Keep RLC configurations of all RBs established between the UE and the SeNB.

(3) Keep MAC configurations of all RBs established between the UE and the SeNB.

(4) Keep an active state of an activated SCell between the UE and the SeNB.

(5) Keep a C-RNTI used for communication between the UE and the SeNB.

(6) Suspend data transmission between the UE and the SeNB.

(7) Perform a Key Refresh process between the UE and the MeNB.

Specifically, performing key Refresh between the UE and the MeNB is updating a UE-side intermediate key corresponding to the MeNB by using a Next Hop Chaining Count value indicated in the intra-cell HO command message and based on a current UE-side intermediate key corresponding to the MeNB or an NH, and further generating, by using an updated UE-side intermediate key corresponding to the MeNB and a security algorithm of the MeNB, a new cipher key and a new integrity protection key that are used for communication with the MeNB.

If the MeNB indicates that the UE stops data transmission between the UE and the SeNB, the UE should perform one or more of the following operations.

(1) Reconfigure MAC on an MeNB side and MAC on the SeNB side.

(2) Re-establish PDCP and RLC for RBs of the MeNB and the SeNB.

(3) Stop data transmission between the UE and the MeNB and between the UE and the SeNB.

(4) Update security keys for the MeNB and the SeNB according to security context information in the intra-cell HO command message. For a specific process, refer to the description in the foregoing embodiment.

It can be learned from the descriptions in the foregoing embodiments that according to the embodiments, an effect imposed by a security key change process of an MeNB on data transmission between a UE and an SeNB can be reduced, and it is avoided that the security key change process of the MeNB causes unnecessary re-establishment of PDCP and RLC of RBs and reconfiguration of MAC, thereby ensuring normal data transmission on RBs between the UE and the SeNB.

It should be noted that, for brief description, the foregoing method embodiments are represented as a series of actions. However, a person skilled in the art should understand that embodiments are not limited to the described order of the actions, because according to the embodiments, some steps may be performed in other orders or simultaneously. In addition, a person skilled in the art should also understand that the embodiments described in this specification all belong to exemplary embodiments, and the involved actions and modules are not necessarily mandatory to the embodiments.

To better implement the foregoing solutions in the embodiments, related apparatuses used to implement the foregoing solutions are further provided in the following.

Referring to FIG. 4-$a$, an embodiment provides a base station 400. The base station 400 is specifically a master eNodeB MeNB, which may include a key change determining module 401, a message sending module 402, and a message receiving module 403.

The key change determining module 401 is configured to determine that a security key change needs to be performed between a first base station and user equipment UE, where the first base station includes at least one of the master eNodeB and a secondary eNodeB.

The message sending module 402 is configured to send a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB.

The message receiving module 403 is configured to receive a key change complete message sent by the UE, so that the first base station determines that the security key change between the UE and the first base station is completed.

In some embodiments, if the first base station determined by the master eNodeB includes the secondary eNodeB, the message sending module 402 is further configured to: after the message receiving module receives the key change complete message sent by the UE, forward the key change complete message to the secondary eNodeB, so that the secondary eNodeB determines that the security key change between the UE and the secondary eNodeB is completed.

In some embodiments, the key change command message carries indication information indicating whether the UE performs random access to the first base station.

In some embodiments, if the key change command message indicates that the UE performs random access to the first base station, the message sending module 402 is specifically configured to send the UE the key change command message that includes information about a random access resource, so that the UE performs random access to the first base station according to the information about the random access resource.

Specifically, in some embodiments, as shown in FIG. 4-*b*, the key change determining module 401 includes: a command receiving submodule 4011, configured to receive a key indication command sent by a mobility management entity MME, where the key indication command is used to instruct to perform Key Re-key between the master eNodeB and the UE and/or instruct to perform Key Re-key between the secondary eNodeB and the UE; and a key change determining submodule 4012, configured to determine, according to the key indication command, that Key Re-key is to be performed between the first base station and the UE.

Further, in some embodiments, if the master eNodeB determines that a manner for performing the security key change between the first base station and the UE is Key Re-key, a key change command message carries cell information, associated with the security key change, of the secondary eNodeB or base station information, associated with the security key change, of the secondary eNodeB.

In some embodiments, if the first base station determined by the master eNodeB includes the secondary eNodeB, the message sending module 402 is further configured to: after the key change determining submodule determines, according to the key indication command, that the security key change needs to be performed between the first base station and the UE, send a key change indication message to the secondary eNodeB, where the key change indication message is used to instruct the secondary eNodeB to perform the security key change, and the key change indication message includes a secondary-eNodeB-side intermediate key generated by the master eNodeB according to an updated master-eNodeB-side intermediate key and cell information, associated with the security key change, of the secondary eNodeB or base station information, associated with the security key change, of the secondary eNodeB, or the key change indication message includes a secondary-eNodeB-side intermediate key generated by the MME for the secondary eNodeB.

In some embodiments, the key change determining module 401 is specifically configured to: determine whether a current Packet Data Convergence Protocol count PDCP Count of the UE on a master eNodeB side wraps around within preset times, and if the current PDCP Count of the UE on the master eNodeB side wraps around within the preset times, determine that the security key change needs to be performed between the first base station and the UE, and determine that a key refresh Key Refresh manner is to be used, where the first base station is the master eNodeB; and/or when the master eNodeB receives indication information that is sent by the secondary eNodeB and that indicates that a PDCP Count on a secondary eNodeB side wraps around within preset times, or the master eNodeB receives indication information that is sent by the secondary eNodeB and that indicates that the secondary eNodeB needs to perform Key Refresh, or the master eNodeB receives indication information that is reported by the UE and that indicates that a current PDCP Count on a secondary eNodeB side wraps around within preset times, determine that the security key change needs to be performed between the first base station and the UE, and determine that a Key Refresh manner is to be used, where the first base station is the secondary eNodeB.

In some embodiments, the key change command message includes first indication information and second indication information, the first indication information is used to indicate that the security key change needs to be performed between the master eNodeB and the UE, and the second indication information is used to indicate that the security key change needs to be performed between the secondary eNodeB and the UE.

In some embodiments, the first indication information is further used to indicate that a manner for performing the security key change between the master eNodeB and the UE is Key Re-key or Key Refresh.

The second indication information is further used to indicate that a manner for performing the security key change between the secondary eNodeB and the UE is Key Re-key or Key Refresh.

In some embodiments, the key change command message includes first security key context information and second security key context information, where the first security key context information is used to indicate that the security key change needs to be performed between the master eNodeB and the UE, and the second security key context information is used to indicate that the security key change needs to be performed between the secondary eNodeB and the UE.

In some embodiments, the first security key context information is further used to indicate that a manner for performing the security key change between the master eNodeB and the UE is Key Re-key or Key Refresh.

The second security key context information is further used to indicate that a manner for performing the security key change between the secondary eNodeB and the UE is Key Re-key or Key Refresh.

In some embodiments, the key change command message indicates, by using a value of a key change indicator Key Change Indicator field, that a manner for performing the security key change between the first base station and the UE is Key Re-key or Key Refresh.

In some embodiments, the key change command message carries indication information indicating that the UE keeps data transmission between the UE and a second base station, or indicating that the UE suspends data transmission between the UE and the first base station, or indicating that the UE stops data transmission between the UE and the first base station, where when the second base station is the master eNodeB, the first base station is the secondary eNodeB, or when the second base station is the secondary eNodeB, the second base station is the master eNodeB.

In some embodiments, the key change command message is specifically an intra-cell handover HO command message.

It can be learned from the foregoing descriptions in this embodiment that: a key change determining module determines that a security key change needs to be performed between a first base station and a UE, where the first base station includes at least one of a master eNodeB and a secondary eNodeB; after the master eNodeB determines that the security key change needs to be performed between the first base station and the UE, a message sending module sends a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB; and after the UE completes the security key change, the UE sends a key change complete message to the master eNodeB, the master eNodeB may receive the key change complete message sent by the UE, so that the first base station can determine, by using the master eNodeB, that the security key change between the UE and the first base station is completed, and the first base station and the UE can use a new security key to perform data transmission. Therefore, according to this embodiment, a security key change can be implemented when a UE performs dual connectivity communication with both an MeNB and an SeNB.

Referring to FIG. 5-a, an embodiment provides a UE 500, which may include a message receiving module 501, a key change module 502, a determining module 503, and a message sending module 504.

The message receiving module 501 is configured to receive a key change command message sent by a master eNodeB, where the key change command message includes indication information that the master eNodeB commands that a security key change be performed between the UE and a first base station, where the first base station includes at least one of the master eNodeB and a secondary eNodeB.

The key change module 502 is configured to perform, according to the key change command message, the security key change between the UE and the first base station.

The determining module 503 is configured to determine, according to the key change command message, whether to keep access stratum configuration information between the UE and the master eNodeB or the secondary eNodeB and/or whether to keep data transmission between the UE and the master eNodeB or the secondary eNodeB.

The message sending module 504 is configured to send a key change complete message to the master eNodeB, so that the first base station determines that the security key change between the UE and the first base station is completed.

In some embodiments, the key change command message carries indication information indicating whether the UE performs random access to the first base station, and the determining module 503 is further configured to: after the message receiving module receives the key change command message sent by the master eNodeB, determine, according to the indication information that is carried in the key change command message and that indicates whether the UE performs random access to the first base station, whether to perform random access to the first base station.

In other embodiments, if the key change command message indicates that the UE performs random access to the first base station, as shown in FIG. 5-b, the UE 500 further includes a random access module 505.

The message receiving module 501 is specifically configured to receive a key change command message that is sent by the master eNodeB and that includes information about a random access resource.

The random access module 505 is configured to perform random access to the first base station according to the information about the random access resource.

In some embodiments, if the indication information included in the key change command message received by the UE includes first indication information and second indication information, where the first indication information is used to indicate that the security key change needs to be performed between the master eNodeB and the UE, and the second indication information is used to indicate that the security key change needs to be performed between the secondary eNodeB and the UE, the key change module 502 is further configured to determine, according to the first indication information and/or the second indication information, that the first base station is in one of the following three conditions: the first base station is the master eNodeB, the first base station is the secondary eNodeB, and the first base station is the master eNodeB and the secondary eNodeB.

In some embodiments, the first indication information is further used to indicate that a manner for performing the security key change between the master eNodeB and the UE is Key Re-key or Key Refresh, and the key change module 502 is specifically configured to perform, according to the first indication information, the security key change between the UE and the master eNodeB in the Key Re-key or Key Refresh manner.

The second indication information is further used to indicate that a manner for performing the security key change between the secondary eNodeB and the UE is Key Re-key or Key Refresh, and the key change module 502 is specifically configured to perform, according to the second indication information, the security key change between the UE and the secondary eNodeB in the Key Re-key or Key Refresh manner.

In some embodiments, if the key change command message received by the UE includes first security key context information and second security key context information, where the first security key context information is used to indicate that the security key change needs to be performed between the master eNodeB and the UE, and the second security key context information is used to indicate that the security key change needs to be performed between the secondary eNodeB and the UE, the key change module 502 is further configured to determine, according to the first security key context information and/or the second security key context information, that the first base station is in one of the following three conditions: the first base station is the master eNodeB, the first base station is the secondary eNodeB, and the first base station is the master eNodeB and the secondary eNodeB.

In some embodiments, the first security key context information is further used to indicate that a manner for performing the security key change between the master eNodeB and the UE is Key Re-key or Key Refresh, and the key change module 502 is specifically configured to perform, according to the first security key context information, the security key change between the UE and the master eNodeB in the Key Re-key or Key Refresh manner.

The second security key context information is further used to indicate that a manner for performing the security key change between the secondary eNodeB and the UE is Key Re-key or Key Refresh, and the key change module is specifically configured to perform, according to the second security key context information, the security key change between the UE and the secondary eNodeB in the Key Re-key or Key Refresh manner.

In some embodiments, if the indication information included in the key change command message is a key change indicator Key Change Indicator field, the key change module 502 is specifically configured to determine, by using a value of the Key Change Indicator field, to perform the security key change between the UE and the first base station in a Key Re-key or Key Refresh manner.

In some embodiments, the determining module 503 is specifically configured to: determine, according to first indication information and second indication information that are included in the key change command message, whether to keep the access stratum configuration information between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determine, according to first security key context information and second security key context information that are included in the key change command message, whether to keep the access stratum configuration information between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determine, according to a key change indicator Key Change Indicator field included in the key change command message, whether to keep the access stratum configuration information between the UE and the master eNodeB or the secondary eNodeB; or determine, according to indication information that is included in the key change command message and that indicates that the UE keeps data transmission between the UE and the master eNodeB or the secondary eNodeB, whether to keep the access stratum configuration information between the UE and the master eNodeB or the secondary eNodeB.

In some embodiments, the determining module 503 is specifically configured to: when determining, according to the Key Change Indicator field, that Key Re-key needs to be performed, determine not to keep the access stratum configuration information between the UE and the master eNodeB or the secondary eNodeB; or when determining, according to the Key Change Indicator field, that Key Refresh needs to be performed based on a UE-side intermediate key corresponding to the master eNodeB, determine to keep the access stratum configuration information between the UE and the master eNodeB or the secondary eNodeB; or when determining, according to the Key Change Indicator field, that Key Refresh needs to be performed based on a next hop NH, determine to keep the access stratum configuration information between the UE and the master eNodeB or the secondary eNodeB.

In some embodiments, the determining module 503 is specifically configured to: determine, according to first indication information and second indication information that are included in the key change command message, whether to keep data transmission between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determine, according to first security key context information and second security key context information that are included in the key change command message, whether to keep data transmission between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determine, according to a Key Change Indicator field included in the key change command message, whether to keep data transmission between the UE and the master eNodeB or the secondary eNodeB; or determine, according to indication information that is included in the key change command message and that indicates that the UE keeps data transmission between the UE and the master eNodeB or the secondary eNodeB, whether to keep data transmission between the UE and the master eNodeB or the secondary eNodeB.

In some embodiments, the determining module 503 is specifically configured to: when determining, according to the Key Change Indicator field, that Key Re-key needs to be performed, determine not to keep data transmission between the UE and the master eNodeB or between the UE and the secondary eNodeB; or when determining, according to the Key Change Indicator field, that Key Refresh needs to be performed based on a UE-side intermediate key corresponding to the master eNodeB, determine to keep data transmission between the UE and the secondary eNodeB; or when determining, according to the Key Change Indicator field, that Key Refresh needs to be performed based on an NH, determine to keep data transmission between the UE and the secondary eNodeB.

In some embodiments, when the UE determines, according to the key change command information, that the access stratum configuration information between the UE and the master eNodeB needs to be kept, and/or that data transmission between the UE and the master eNodeB needs to be kept, the determining module 503 is specifically configured to determine at least one of the following: keeping, by the UE, Packet Data Convergence Protocol PDCP configurations of all radio bearers RBs established between the UE and the master eNodeB; keeping, by the UE, Radio Link Control RLC configurations of all RBs established between the UE and the master eNodeB; keeping, by the UE, Medium Access Control MAC configurations of all RBs established between the UE and the master eNodeB; keeping, by the UE, an active state of an activated secondary cell SCell between the UE and the master eNodeB; keeping, by the UE, a cell radio network temporary identifier C-RNTI used for communication between the UE and the master eNodeB; and keeping or suspending, by the UE, data transmission between the UE and the master eNodeB.

In some embodiments, when the UE determines, according to the key change command information, that the access stratum configuration information between the UE and the secondary eNodeB needs to be kept, and/or that data transmission between the UE and the secondary eNodeB needs to be kept, keeping the access stratum configuration information between the UE and the secondary eNodeB and/or keeping data transmission between the UE and the secondary eNodeB, the determining module 503 is specifically configured to determine at least one of the following: keeping, by the UE, PDCP configurations of all RBs established between the UE and the secondary eNodeB; keeping, by the UE, RLC configurations of all RBs established between the UE and the secondary eNodeB; keeping, by the UE, MAC configurations of all RBs established between the UE and the secondary eNodeB; keeping, by the UE, an active state of an activated SCell between the UE and the secondary eNodeB; keeping, by the UE, a C-RNTI used for communication between the UE and the secondary eNodeB; and keeping or suspending, by the UE, data transmission between the UE and the secondary eNodeB.

In some embodiments, the key change module 502 is specifically configured to: when the first base station is the master eNodeB, if the UE determines, according to the key change command message, that the manner for performing the security key change between the master eNodeB and the UE is Key Refresh, perform the security key change between the UE and the master eNodeB in the Key Refresh manner.

After the determining module 503 determines, according to the key change command message, whether to keep the access stratum configuration information between the UE and the master eNodeB or the secondary eNodeB and/or whether to keep data transmission between the UE and the master eNodeB or the secondary eNodeB, compared with the UE 500 shown in FIG. 5-a, the UE 500 shown in FIG. 5-c further includes at least one of the following modules: a PDCP keeping module 506, configured to keep the Packet Data Convergence Protocol PDCP configurations of all the radio bearers RBs established between the UE and the secondary eNodeB; an RLC keeping module 507, configured to keep the Radio Link Control RLC configurations of all the RBs established between the UE and the secondary eNodeB; a MAC keeping module 508, configured to keep the Medium Access Control MAC configurations of all the RBs established between the UE and the secondary eNodeB; an activation keeping module 509, configured to keep the active state of the activated secondary cell SCell between the UE and the secondary eNodeB; a C-RNTI keeping module 510, configured to keep the cell radio network temporary identifier C-RNTI used for communication between the UE and the secondary eNodeB; and a first transmission control module 511, configured to keep or suspend data transmission between the UE and the secondary eNodeB.

In some embodiments, as shown in FIG. 5-d, the key change module 502 includes: a first intermediate key updating submodule 5021, configured to update, based on a next hop chaining count Next Hop Chaining Count value indicated by the key change command message and by using a current UE-side intermediate key corresponding to the master eNodeB or a next hop NH, the UE-side intermediate key corresponding to the master eNodeB; and a first key change submodule 5022, configured to generate, by using an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

In some embodiments, the determining module 503 is further configured to: before determining, according to the key change command message, whether to keep the access stratum configuration information between the UE and the master eNodeB or the secondary eNodeB and/or whether to keep data transmission between the UE and the master eNodeB or the secondary eNodeB, determine that the performing the security key change between the UE and the master eNodeB in the Key Refresh manner is based on the current UE-side intermediate key corresponding to the master eNodeB.

In some embodiments, the key change module 502 is specifically configured to determine, according to the first indication information or the first security key context information or security context information that is carried in the key change command message, that the manner for performing the security key change between the master eNodeB and the UE is Key Refresh.

In some embodiments, the key change module 502 is specifically configured to: when the first base station is the master eNodeB, if the UE determines, according to the key change command message, that the manner for performing the security key change between the master eNodeB and the UE is Key Re-key, perform the security key change between the UE and the master eNodeB in the Key Re-key manner.

In some embodiments, after the determining module determines, according to the key change command message, whether to keep the access stratum configuration information between the UE and the master eNodeB or the secondary eNodeB and/or whether to keep data transmission between the UE and the master eNodeB or the secondary eNodeB, compared with the UE 500 shown in FIG. 5-a, the UE 500 shown in FIG. 5-e further includes at least one of the following modules: a PDCP reconfiguration module 512, configured to: reconfigure the PDCP configurations of all the RBs established between the UE and the master eNodeB, and reconfigure the PDCP configurations of all the RBs established between the UE and the secondary eNodeB; an RLC reconfiguration module 513, configured to: reconfigure the RLC configurations of all the RBs established between the UE and the master eNodeB, and reconfigure the RLC configurations of all the RBs established between the UE and the secondary eNodeB; a MAC reconfiguration module 514, configured to: reconfigure the MAC configurations of all the RBs established between the UE and the master eNodeB, and reconfigure the MAC configurations of all the RBs established between the UE and the secondary eNodeB; and a second transmission control module 515, configured to: stop data transmission between the UE and the master eNodeB, and stop data transmission between the UE and the secondary eNodeB.

In some embodiments, the key change module 502 includes: a second intermediate key updating submodule, configured to update a UE-side intermediate key between the UE and the master eNodeB based on an updated access security management entity ASME intermediate key; and a first key change submodule, configured to generate, according to an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

In some embodiments, the key change module further includes: a third intermediate key updating submodule, configured to: after the second intermediate key updating submodule updates the UE-side intermediate key corresponding to the master eNodeB based on the access security management entity ASME intermediate key, update, according to the updated master-eNodeB-side intermediate key and cell information, associated with the security key change, of the secondary eNodeB or base station information, associated with the security key change, of the secondary eNodeB, a UE-side intermediate key corresponding to the secondary eNodeB; and a second key change submodule, configured to generate, according to an updated UE-side intermediate key corresponding to the secondary eNodeB and a security algorithm of the secondary eNodeB, a new security key corresponding to the secondary eNodeB, where the new security key corresponding to the secondary eNodeB includes a cipher key used for communication between the UE and the secondary eNodeB.

In some embodiments, the key change module 502 is specifically configured to determine, according to the first indication information or the first security key context information or security context information that is carried in the key change command message, that the manner for performing the security key change between the master eNodeB and the UE is Key Re-key.

In some embodiments, if the key change command message carries indication information indicating that the UE keeps data transmission between the UE and a second base station, after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP keeping module, configured to keep PDCP configurations of all RBs established between the UE and the second base station; an RLC keeping module, configured to keep RLC configurations of all RBs established between the UE and the second base station; a MAC keeping module, configured to keep MAC configurations of all RBs established between the UE and the second base station; an activation keeping module, configured to keep an active state of an activated SCell between the UE and the second base station; a C-RNTI keeping module, configured to keep a C-RNTI used for communication between the UE and the second base station; and a transmission keeping module, configured to keep data transmission between the UE and the second base station.

In some embodiments, if the key change command message carries indication information indicating that the UE suspends data transmission between the UE and the first base station, after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP keeping module, configured to keep PDCP configurations of all RBs established between the UE and the first base station; an RLC keeping module, configured to keep RLC configurations of all RBs established between the UE and the first base station; a MAC keeping module, configured to keep MAC configurations of all RBs established between the UE and the first base station; an activation keeping module, configured to keep an active state of an activated SCell between the UE and the first base station; a C-RNTI keeping module, configured to keep a C-RNTI used for communication between the UE and the first base station; and a transmission suspension module, configured to suspend data transmission between the UE and the first base station.

In some embodiments, if the key change command message carries indication information indicating that the UE stops data transmission between the UE and the first base station, after the determining module determines, according to the key change command message, whether to keep the access stratum configuration information between the UE and the master eNodeB or the secondary eNodeB and/or whether to keep data transmission between the UE and the master eNodeB or the secondary eNodeB, the UE further includes at least one of the following modules: a PDCP reconfiguration module, configured to reconfigure PDCP configurations of all RBs established between the UE and the first base station; an RLC reconfiguration module, configured to reconfigure RLC configurations of all RBs established between the UE and the first base station; a MAC reconfiguration module, configured to reconfigure MAC configurations of all RBs established between the UE and the first base station; and a transmission stopping module, configured to stop data transmission between the UE and the first base station.

It can be learned from the foregoing descriptions in this embodiment that: a master eNodeB sends a key change command message to a UE, a key change module performs, according to the key change command message, a security key change between the UE and a first base station, and a determining module determines, according to the key change command message, whether to keep access stratum configuration information between the UE and the master eNodeB or a secondary eNodeB and/or whether to keep data transmission between the UE and the master eNodeB or the secondary eNodeB; after the UE completes the security key change, a message sending module sends a key change complete message to the master eNodeB, the master eNodeB may receive the key change complete message sent by the UE, the first base station may determine, by using the master eNodeB, that the security key change between the UE and the first base station is completed, and the first base station and the UE can use a new security key to perform data transmission. Therefore, according to this embodiment, a security key change may be implemented when a UE performs dual connectivity communication with both an MeNB and an SeNB.

An embodiment further provides a computer storage medium, where the computer storage medium stores a program, and the program performs some or all steps recorded in the foregoing method embodiments.

Figure 6:
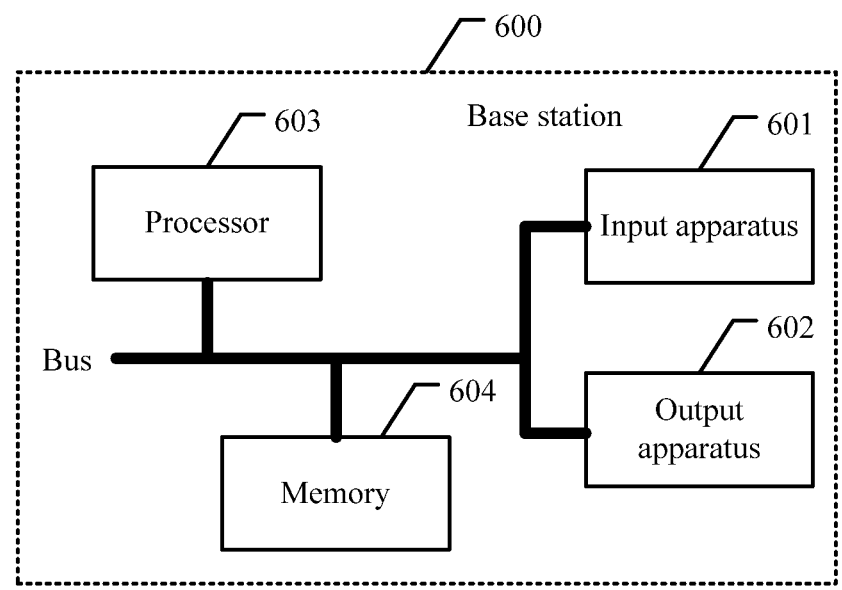
FIG. 6 is a schematic structural diagram of another base station according to an embodiment.

The following describes another base station provided in an embodiment, and the base station specifically refers to a master eNodeB. As shown in FIG. 6, the base station 600 includes: an input apparatus 601, an output apparatus 602, a processor 603, and a memory 604 (there may be one or more processors 603 in the base station 600, and one processor is used as an example in FIG. 6). In some embodiments, the input apparatus 601, the output apparatus 602, the processor 603, and the memory 604 may be connected by using a bus or in another manner; in FIG. 6, connection by using a bus is used as an example.

The processor 603 is configured to perform the following steps: determining that a security key change needs to be performed between a first base station and user equipment UE, where the first base station includes at least one of the master eNodeB and a secondary eNodeB; sending a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB; and receiving a key change complete message sent by the UE, so that the first base station determines that the security key change between the UE and the first base station is completed.

In some embodiments, the processor 603 is further configured to perform the following step: if the first base station determined by the master eNodeB includes the secondary eNodeB, after receiving the key change complete message sent by the UE, forwarding the key change complete message to the secondary eNodeB, so that the secondary eNodeB determines that the security key change between the UE and the secondary eNodeB is completed.

In some embodiments, the key change command message stored in the memory 604 carries indication information indicating whether the UE performs random access to the first base station.

In some embodiments, if the key change command message indicates that the UE performs random access to the first base station, the processor 603 is further configured to perform the following step: sending the UE the key change command message that includes information about a random access resource, so that the UE performs random access to the first base station according to the information about the random access resource.

In some embodiments, the processor 603 is configured to perform the following steps: the determining that a security key change needs to be performed between a first base station and user equipment UE may include: receiving a key indication command sent by a mobility management entity MME, where the key indication command is used to instruct to perform key re-key Key Re-key between the master eNodeB and the UE and/or instruct to perform Key Re-key between the secondary eNodeB and the UE; and determining, according to the key indication command, that Key Re-key is to be performed between the first base station and the UE.

In some embodiments, if the master eNodeB determines that Key Re-key is to be performed between the first base station and the UE, the key change command message stored in the memory 604 carries cell information, associated with the security key change, of the secondary eNodeB or base station information, associated with the security key change, of the secondary eNodeB.

In some embodiments, the processor 603 is specifically configured to perform the following step: if the first base station determined by the master eNodeB includes the secondary eNodeB, after determining that the security key change needs to be performed between the first base station and the user equipment UE, sending a key change indication message to the secondary eNodeB, where the key change indication message is used to instruct the secondary eNodeB to perform the security key change, and the key change indication message includes a secondary-eNodeB-side intermediate key generated by the master eNodeB according to an updated master-eNodeB-side intermediate key and cell information, associated with the security key change, of the secondary eNodeB or base station information, associated with the security key change, of the secondary eNodeB, or the key change indication message includes a secondary-eNodeB-side intermediate key generated by the MME for the secondary eNodeB.

In some embodiments, the processor 603 is configured to perform the following steps: determining whether a current Packet Data Convergence Protocol count PDCP Count of the UE on a master eNodeB side wraps around within preset times, and if the current PDCP Count of the UE on the master eNodeB side wraps around within the preset times, determining that the security key change needs to be performed between the first base station and the UE, and determining that a key refresh Key Refresh manner is to be used, where the first base station is the master eNodeB; and/or when the master eNodeB receives indication information that is sent by the secondary eNodeB and that indicates that a PDCP Count on a secondary eNodeB side wraps around within preset times, or the master eNodeB receives indication information that is sent by the secondary eNodeB and that indicates that the secondary eNodeB needs to perform Key Refresh, or the master eNodeB receives indication information that is reported by the UE and that indicates that a current PDCP Count on a secondary eNodeB side wraps around within preset times, determining that the security key change needs to be performed between the first base station and the UE, and determining that a Key Refresh manner is to be used, where the first base station is the secondary eNodeB.

In some embodiments, the key change command message stored in the memory 604 includes first indication information and second indication information, the first indication information is used to indicate that the security key change needs to be performed between the master eNodeB and the UE, and the second indication information is used to indicate that the security key change needs to be performed between the secondary eNodeB and the UE.

In some embodiments, the first indication information stored in the memory 604 is further used to indicate that a manner for performing the security key change between the master eNodeB and the UE is Key Re-key or Key Refresh.

The second indication information is further used to indicate that a manner for performing the security key change between the secondary eNodeB and the UE is Key Re-key or Key Refresh.

In some embodiments, the key change command message stored in the memory 604 includes first security key context information and second security key context information, the first security key context information is used to indicate that the security key change needs to be performed between the master eNodeB and the UE, and the second security key context information is used to indicate that the security key change needs to be performed between the secondary eNodeB and the UE.

In some embodiments, the first security key context information stored in the memory 604 is further used to indicate that a manner for performing the security key change between the master eNodeB and the UE is Key Re-key or Key Refresh; the second security key context information is further used to indicate that a manner for performing the security key change between the secondary eNodeB and the UE is Key Re-key or Key Refresh.

In some embodiments, the key change command message stored in the memory 604 indicates, by using a value of a key change indicator Key Change Indicator field, that a manner for performing the security key change between the first base station and the UE is Key Re-key or Key Refresh.

In some embodiments, the key change command message stored in the memory 604 carries indication information indicating that the UE keeps data transmission between the UE and a second base station, or indicating that the UE suspends data transmission between the UE and the first base station, or indicating that the UE stops data transmission between the UE and the first base station, where when the second base station is the master eNodeB, the first base station is the secondary eNodeB, or when the second base station is the secondary eNodeB, the second base station is the master eNodeB.

In some embodiments, the key change command message stored in the memory 604 is specifically an intra-cell handover HO command message.

It can be learned from the foregoing descriptions in this embodiment that: a master eNodeB determines that a security key change needs to be performed between a first base station and a UE, where the first base station includes at least one of the master eNodeB and a secondary eNodeB; after the master eNodeB determines that the security key change needs to be performed between the first base station and the UE, the master eNodeB sends a key change command message to the UE, so that the UE performs, according to the key change command message, the security key change between the UE and the first base station, and determines, according to the key change command message, whether to keep access stratum configuration information between the UE and the master eNodeB or the secondary eNodeB and/or whether to keep data transmission between the UE and the master eNodeB or the secondary eNodeB; and after the UE completes the security key change, the UE sends a key change complete message to the master eNodeB, the master eNodeB may receive the key change complete message sent by the UE, so that the first base station can determine, by using the master eNodeB, that the security key change between the UE and the first base station is completed, and the first base station and the UE can use a new security key to perform data transmission. Therefore, according to this embodiment, a security key change may be implemented when a UE performs dual connectivity communication with both an MeNB and an SeNB.

Figure 7:
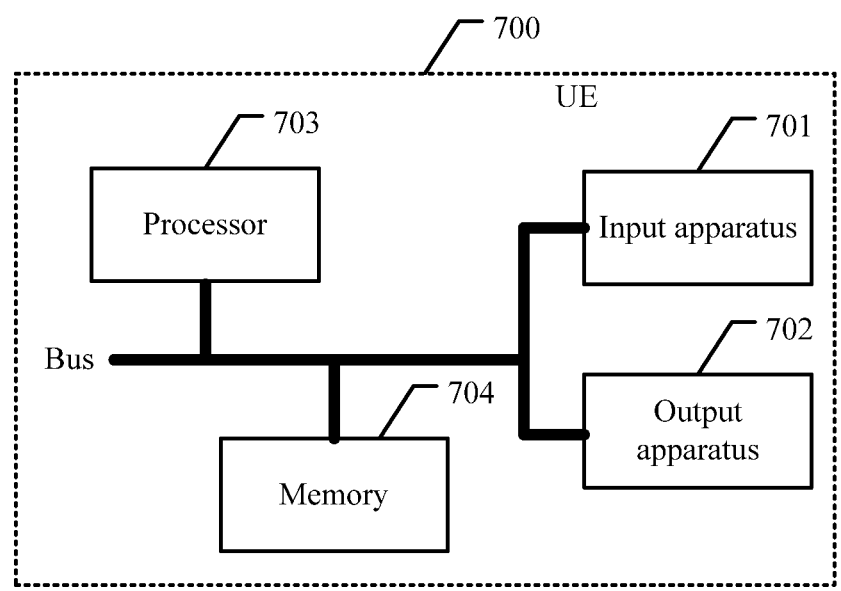
FIG. 7 is a schematic structural diagram of another UE according to an embodiment.

The following describes another UE provided in an embodiment, and as shown in FIG. 7, the UE 700 includes: an input apparatus 701, an output apparatus 702, a processor 703, and a memory 704 (there may be one or more processors 703 in the UE 700, and one processor is used as an example in FIG. 7). In some embodiments, the input apparatus 704 the output apparatus 702, the processor 703, and the memory 704 may be connected by using a bus or in another manner; in FIG. 7, connection by using a bus is used as an example.

The processor 703 is configured to perform the following steps: receiving a key change command message sent by a master eNodeB, where the key change command message includes indication information that the master eNodeB commands that a security key change be performed between the UE and a first base station, where the first base station includes at least one of the master eNodeB and a secondary eNodeB; performing, according to the key change command message, the security key change between the UE and the first base station; determining, according to the key change command message, whether to keep access stratum configuration information between the UE and the master eNodeB or the secondary eNodeB and/or whether to keep data transmission between the UE and the master eNodeB or the secondary eNodeB; and sending a key change complete message to the master eNodeB, so that the first base station determines that the security key change between the UE and the first base station is completed.

In some embodiments, the key change command message carries indication information indicating whether the UE performs random access to the first base station, and the processor 703 is further configured to perform the following step: after receiving the key change command message sent by the master eNodeB, determining, according to the indication information that is carried in the key change command message and that indicates whether the UE performs random access to the first base station, whether to perform random access to the first base station.

In some embodiments, if the key change command message indicates that the UE performs random access to the first base station, the processor 703 is configured to perform the following step: receiving a key change command message that is sent by the master eNodeB and that includes information about a random access resource, and performing random access to the first base station according to the information about the random access resource.

In some embodiments, the processor 703 is configured to perform the following step: if the indication information included in the key change command message received by the UE includes first indication information and second indication information, where the first indication information is used to indicate that the security key change needs to be performed between the master eNodeB and the UE, and the second indication information is used to indicate that the security key change needs to be performed between the secondary eNodeB and the UE, determining, according to the first indication information and/or the second indication information, that the first base station is in one of the following three conditions: the first base station is the master eNodeB, the first base station is the secondary eNodeB, and the first base station is the master eNodeB and the secondary eNodeB.

In some embodiments, the first indication information is further used to indicate that a manner for performing the security key change between the master eNodeB and the UE is Key Re-key or Key Refresh, and the processor 703 is configured to perform the following step: performing, according to the first indication information, the security key change between the UE and the master eNodeB in the Key Re-key or Key Refresh manner.

In some embodiments, the second indication information is further used to indicate that a manner for performing the security key change between the secondary eNodeB and the UE is Key Re-key or Key Refresh, and the processor 703 is configured to perform the following step: the performing, by the UE according to the key change command message, the security key change between the UE and the first base station is specifically: performing, according to the second indication information, the security key change between the UE and the secondary eNodeB in the Key Re-key or Key Refresh manner.

In some embodiments, the processor 703 is configured to perform the following step: if the indication information included in the key change command message received by the UE includes first security key context information and second security key context information, where the first security key context information is used to indicate that the security key change needs to be performed between the master eNodeB and the UE, and the second security key context information is used to indicate that the security key change needs to be performed between the secondary eNodeB and the UE, determining, according to the first security key context information and/or the second security key context information, that the first base station is in one of the following three conditions: the first base station is the master eNodeB, the first base station is the secondary eNodeB, and the first base station is the master eNodeB and the secondary eNodeB.

In some embodiments, the first security key context information is further used to indicate that a manner for performing the security key change between the master eNodeB and the UE is Key Re-key or Key Refresh, and the processor 703 is configured to perform the following step: the performing, by the UE according to the key change command message, the security key change between the UE and the first base station is specifically: performing, according to the first security key context information, the security key change between the UE and the master eNodeB in the Key Re-key or Key Refresh manner.

In some embodiments, the second security key context information is further used to indicate that a manner for performing the security key change between the secondary eNodeB and the UE is Key Re-key or Key Refresh, and the processor 703 is configured to perform the following step: the performing, by the UE according to the key change command message, the security key change between the UE and the first base station is specifically: performing, according to the second security key context information, the security key change between the UE and the secondary eNodeB in the Key Re-key or Key Refresh manner.

In some embodiments, if the indication information included in the key change command message is a key change indicator Key Change Indicator field, the processor 703 is configured to perform the following step: the performing, by the UE according to the key change command message, the security key change between the UE and the first base station is specifically: determining, by using a value of the Key Change Indicator field, to perform the security key change between the UE and the first base station in a Key Re-key or Key Refresh manner.

In some embodiments, the processor 703 is configured to perform the following step: determining, according to first indication information and second indication information that are included in the key change command message, whether to keep the access stratum configuration information between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determining, according to first security key context information and second security key context information that are included in the key change command message, whether to keep the access stratum configuration information between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determining, according to a key change indicator Key Change Indicator field included in the key change command message, whether to keep the access stratum configuration information between the UE and the master eNodeB or the secondary eNodeB; or determining, according to indication information that is included in the key change command message and that indicates that the UE keeps data transmission between the UE and the master eNodeB or the secondary eNodeB, whether to keep the access stratum configuration information between the UE and the master eNodeB or the secondary eNodeB.

In some embodiments, the processor 703 is configured to perform the following step: when determining, according to the Key Change Indicator field, that Key Re-key needs to be performed, determining not to keep the access stratum configuration information between the UE and the master eNodeB or the secondary eNodeB; or when determining, according to the Key Change Indicator field, that Key Refresh needs to be performed based on a UE-side intermediate key corresponding to the master eNodeB, determining to keep the access stratum configuration information between the UE and the master eNodeB or the secondary eNodeB; or when determining, according to the Key Change Indicator field, that Key Refresh needs to be performed based on a next hop NH, determining to keep the access stratum configuration information between the UE and the master eNodeB or the secondary eNodeB.

In some embodiments, the processor 703 is configured to perform the following step: determining, according to first indication information and second indication information that are included in the key change command message, whether to keep data transmission between the UE and the master eNodeB or the secondary eNodeB, where the first indication information is used to indicate that the security key change needs to be performed between the master eNodeB and the UE, and the second indication information is used to indicate that the security key change needs to be performed between the secondary eNodeB and the UE; or determining, according to first security key context information and second security key context information that are included in the key change command message, whether to keep data transmission between the UE and the master eNodeB or the secondary eNodeB, where the first security key context information is used to indicate that the security key change needs to be performed between the master eNodeB and the UE, and the second security key context information is used to indicate that the security key change needs to be performed between the secondary eNodeB and the UE; or determining, according to a Key Change Indicator field included in the key change command message, whether to keep data transmission between the UE and the master eNodeB or the secondary eNodeB; or determining, according to indication information that is included in the key change command message and that indicates that the UE keeps data transmission between the UE and the master eNodeB or the secondary eNodeB, whether to keep data transmission between the UE and the master eNodeB or the secondary eNodeB.

In some embodiments, the processor 703 is configured to perform the following step: when determining, according to the Key Change Indicator field, that Key Re-key needs to be performed, determining not to keep data transmission between the UE and the master eNodeB or between the UE and the secondary eNodeB; or when determining, according to the Key Change Indicator field, that Key Refresh needs to be performed based on a UE-side intermediate key corresponding to the master eNodeB, determining to keep data transmission between the UE and the secondary eNodeB; or when determining, according to the Key Change Indicator field, that Key Refresh needs to be performed based on an NH, determining to keep data transmission between the UE and the secondary eNodeB.

In some embodiments, when the UE determines, according to the key change command information, that the access stratum configuration information between the UE and the master eNodeB needs to be kept, and/or that data transmission between the UE and the master eNodeB needs to be kept, the processor 703 is configured to perform the following steps: keeping Packet Data Convergence Protocol PDCP configurations of all radio bearers RBs established between the UE and the master eNodeB; keeping Radio Link Control RLC configurations of all RBs established between the UE and the master eNodeB; keeping Medium Access Control MAC configurations of all RBs established between the UE and the master eNodeB; keeping an active state of an activated secondary cell SCell between the UE and the master eNodeB; keeping a cell radio network temporary identifier C-RNTI used for communication between the UE and the master eNodeB; and keeping or suspending data transmission between the UE and the master eNodeB.

In some embodiments, when the UE determines, according to the key change command information, that the access stratum configuration information between the UE and the secondary eNodeB needs to be kept, and/or that data transmission between the UE and the secondary eNodeB needs to be kept, the processor 703 is configured to perform the following steps: keeping the access stratum configuration information between the UE and the secondary eNodeB and/or keeping data transmission between the UE and the secondary eNodeB includes at least one of the following steps: keeping PDCP configurations of all RBs established between the UE and the secondary eNodeB; keeping RLC configurations of all RBs established between the UE and the secondary eNodeB; keeping MAC configurations of all RBs established between the UE and the secondary eNodeB; keeping an active state of an activated SCell between the UE and the secondary eNodeB; keeping a C-RNTI used for communication between the UE and the secondary eNodeB; and keeping or suspending data transmission between the UE and the secondary eNodeB.

In some embodiments, the processor 703 is configured to perform the following step: the performing, by the UE according to the key change command message, the security key change between the UE and the first base station specifically includes: when the first base station is the master eNodeB, if the UE determines, according to the key change command message, that a manner for performing the security key change between the master eNodeB and the UE is Key Refresh, performing the security key change between the UE and the master eNodeB in the Key Refresh manner.

After determining, according to the key change command message, whether to keep the access stratum configuration information between the UE and the master eNodeB or the secondary eNodeB and/or whether to keep data transmission between the UE and the master eNodeB or the secondary eNodeB, the processor 703 is configured to perform at least one of the following steps: keeping the Packet Data Convergence Protocol PDCP configurations of all the radio bearers RBs established between the UE and the secondary eNodeB; keeping the Radio Link Control RLC configurations of all the RBs established between the UE and the secondary eNodeB; keeping the Medium Access Control MAC configurations of all the RBs established between the UE and the secondary eNodeB; keeping the active state of the activated secondary cell SCell between the UE and the secondary eNodeB; keeping the cell radio network temporary identifier C-RNTI used for communication between the UE and the secondary eNodeB; and keeping or suspending data transmission between the UE and the secondary eNodeB.

In some embodiments, the processor 703 is configured to perform the following steps: updating, based on a next hop chaining count Next Hop Chaining Count value indicated by the key change command message and by using a current UE-side intermediate key corresponding to the master eNodeB or a next hop NH, the UE-side intermediate key corresponding to the master eNodeB; and generating, by using an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

In some embodiments, the processor 703 is configured to perform the following step: before the UE determines, according to the key change command message, whether to keep the access stratum configuration information between the UE and the master eNodeB or the secondary eNodeB and/or whether to keep data transmission between the UE and the master eNodeB or the secondary eNodeB, determining that the performing the security key change between the UE and the master eNodeB in the Key Refresh manner is based on the current UE-side intermediate key corresponding to the master eNodeB.

In some embodiments, the processor 703 is configured to perform the following step: determining, according to the first indication information or the first security key context information or security context information that is carried in the key change command message, that the manner for performing the security key change between the master eNodeB and the UE is Key Refresh.

In some embodiments, the processor 703 is configured to perform the following step: when the first base station is the master eNodeB, if the UE determines, according to the key change command message, that the manner for performing the security key change between the master eNodeB and the UE is Key Re-key, performing the security key change between the UE and the master eNodeB in the Key Re-key manner.

After determining, according to the key change command message, whether to keep the access stratum configuration information between the UE and the master eNodeB or the secondary eNodeB and/or whether to keep data transmission between the UE and the master eNodeB or the secondary eNodeB, the processor 703 is further configured to perform at least one of the following steps: reconfiguring the PDCP configurations of all the RBs established between the UE and the master eNodeB; reconfiguring the PDCP configurations of all the RBs established between the UE and the secondary eNodeB; reconfiguring the RLC configurations of all the RBs established between the UE and the master eNodeB; reconfiguring the RLC configurations of all the RBs established between the UE and the secondary eNodeB; reconfiguring the MAC configurations of all the RBs established between the UE and the master eNodeB; reconfiguring the MAC configurations of all the RBs established between the UE and the secondary eNodeB; stopping data transmission between the UE and the master eNodeB; and stopping data transmission between the UE and the secondary eNodeB.

In some embodiments, the processor 703 is configured to perform the following steps: the performing, by the UE, the security key change between the UE and the master eNodeB in the Key Re-key manner specifically includes: updating a UE-side intermediate key between the UE and the master eNodeB based on an updated access security management entity ASME intermediate key; and generating, according to an updated UE-side intermediate key corresponding to the master eNodeB and a security algorithm of the master eNodeB, a new security key corresponding to the master eNodeB, where the new security key corresponding to the master eNodeB includes: a cipher key and an integrity protection key that are used for communication between the UE and the master eNodeB.

In some embodiments, the processor 703 is further configured to perform the following steps: after the UE updates the UE-side intermediate key corresponding to the master eNodeB based on an updated access security management entity ASME intermediate key, updating, according to the updated master-eNodeB-side intermediate key and cell information, associated with the security key change, of the secondary eNodeB or base station information, associated with the security key change, of the secondary eNodeB, a UE-side intermediate key corresponding to the secondary eNodeB; and generating, according to an updated UE-side intermediate key corresponding to the secondary eNodeB and a security algorithm of the secondary eNodeB, a new security key corresponding to the secondary eNodeB, where the new security key corresponding to the secondary eNodeB includes a cipher key used for communication between the UE and the secondary eNodeB.

In some embodiments, the processor 703 is configured to perform the following step: that the UE determines, according to the indication information included in the key change command message, that the manner for performing the security key change between the master eNodeB and the UE is Key Re-key is specifically: determining, according to the first indication information or the first security key context information or security context information that is carried in the key change command message, that the manner for performing the security key change between the master eNodeB and the UE is Key Re-key.

In some embodiments, if indication information carried in the key change command message indicates that the UE keeps data transmission between the UE and a second base station, after the UE determines, according to the key change command message, whether to keep the access stratum configuration information between the UE and the master eNodeB or the secondary eNodeB and/or whether to keep data transmission between the UE and the master eNodeB or the secondary eNodeB, the processor 703 is further configured to perform at least one of the following steps: keeping PDCP configurations of all RBs established between the UE and the second base station, where when the second base station is the master eNodeB, the first base station is the secondary eNodeB, or when the second base station is the secondary eNodeB, the second base station is the master eNodeB; keeping RLC configurations of all RBs established between the UE and the second base station; keeping MAC configurations of all RBs established between the UE and the second base station; keeping an active state of an activated SCell between the UE and the second base station; keeping a C-RNTI used for communication between the UE and the second base station; and keeping data transmission between the UE and the second base station.

In some embodiments, if the key change command message carries indication information indicating that the UE suspends data transmission between the UE and the first base station, after the UE determines, according to the key change command message, whether to keep the access stratum configuration information between the UE and the master eNodeB or the secondary eNodeB and/or whether to keep data transmission between the UE and the master eNodeB or the secondary eNodeB, the processor 703 is further configured to perform at least one of the following steps: keeping PDCP configurations of all RBs established between the UE and the first base station; keeping RLC configurations of all RBs established between the UE and the first base station; keeping MAC configurations of all RBs established between the UE and the first base station; keeping an active state of an activated SCell between the UE and the first base station; keeping a C-RNTI used for communication between the UE and the first base station; and suspending data transmission between the UE and the first base station.

In some embodiments, if the key change command message carries indication information indicating that the UE stops data transmission between the UE and the first base station, after the UE determines, according to the key change command message, whether to keep the access stratum configuration information between the UE and the master eNodeB or the secondary eNodeB and/or whether to keep data transmission between the UE and the master eNodeB or the secondary eNodeB, the processor 703 is configured to perform at least one of the following steps: reconfiguring PDCP configurations of all RBs established between the UE and the first base station; reconfiguring RLC configurations of all RBs established between the UE and the first base station; reconfiguring MAC configurations of all RBs established between the UE and the first base station; stopping data transmission between the UE and the first base station.

It can be learned from the foregoing descriptions in this embodiment that: a master eNodeB sends a key change command message to a UE, and the UE performs, according to the key change command message, a security key change between the UE and a first base station, and determines, according to the key change command message, whether to keep access stratum configuration information between the UE and the master eNodeB or a secondary eNodeB and/or whether to keep data transmission between the UE and the master eNodeB or the secondary eNodeB; after the UE completes the security key change, the UE sends a key change complete message to the master eNodeB, the master eNodeB may receive the key change complete message sent by the UE, the first base station may determine, by using the master eNodeB, that the security key change between the UE and the first base station is completed, and the first base station and the UE can use a new security key to perform data transmission. Therefore, according to this embodiment, a security key change may be implemented when a UE performs dual connectivity communication with both an MeNB and an SeNB.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the embodiments, connection relationships between modules indicate that the modules have communication connections with each other, which may be specifically implemented as one or more communications buses or signal cables. Persons of ordinary skill in the art may understand and implement the embodiments without creative efforts.

Based on the description of the foregoing implementation manners, persons skilled in the art may clearly understand that the embodiments may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the embodiments, software program implementation is a better implementation manner in most cases. Based on such an understanding, the technical solutions of the embodiments essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the embodiments.

The foregoing embodiments are merely intended for describing the technical solutions of the embodiments, but not for limiting the embodiments. Although the embodiments are described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the embodiments.

What is claimed is:

1. A method comprising:
   receiving, by a user equipment (UE), a message from a master eNodeB (MeNB), wherein the message comprises an indication of a change of a security key between the UE and the MeNB, and wherein the UE is configured with a dual connectivity between the MeNB and a secondary eNodeB (SeNB);
   updating, by the UE according to the indication, the security key between the UE and the MeNB;
   in a case of updating the security key between the UE and the MeNB in a Key Re-key manner, performing, by the UE, random access to both the MeNB and the SeNB, wherein the random access to the MeNB and the SeNB are performed concurrently;
   in a case of updating the security key between the UE and the MeNB in a Key Refresh manner, keeping, by the UE, an active state of an activated secondary cell (SCell) of the SeNB, keeping data transmission between the UE and the SCell, and not performing random access to the SeNB; and
   sending, by the UE, a key change complete message to the MeNB.

2. The method according to claim 1, further comprising:
   reporting, by the UE to the MeNB, that a current PDCP count on the SeNB side wraps around within preset times; and
   updating, according to the indication, the security key between the UE and the SeNB.

3. The method according to claim 1, wherein updating the security key between the UE and the MeNB in the Key Re-key manner comprises:
   updating, by the UE, a UE-side intermediate key between the UE and the MeNB according to an updated access security management entity (ASME) intermediate key; and
   generating, by the UE according to a security algorithm of the MeNB and the UE-side intermediate key corresponding to the MeNB, a new security key corresponding to the MeNB, wherein the new security key corresponding to the MeNB comprises: a cipher key and an integrity protection key for communication between the UE and the MeNB.

4. An apparatus, comprising:
   a receiver, configured to receive a message from a master eNodeB (MeNB), wherein the message comprises an indication of a change of a security key between a user equipment (UE) and the MeNB, wherein the UE is the apparatus or the apparatus is applicable to the UE, and wherein the UE is configured with a dual connectivity between the MeNB and a secondary eNodeB (SeNB);
   a processor;
   a non-transitory computer readable storage medium storing a program for execution by the processor, the program including instructions to:
   update, according to the indication, a security key between the UE and the MeNB; and
   in a case of updating the security key between the UE and the MeNB in a Key Re-key manner, perform random access to both the MeNB and the SeNB, wherein the random access to the MeNB and the SeNB are performed concurrently;
   in a case of updating the security key between the UE and the MeNB in a Key Refresh manner, keep an active state of an activated secondary cell (SCell) of the SeNB, keep data transmission between the UE and the SCell, and not perform random access to the SeNB; and
   a transmitter, configured to send a key change complete message to the MeNB.

5. The apparatus according to claim 4, wherein:
   the transmitter is further configured to report that a current PDCP count on the SeNB side wraps around within preset times to the MeNB; and
   the program includes further instructions to:
   update, according to the indication, the security key between the UE and the SeNB.

6. The apparatus according to claim 4, wherein updating the security key between the UE and the MeNB in the Key Re-key manner comprises:
   updating a UE-side intermediate key between the UE and the MeNB according to an updated access security management entity (ASME) intermediate key; and
   generating according to a security algorithm of the MeNB and the UE-side intermediate key corresponding to the MeNB, a new security key corresponding to the MeNB, wherein the new security key corresponding to the MeNB comprises: a cipher key and an integrity protection key for communication between the UE and the MeNB.

7. A non-transitory computer readable medium storing a program for execution by a processor, the program including instructions for:
   receiving a message from a master eNodeB (MeNB), wherein the message comprises an indication of a change of a security key between a user equipment (UE) which the processor is used for and the MeNB, wherein the UE is configured to have a dual connectivity with the MeNB and a secondary eNodeB (SeNB);
   updating, according to the indication, the security key between the UE and the MeNB; and
   in a case of updating the security key between the UE and the MeNB in a Key Re-key manner, performing random access to both the MeNB and the SeNB, wherein the random access to the MeNB and the SeNB are performed concurrently;
   in a case of updating the security key between the UE and the MeNB in a Key Refresh manner, keeping an active state of an activated secondary cell (SCell) of the SeNB, keeping data transmission between the UE and the SCell, and not performing random access to the SeNB; and
   sending a key change complete message to the MeNB.

8. The non-transitory computer readable medium according to claim 7, the program including further instructions for:
   reporting, to the MeNB, that a current PDCP count on the SeNB side wraps around within preset times; and
   updating, according to the indication, the security key between the UE and the SeNB.

9. The non-transitory computer readable medium according to claim 7, wherein the instructions for updating the security key between the UE and the MeNB in the Key Re-key manner comprises:

updating a UE-side intermediate key between the UE and the MeNB according to an updated access security management entity (ASME) intermediate key; and generating according to a security algorithm of the MeNB and the UE-side intermediate key corresponding to the MeNB, a new security key corresponding to the MeNB, wherein the new security key corresponding to the MeNB comprises: a cipher key and an integrity protection key for communication between the UE and the MeNB.

* * * * *